(12) United States Patent
Haya et al.

(10) Patent No.: US 12,458,275 B2
(45) Date of Patent: Nov. 4, 2025

(54) DISPERSAL AND EXPOSURE CHAMBER SYSTEMS AND METHODS

(71) Applicant: RED MAPLE TRIALS INC., Ottawa (CA)

(72) Inventors: Laura Haya, Ottawa (CA); Suzanne Kelly, Ottawa (CA); Edgar Matida, Ottawa (CA); Rym Mehri, Ottawa (CA); Stefan Van De Mosselaer, Ottawa (CA); William Yang, Ottawa (CA)

(73) Assignee: RED MAPLE TRIALS INC., Ottawa (CA)

( * ) Notice: Subject to any disclaimer, the term of this patent is extended or adjusted under 35 U.S.C. 154(b) by 1153 days.

(21) Appl. No.: 17/372,110

(22) Filed: Jul. 9, 2021

(65) Prior Publication Data

US 2023/0025100 A1 Jan. 26, 2023

(51) Int. Cl.
*A61B 5/00* (2006.01)
*A61B 90/00* (2016.01)
*A61G 10/00* (2006.01)

(52) U.S. Cl.
CPC ............ *A61B 5/411* (2013.01); *A61B 5/6888* (2013.01); *A61B 90/08* (2016.02); *A61G 10/00* (2013.01);
(Continued)

(58) Field of Classification Search
CPC ....... A61B 5/411; A61B 5/6888; A61G 10/00; F24F 8/50; F24F 3/12; B60H 1/00257
See application file for complete search history.

(56) References Cited

U.S. PATENT DOCUMENTS

| 5,949,001 A | 9/1999 | Willeke |
| 10,082,504 B2 | 9/2018 | Nelson et al. |

(Continued)

FOREIGN PATENT DOCUMENTS

| CA | 2678285 A1 | 12/2007 |
| JP | 2005230035 A | 9/2005 |

(Continued)

OTHER PUBLICATIONS

KR20140119495 and translation (Year: 2014).*
(Continued)

*Primary Examiner* — Steven S Anderson, II
(74) *Attorney, Agent, or Firm* — Greer, Burns & Crain, Ltd

(57) ABSTRACT

Allergen exposure chambers (AECs) can be used to produce controlled exposure to allergenic and non-allergenic airborne particles but at present cannot be used for double-blind, placebo-controlled, randomized clinical trials currently required by regulatory authorities. Accordingly, inventive naturalistic exposure chambers (NECs) designed to mimic the environment(s) within which a typical user/individual is exposed are outlined. Further, reproducible controlled allergen dispersal is achieved via robotic allergen aerosolization systems (AAS) which provide automated movement of the allergen source within the AEC as well as structure for acquiring and/or aerosolizing—distributing the allergen. Robotic AAS can be used to acquire only, distribute only, or acquire and distribute. Robotic AAS may also provide aerosolization of two or more allergens in defined manner.

9 Claims, 29 Drawing Sheets

(52) U.S. Cl.
CPC ....... *A61B 2560/02* (2013.01); *A61B 2560/04* (2013.01); *A61G 2203/10* (2013.01)

(56) References Cited

U.S. PATENT DOCUMENTS

| | | |
|---|---|---|
| 10,219,961 B2 | 3/2019 | Patel et al. |
| 2006/0216193 A1 | 9/2006 | Johnson et al. |
| 2009/0145466 A1 | 6/2009 | Fujita et al. |

FOREIGN PATENT DOCUMENTS

| | | | | |
|---|---|---|---|---|
| KR | 20140119495 A | * | 10/2014 | ........ A61M 15/0025 |
| KR | 20190051577 A | * | 5/2019 | |
| WO | WO-03035155 A1 | * | 5/2003 | ........ A61M 15/0025 |
| WO | WO-2007109905 A1 | * | 10/2007 | ............ A61B 5/083 |
| WO | 2017/192497 A1 | | 11/2017 | |

OTHER PUBLICATIONS

KR20190051577 and translation (Year: 2019).*
WO2007109905 and translation (Year: 2007).*
Office Action and Search Report received in Canadian Application No. 3123404 dated Nov. 2, 2022.
Communication received in European Application No. 21183012.0, date Dec. 23, 2021.

* cited by examiner

DISPERSAL AND EXPOSURE CHAMBER SYSTEMS AND METHODS

BACKGROUND

This patent application relates to allergen evaluations and assessments and more particularly to naturalistic exposure chambers and allergen aerosolization systems to provide controlled allergen dispersal/dosing within environments representative of the user's normal exposure scenario.

Allergen exposure chambers (AECs) can be used to produce controlled exposure to allergenic and non-allergenic airborne particles in an enclosed environment, in order to characterize the pathological features of respiratory diseases and inform and accelerate the clinical development of pharmacological treatments and allergen immunotherapy for allergic disease of the respiratory tract (such as allergic rhinitis, allergic conjunctivitis, and allergic asthma).

However, to date AECs cannot be used for the pivotal, double-blind, placebo-controlled, randomized clinical trials currently required by regulatory authorities. Amongst the factors requiring addressing in order to establish AECs at the required levels are aspects including, but not limited, to dimensions and structure of the AEC; AEC staff; air flow, air processing, and operating conditions; particle dispersal; pollen/particle counting; safety and non-contamination measures; procedures for symptom assessments and tested allergens/substances and validation procedures.

Accordingly, it would be beneficial to provide naturalistic exposure chambers (NECs) which are AECs designed to mimic the environment(s) within which a typical user/individual is exposed rather than typical clinical settings. It would be further beneficial for the NECs to be portable allowing their deployment widely with relative low cost to enable enhanced data acquisition, evaluation of regional/territorial/climate factors etc.

It would be further beneficial to provide both AECs and NECs with a reproducible means to aerosolize and distribute the allergen/dander within the AECs/NECs relative to the ad-hoc/haphazard prior art methodologies.

Other aspects and features of the present invention will become apparent to those ordinarily skilled in the art upon review of the following description of specific embodiments of the invention in conjunction with the accompanying figures.

SUMMARY

It is an object of the present invention to mitigate limitations within the prior art relating to allergen evaluations and assessments and more particularly to naturalistic exposure chambers and allergen aerosolization systems to provide controlled allergen dispersal/dosing within environments representative of the user's normal exposure scenario.

In accordance with an embodiment of the invention there is provided a method comprising:
  providing a body housing a motor, an impeller, an exhaust and a controller;
  providing the motor coupled to the impeller for generating an exhaust air flow;
  providing the controller coupled to the motor for adjusting a rate of the exhaust air flow exhausted through the exhaust; and
  providing an exhaust allergen dispenser (EAD) assembly, coupled to the exhaust, containing an allergen; wherein
  the allergen is distributed within an environment through the allergen in the EAD assembly being exhausted from the EAD assembly by the exhaust air flow.

In accordance with an embodiment of the invention there is provided a system comprising:
  a body housing a motor, an impeller, an exhaust and a controller;
  the motor coupled to the impeller for generating an exhaust air flow;
  the controller coupled to the motor for adjusting a rate of the exhaust air flow exhausted through the exhaust; and
  an exhaust allergen dispenser (EAD) assembly, coupled to the exhaust, containing an allergen; wherein
  the allergen is distributed within an environment through the allergen in the EAD assembly being exhausted from the EAD assembly by the exhaust air flow.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
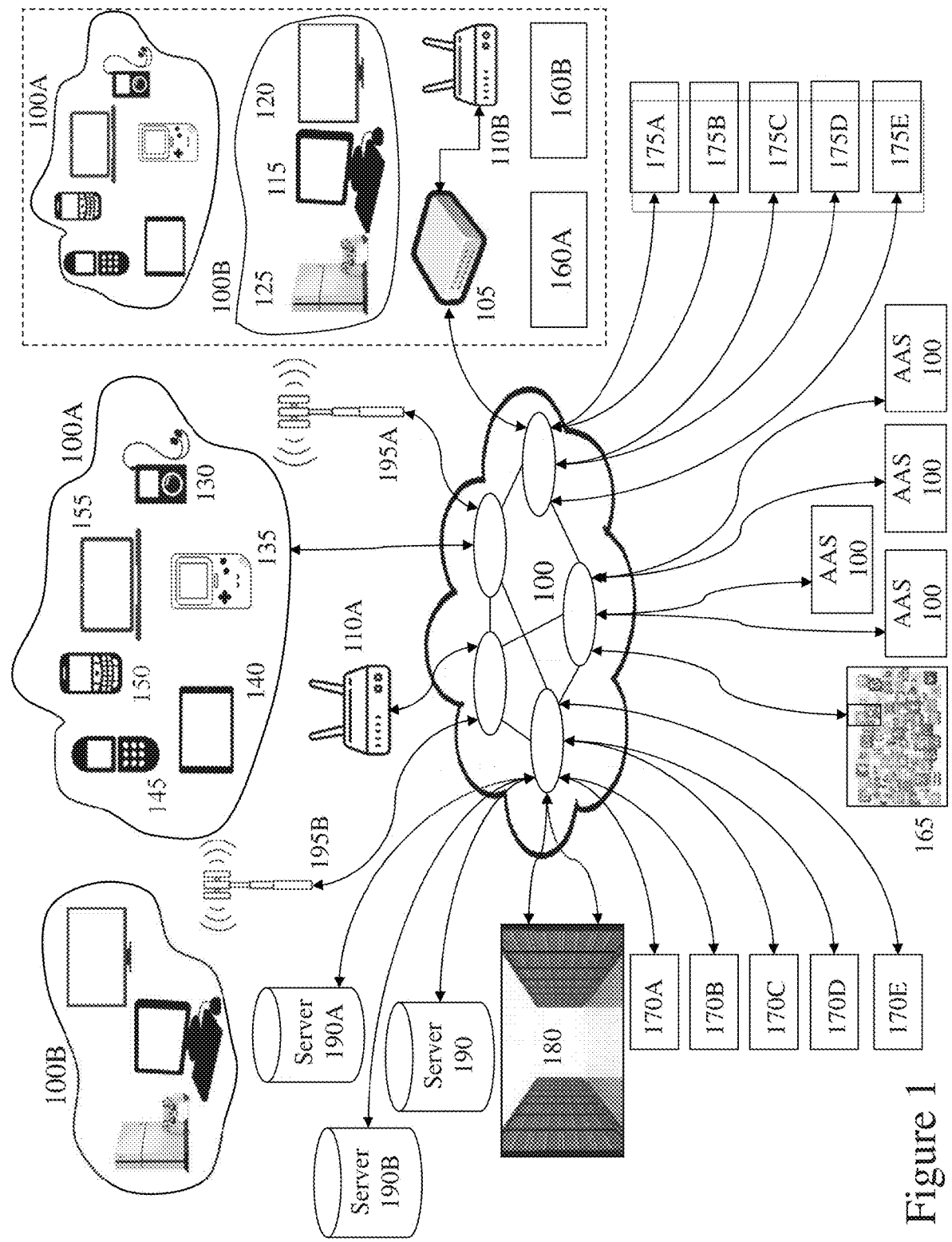
FIG. 1 depicts an exemplary network environment within which configurable electrical devices according to and supporting embodiments of the invention may be deployed and operate.

The present invention is directed to allergen evaluations and assessments and more particularly to naturalistic exposure chambers and allergen aerosolization systems to provide controlled allergen dispersal/dosing within environments representative of the user's normal exposure scenario.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List of file formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

An "artificial intelligence system" (referred to hereafter as artificial intelligence, AI) as used herein, and throughout disclosure, refers to machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

An "allergen" as used herein, and throughout the disclosure, refers to a material, e.g. a microscopic material, which can trigger an allergic reaction within a user. This allergen may include, but not be limited to, dander, which typically refers to material shed from the body of humans and other materials that have fur, hair, or feathers within this specification is employed to mean any microscopic material capable of being aerosolized and distributed which may or may not trigger an allergic reaction within an individual, user, animal exposed temporarily or over extended periods to the aerosolized dander. An allergen within this broader content may include organic material(s), inorganic material(s), powder(s), droplet(s), mist(s), airborne particle, and pollen.

"Fed d 1" as referred to herein refers to a secretoglobin protein that, in cats, is encoded by the CH1 (chain 1/Fel d 1-A) and CH2 (chain 2/Fel d 1-B) genes. Among cats, Fel d 1 is produced largely in their saliva and by the sebaceous glands located in their skin. It is the primary allergen present on cats and kittens and causes an Immunoglobulin G (IgG) or Immunoglobulin E (IgE) reaction in sensitive humans (either as an allergic or asthmatic response).

A "chamber" as used herein, and throughout this disclosure, refers to an environment within which embodiments of the invention can be disposed/employed to establish allergen response(s) by one or more users. A chamber may include, but not be limited to, a temporary enclosure or structure installed within an indoor or outdoor environment, a permanent enclosure or structure, a room which can be closed off from one or more other rooms it is connected to, an environment under positive pressure relative to its surroundings, a series of rooms, a house, a factory, a retail environment, a dedicated test environment, and a temporary test environment.

"Aerosolization" as used herein, and throughout this disclosure, refers to a process or act of dispersing a physical substance comprising particles small and light enough to be carried by a gas, e.g. air, into an aerosol.

An "aerosol" as used herein, and throughout this disclosure, refers to a suspension of fine solid particles or liquid droplets in air or another gas.

Referring to FIG. 1 there is depicted a Network 100 within which embodiments of the invention may be employed supporting Naturalistic Exposure Chambers (NECs) and/or Allergen Aerosolization System (AASs) Systems, Applications and Platforms (NEC-AAS-SAPS) according to embodiments of the invention. As shown, first and second user groups 100A and 100B respectively interface to a telecommunications Network 100. Within the representative telecommunication architecture, a remote central exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B respectively. Also connected to the Network 100 are first and second Wi-Fi nodes 110A and 110B, the latter of which being coupled to Network 100 via router 105. Second Wi-Fi node 110B is associated with commercial service provider 160, e.g. UnitedHealthcare Group, comprising other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as shown provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the Network 100 are Social Networks (SOCNETS) 165, first and second service providers 170A and 170B respectively, first and second third party service providers 170C and 170D respectively, and a user 170E. Also connected to the Network 100 are first and second enterprises 175A and 175B respectively, first and second organizations 175C and 175D respectively, and a government entity 175E. Also depicted first and second servers 190A and 190B may host according to embodiments of the inventions multiple services associated with a provider of contact management systems and contact management applications/platforms (NEC-AAS-SAPs); a provider of a SOCNET or Social Media (SOME) exploiting NEC-AAS-SAP features; a provider of a SOCNET and/or SOME not exploiting NEC-AAS-SAP features; a provider of services to PEDS and/or FEDS; a provider of one or more aspects of wired and/or wireless communications; an Enterprise 160 such as UnitedHealthcare Group (a provider of healthcare insurance) exploiting NEC-AAS-SAP features; license databases; content databases; image databases; content libraries; customer databases; websites; and software applications for download to or access by FEDs and/or PEDs exploiting and/or hosting NEC-AAS-SAP features. First and second primary content servers 190A and 190B may also host for example other Internet services such as a search engine, financial services, third party applications and other Internet based services.

Also depicted in FIG. 1 are Allergen Aerosolization Systems (AASs) 100 according to embodiments of the invention such as described and depicted below in respect of FIGS. 3 to 28. As depicted in FIG. 1 the AASs 100 communicate directly to the Network 100. The AASs 100 may communicate to the Network 100 through one or more wireless or wired interfaces included those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, a user may exploit a PED and/or FED within an Enterprise 160, for example, and access one of the first or second primary content servers 190A and 190B respectively to perform an operation such as accessing/downloading an application which provides NEC-AAS-SAP features according to embodiments of the invention; execute an application already installed providing NEC-AAS-SAP features; execute a web based application providing NEC-AAS-SAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A. It would also be evident that a user may, via exploiting Network 100 communicate via telephone, fax, email, SMS, social media, etc.

Figure 2:
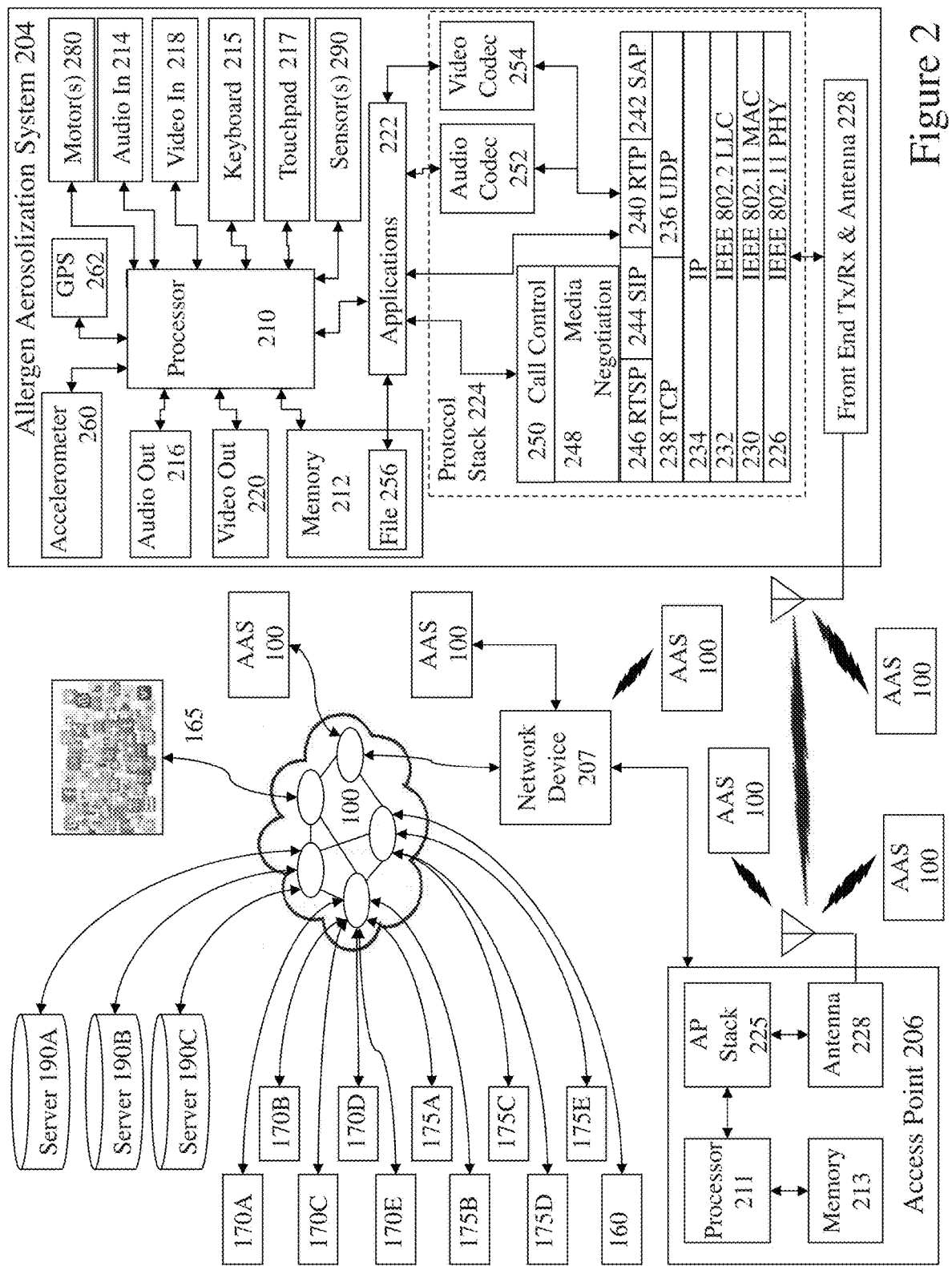
FIG. 2 depicts an exemplary wireless portable electronic device supporting communications to a network such as depicted in FIG. 1 and configurable electrical devices according to and supporting embodiments of the invention.
Figure 3:
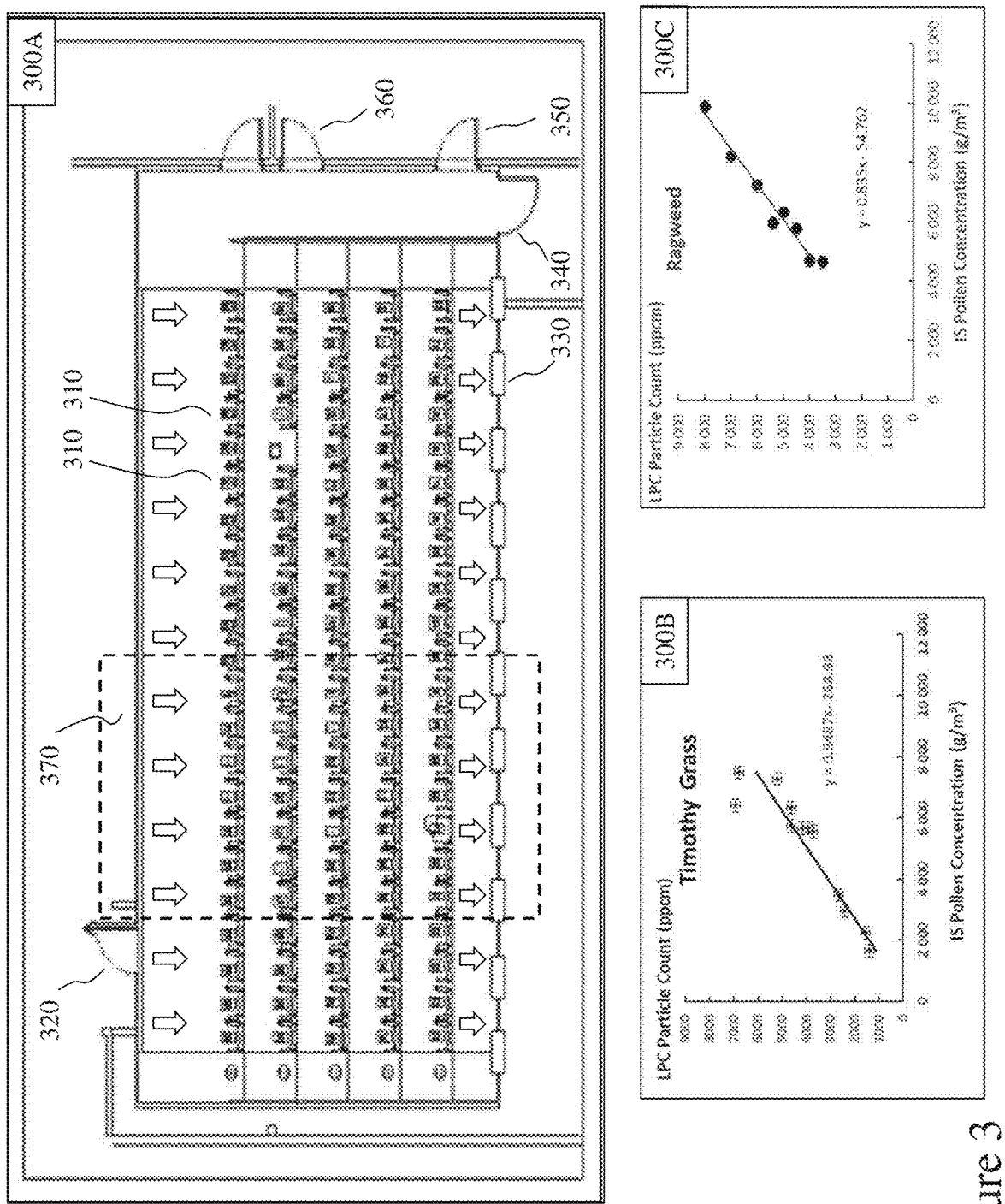
FIG. 3 depicts an exemplary allergen exposure chamber (AEC) according to an embodiment of the invention and/or within which embodiments of the invention can operate together with particle counts showing that these are strongly and linearly correlated over a wide range of concentrations.
Figure 4:
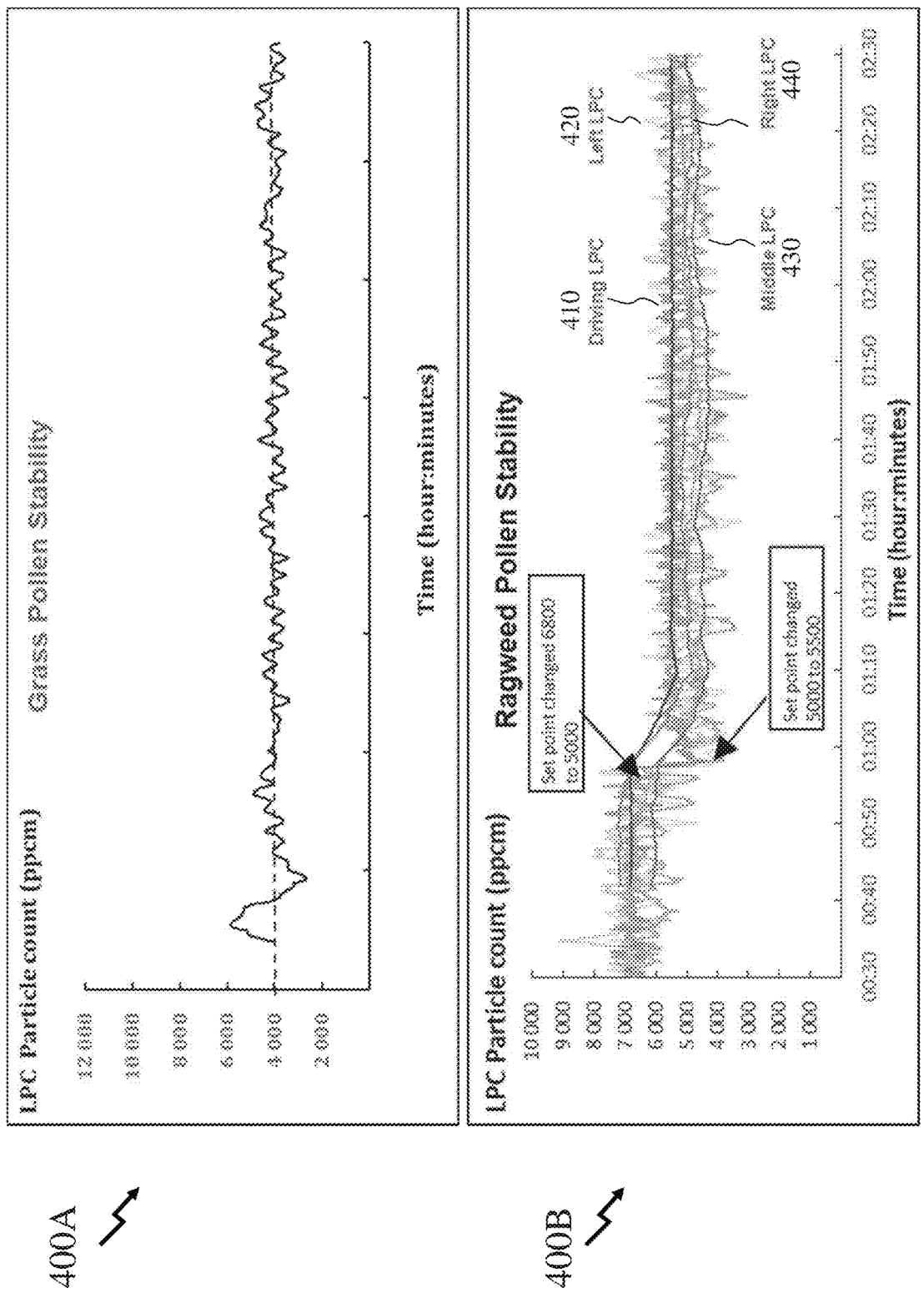
FIG. 4 depicts pollen particle counts over extended periods of time with and without set-point corrections within an AEC according to an embodiment of the invention.

Now referring to FIG. 2 there is depicted an Allergen Aerosolization System 204 and network access point 207 supporting NEC-AAS-SAP features according to embodiments of the invention. AAS 204 may, for example, be a PED and/or FED and may include additional elements above and beyond those described and depicted. Also depicted within the AAS 204 is the protocol architecture as part of a simplified functional diagram of a system 200 that includes an AAS 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to Network 100 and therein Social Networks (SOCNETS) 165, first and second service providers 170A and 170B respectively, first and second third party service providers 170C and 170D respectively, a user 170E, first and second enterprises 175A and 175B respectively, first and second organizations 175C and 175D respectively, and a government entity 175E.

The AAS 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

AAS 204 may include an audio input element 214, for example a microphone, and an audio output element 216, for example, a speaker, coupled to any of processors 210. AAS 204 may include a video input element 218, for example, a video camera or camera, and a video output element 220, for example an LCD display, coupled to any of processors 210. AAS 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the AAS 204. The one or more applications 222 that are typically stored in memory 212 and are executable by any combination of processors 210. AAS 204 also includes accelerometer 260 providing three-dimensional motion input to the process 210 and GPS 262 which provides geographical location information to processor 210.

AAS 204 is also depicted as comprising one or more Motors 280 which may include, but not be limited to, motors controlling motion of the AAS 204 within its environment, motors controlling acquisition and/or distribution of an allergen or allergens. The one or more Motors 280 may be associated with an acquisition and/or dispersal method such that discretely or in combination with one or more allergen extractors, such as Allergen Extractors 630 in FIG. 6, to provide suction to draw the acquired allergens into the AAS 204 for storage and/or dispersal. Within other embodiments of the invention the one or more Motors 280 may be associated with a system that provides solely acquisition of the allergen or allergens. Within other embodiments of the invention the one or more Motors 280 may be associated with a system that provides solely distribution of the allergen or allergens such that the AAS 204 does not acquire the allergen or allergens through one or more allergen extractors but through its being loaded with the allergen or allergens. The one or more Motors 280 would be coupled to one or more impellers in order to provide an airflow for acquisition and/or dispersal method.

The AAS 204 may control the one or more Motors 280 through the Processor 210 using metadata, data, and/or applications stored within Memory 212 or these may be controlled via data/instructions provided to the AAS 204 through the network connection(s) such as from Enterprise 160, first and second service providers 170A and 170B respectively, first and second third party service providers 170C and 170D respectively, a user 170E, first and second enterprises 175A and 175B respectively, first and second organizations 175C and 175D respectively, and a government entity 175E.

Further, the AAS 204 as depicted comprises one or more Sensors 290 which may acquire additional information which is transmitted from the AAS 204 together with data relating to its motion, location, etc. Such data may be pulled from the AAS 204 or pushed from the AAS 204 to one or more of the Enterprise 160, first and second service providers 170A and 170B respectively, first and second third party service providers 170C and 170D respectively, a user 170E, first and second enterprises 175A and 175B respectively, first and second organizations 175C and 175D respectively, and a government entity 175E. Optionally, a Sensor 290 may include a Laser Particle counter (LPC) and/or a Rotational Impact Samplers (RIS) or other methods of determining particle counts/particle size etc.

Accordingly, an AAS 204 may acquire data from the Sensors 290, Motor(s) 280, Accelerometer 260, GPS 262 etc. and communicate this via Front-End Tx/Rx & Antenna 228 wirelessly to an Access Point 206 associated with the AEC (e.g. NEC AEC or portable AEC as described below in respect of embodiments of the invention). This data may be stored in association with data relating to the individual(s) tested, location, time, date, etc. to provide data for analysis, verification, compliance etc.

AAS 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the AAS 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by AAS 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted in FIG. 2 are Allergen Aerosolization Systems (AASs) 100 according to embodiments of the invention such as described and depicted below. As depicted in FIG. 2 an AASs 100 may communicate directly to the Network 100. Other AASs 100 may communicate to the Network Device 207, Access Point 206, and AAS 204. Some AASs 100 may communicate to other AASs 100 directly. Within FIG. 2 the AASs 100 coupled to the Network 100 and Network Device 207 communicate via wired interfaces. The AASs 100 coupled to the Access Point 206 and AAS 204 communicate via wireless interfaces. Each AAS 100 may communicate to another electronic device, e.g. Access Point 206, AAS 204 and Network Device 207, or a network, e.g. Network 100. Each AAS 100 may support one or more wireless or wired interfaces including those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Optionally, rather than wired and/or wireless communication interfaces devices may exploit other communication interfaces such as optical communication interfaces and/or satellite communications interfaces. Optical communications interfaces may support Ethernet, Gigabit Ethernet, SONET, Synchronous Digital Hierarchy (SDH) etc.

Referring to FIG. 3 there is depicted an Allergen Exposure Chamber 300A representative of typical fixed AECs within the prior art. AEC 300A being the Red Maple Trial™ Allergen Challenge Theatre™ located in Ottawa, Canada which measures 16 metres by 8 metres (approximately 52 feet by 26 feet), giving a total surface area of 133 square meters (approximately 1,430 square feet). The ceiling height in the chamber is 2.2 meters (approximately 7 feet). The walls and floor were designed and fabricated using cleanroom material that is repellent to particles for ease-of-cleaning. The adjustable theatre-like seating 310 is arranged in elevated rows to optimize allergen exposure to the subjects faces. The chamber consists of four independent quadrants, each of which has a dedicated allergen/particle supply. For consistency, the same allergen is always used in the same quadrant. The largest quadrant (Zone 370 in FIG. 3) has a 40-person capacity (five rows of eight seats). Observation windows enable the theatre to be monitored from an adjacent control room during trials. First and second Doors 320 and 340 provide ingress/egress points for the trial subjects. In extended trials catering can be provided through Catering Entrance 350 whilst Emergency Exit 360 allows for rapid introduction of a gurney, wheelchair, etc. in the event of a requirement to move an individual partially or fully incapacitated. A series of Air Returns 330 draw air into and out of the AEC 300A through high-efficiency particulate air (HEPA) filters such that the direction of air flow within the AEC 300A is across the AEC 300A from top to bottom within the Figure.

Air is blown into the AEC 300A through selected vanes, not depicted, at one side of the room wherein the air flows across the AEC 300A before exiting through the Air Returns 330. In an exemplary embodiment the air flow is towards the faces of the participants within the seats. Accordingly, the air exits through the Air Returns 330, is HEPA-filtered to remove the dander, allergen, pollen, and is recirculated after the addition of new dander particles. The AEC 300A is maintained at a slight positive pressure, to ensure that no other allergens enter the chamber during testing.

Within the AEC 300A particle concentrations are measured using a number of Laser Optical Particle counters (LPCs) and a number of Rotational Impact Samplers (RISs). The output from one LPC (the driving LPC) is fed back to a programmable logic controller, which adjusts (if required) the amount of pollen injected into the airflow and thus maintains the target level in the AEC 300A. In validation studies, a linear relationship between LPC-derived and RIS-derived pollen counts over a wide range of concentrations were obtained for grass pollen (first graph 300B in FIG. 3) where the regression coefficient of determination was $R^2=0.85$ and ragweed pollens (second graph 300C in FIG. 3) which had a regression coefficient of determination of $R^2=0.93$.

Typically, a physician and study coordinator are in the Allergen Challenge Theatre during challenges. Staff and study participants wear protective clothing which is put on in an air lock outside the entrance to the AEC 300A. Additional coordinators and engineers remain in the control room, observe through a window and communicate by two-way radio. An emergency area is located just outside the AEC 300A and is equipped with beds, a crash cart and oxygen.

As noted above, technical validation of the AEC 300A was performed for *Phleum pratense* grass pollen (timothy grass) and *Ambrosia artemisiifolia* pollen (ragweed). The ragweed and grass pollen concentrations were found to be (ii) stable over several hours as evident from first and second graphs 400A and 400B in FIG. 4. Further, the AEC 300A is responsive to changes in the pollen setpoint as evident from the set-point change induced within the measurements depicted in second graph 400B. The achievable levels of the allergens being sufficient to induce symptoms within participants.

Within the AEC 300A one LPC 410 was designated as the driving LPC and the results measured with three other LPCs, left LPC 420, middle LPC 430 and right LPC 440. The distribution of *Phleum pratense* in a single zone of the AEC 300A is presented below in Table 1 whilst those for *Ambrosia artemisiifolia* pollen in a quadrant of the AEC 300A are given in Table 2. The percentage deviations being 13% for ragweed and 17% for timothy grass. These measurements being performed with RISs in Table 1 and LPCs in Table 2.

TABLE 1

Distribution of Phleum pratense grass pollen in a single zone of AEC 300A

| Position | Row 1 | Row 2 | Row 3 | Row 4 |
|---|---|---|---|---|
| Right RIS | 4368 (867) | | | |
| Middle RIS | 3363 (492) | 5039 (585) | 4302 (236) | 3333 (338) |
| Left RIS | 3597 (176) | | | |

TABLE 2

Distribution of Ambrosia artemisiifolia ragweed pollen in a single zone of AEC 300A

| Position | Row 1 | Row 2 | Row 3 | Row 4 | Row 5 | Mean (SD) |
|---|---|---|---|---|---|---|
| Right LPC | 4554 | 5166 | 4802 | 4238 | 3625 | 4477 (523) |
| Middle LPC | 4947 | 5430 | 5508 | 4622 | 3988 | 4899 (559) |
| Left LPC | 5401 | 4804 | 4229 | 3852 | 4163 | 4490 (550) |
| Mean (SD) | 4967 (346) | 5133 (257) | 4846 (523) | 4237 (315) | 3925 (224) | |
| Overall mean (SD) all LPC data points | | | | | | 4622 (578) |

Figure 5:
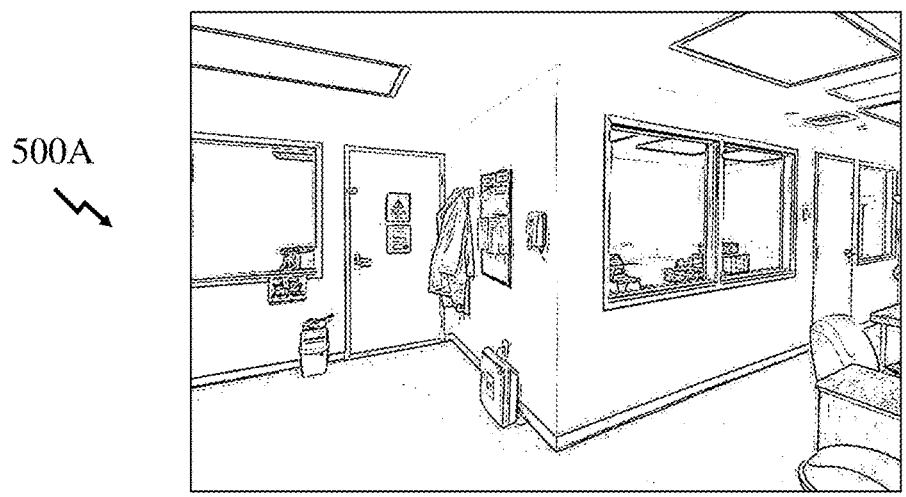
FIG. 5 depicts a naturalistic exposure chamber (NEC) AEC from the outside according to an embodiment of the invention together with a layout schematic.
Figure 5:
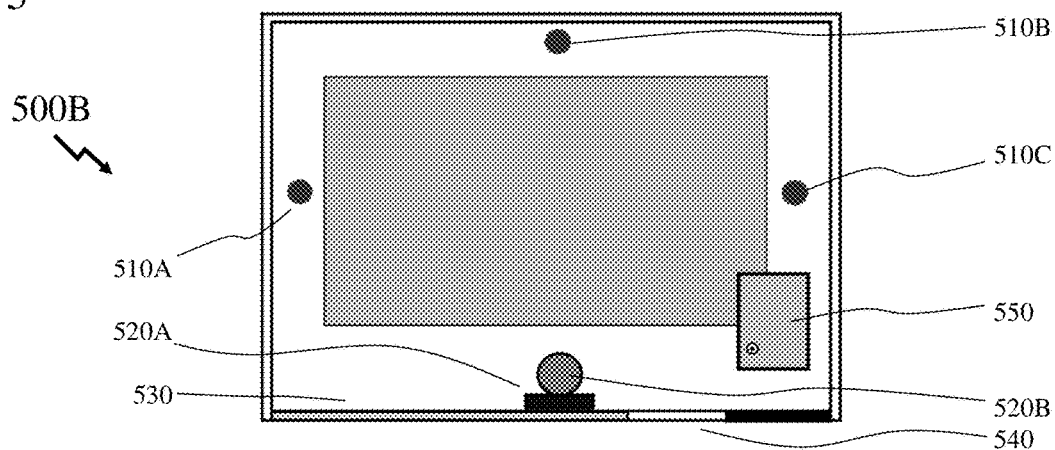

Now referring to FIG. 5 there is depicted a Naturalistic Exposure Chamber (NEC) allergen exposure chamber (AEC) operated by Red Maple Trials™. The NEC as depicted in first image 500A in FIG. 5 consists of two cat rooms, one 2.8 meters by 2.1 meters (approximately 9 feet by 7 feet) and the other 5.8 meters by 2.6 meters (approximately 19 feet by 8.5 feet). An observation area with windows provides views into the cat rooms and an air-lock entrance controls access. Two cats live in the rooms permanently to replicate a home environment. The smaller chamber is on the left with the larger chamber on the right.

Within the NEC depicted in first image 500A in FIG. 5 air flow is controlled by a dedicated HVAC system, which supplies HEPA filtered air. The NEC is ventilated with 10 air changes per minute with the exhaust air ventilated to the building exterior. The ventilation can be reduced during challenges. In the NEC, allergen comes from the two cats that are resident in the cat rooms. Allergen levels in the NEC are measured using 3 sampling pumps (firs to third pumps 510A, 510B and 510C in second image 500B in FIG. 5). These are coupled to 25 mm glass fibre filters located about 0.9 meters (approximately 3 feet) apart along the long axis of the room and 1.2 meters (approximately 4 feet) above the floor. Subjects also wear a sampling pump. Fel d 1 is eluted from the filters and measured by enzyme-linked immunosorbent assay (ELISA). During challenges in the NEC, a physician and study coordinator are present in the antechamber, observe the subjects through the window and communicate by wireless headsets phones.

Figure 6:
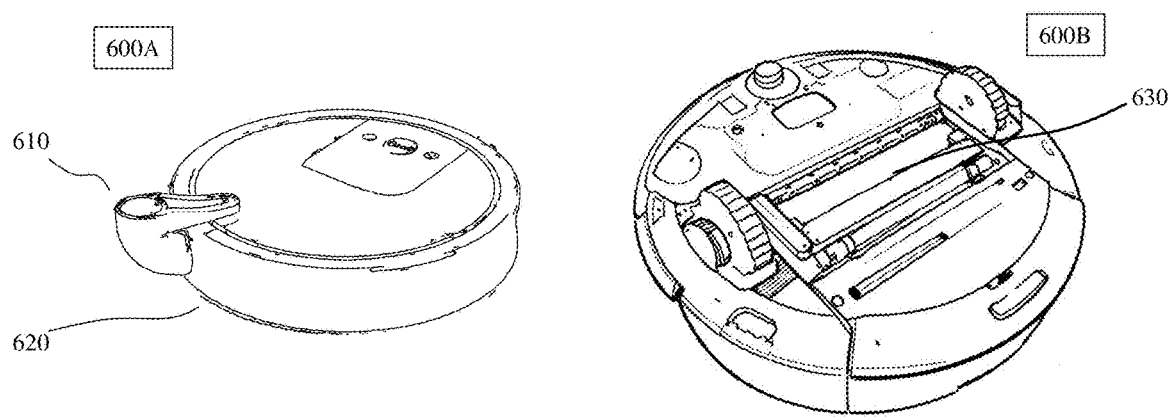
FIG. 6 depicts a robotic allergen aerosolization system (robotic AAS) according to an embodiment of the invention.

Accordingly, within the NEC AEC and as described below in respect of portable AECs it would be beneficial to provide an allergen aerosolization system (AAS) without the requirements for complex air handlers, air filtration system, HEPA filter, etc. but providing reproducible programmable allergen dispersal. Accordingly, the inventors have established as depicted in FIG. 6 in first and second images 600A and 600B a robotic AAS. This being depicted in second image 500B in FIG. 5 and robotic AAS 520B with a Docking Station 520A. Also depicted within the NEC in second image 500B in FIG. 5 are a Doorway 540, Viewing Window 530 and Particle Size Distribution Analyser (PSDA) 550.

The motivation to establish the robotic AAS arises, from the consideration of cat allergens although the motivations are common to a wide range of allergens, due to limitations within prior art approaches. For example, the development of new therapies for cat allergies is complicated by differences in patients' exposure to cats. Some patients choose to avoid cats while others keep cats at home and treat their symptoms. As a result, field studies where patients report their daily symptoms while receiving an experimental medication or placebo are confounded by variable and intermittent exposure and can fail. Environmental Exposure Units (EEUs) such as AEC 300A generate controlled levels of airborne allergen and thereby reduce the variability in exposure seen in field studies. Those developed for cat allergen either aerosolize liquid allergen extract or the dander and hair that is naturally shed from live cats. While the latter provides a more natural allergen exposure than with liquid extract (nebulized monodisperse liquid droplets likely deposit in the respiratory tract differently than irregular dander flakes and absorption of the antigen is likely faster), live cat exposure chambers which traditionally aerosolize cat allergen by shaking cats' bedding have highly variable allergen levels during individual exposures and across different exposures.

For example, in a study evaluating the efficacy of a pharmaceutical solution for preventing acute bronchoconstriction, Fel d 1 exposure ranged between 0 (undetectable) and 22,631 ng/m3 when subjects were exposed by blanket shaking at one of three centres. The variability associated with blanket shaking can arise from several factors including variability in cat shedding and salivary Fel d 1 production, inconsistent allergen accumulation on bedding, differences in blanket materials and their retention of dander, human differences in performing blanket shaking, and the intermittent nature of aerosolization. Accordingly, a robotic AAS would provide an EEU that provides exposure to natural cat dander, with allergen concentrations comparable to those found in homes with cats, but with a high degree of control and repeatability.

First and second images 600A and 600B respectively depict upper and lower perspective views of the robotic AAS according to an embodiment of the invention. The Robotic AAS depicted can perform both allergen acquisition and allergen aerosolization. The robotic AAS as depicted in first image 600A has a Vent 610 disposed on the side of the Body 620 for aerosolizing the allergen into the surrounding environment where the air flow for the aerosolization is provided by a motor/impeller assembly within the robotic AAS. An exemplary embodiment of the invention provides for a run time of 2 hours from a single battery charge and remote operability as well as programmatic based control. Optionally, the Vent 610 may be disposed in another position relative to the Body 620. Optionally, two or more Vents 610 may be provided. Optionally, Vent 610 may be supported on a tube/frame to place the exit of the Vent 610 at a predetermined height from the floor upon which the robotic AAS moves. Optionally, one or more attachments of specific geometry or geometries may be connected to the Vent 610, such as nozzles or diffusers etc. to change the diffusion characteristics of the allergen at the exhaust.

Referring to second image 600B the robotic AAS has a pair of Allergen Extractors 630 disposed on its bottom surface, for example a pair of silicon brushes. During operation of the robotic AAS in an acquisition mode rather than a dispersal mode the robotic AAS is operated such that the pair of Allergen Extractors 630 rotate to induce removal of debris, allergens, dander etc. from the surface upon which the robotic AAS is operating. By applying a filtering system within the robotic AAS then the passage of fine allergen-carrying particulates is allowed into a chamber or chambers of the robotic AAS, such as described and depicted below in respect of FIGS. 23-25 and 26 but the passage of larger debris is blocked. See for example the mesh depicted within FIG. 20 and the screens within the exhaust fitting/dispersion assembly (EFDA), also referred to as an Exhaust Allergen Dispenser (EAD), described and depicted in respect of FIGS. 21-23.

The operation of the Allergen Extractors 630 may or may not be included within a dispersion or dispersal mode depending on the target level of dispersion. As discussed below in respect of FIG. 2800B their concurrent operation in the dispersion or dispersal mode results in higher levels of allergen dispersal.

Within an embodiment of the invention the robotic AAS employs pulse width modulation (PWM) power regulation to adjust the speed of a fan within the robotic AAS and hence the suction generated. Within an embodiment of the invention the PWM control allows for operation from a maximum approximately 1700 Pa suction pressure to approximately 250 Pa. Additionally, the robotic AAS has drive wheels 640 coupled to a motor or motors allowing the robotic AAS to move forward, reverse, turn etc. such that the robotic AAS can move throughout the chamber, e.g. NEC AEC or field deployable AEC for the duration of exposure, aerosolizing the allergen that has either been placed within its allergen reservoir or that has been naturally collected on the floor.

Optionally, the robotic AAS may respond to various boundaries to define a particular area of operation. These boundaries may include, for example, physical stoppers, virtual walls defined by a beam the robotic AAS detects as it crosses it (e.g. infra-red beam), triangulation based upon, for example, wireless beacons, or the edges of a raised platform, although it would be evident that within other embodiments of the invention the area could be bounded by other means.

Tests were initially performed within the small NEC AEC to establish configuration and dispersion settings in order to achieve even spatial distribution and temporal stability of Fel d 1 within a target range of 40-100 ng/m$^3$. In addition to measuring Fel d 1 air concentrations throughout the room, particle size distributions and concentrations were measured to characterize the aerosolized particulate and to facilitate more rapid evaluation of results compared to Fel d 1 measurement (which takes several days to process following experiments). Dander aerosolization in the small chamber was tested for various vacuum suction levels, and with and without installation of the allergen extractors. Experiments were also performed aerosolizing dander using a standard blanket shaking protocol (shaking the cats' bedding), to compare particle distributions to the automated vacuum aerosolization. Dander aerosolization was then tested within the larger chamber and scaled using two vacuums simultaneously. In both the small and large chambers repeatability was demonstrated under the optimized settings.

Prior to each experiment, the cats and their furniture were removed from the small NEC AEC. Air sampling pumps were mounted 1.2 m (approximately 4 feet) above the floor on stands (approximately at the height of a patient's face while sitting), at the midpoint of the left, back and right walls of the small room, denoted as the "left", "centre" and "right" measurement locations 510A, 510B and 510C in second image 500B in FIG. 5, respectively. During aerosolization, air samples were collected every 20 minutes at 5 L/min onto glass fiber filters (25 mm diameter, 2 μm pore size. Fel d 1 deposited on the filters was quantified afterwards using enzyme-linked immunosorbent assay (ELISA). Air Fel d 1 levels were calculated from the volume of filtered air sampled and the amount of Fel d 1 on the filter and expressed as ng/m3.

Counts and sizes of aerosolized dander particles were measured using a time-of-flight particle size distribution (PSD) analyzer and air particle concentrations were expressed as particles/m3 based on the volume of air sampled and sampling time. The PSD analyzer was positioned near the right air sampling pump as shown in second image 500B in FIG. 5. Every three minutes during aerosolization air was sampled for two minutes at 1 L/min. Due to the irregular shape of the allergen-carrying particles (namely dander flakes, hairs and fibers), an equivalent aerodynamic diameter D was used to characterize the particles: defined as the diameter of a spherical water particle settling with the same terminal velocity as the particle. Baseline measurements of particle count and Fel d 1 were measured at the start of each test, prior to turning on the vacuum.

The robotic AAS was turned on at t=0 min and was run for 15-minute on/5-minute off intervals for 60 or 120 minutes, depending on the specific experimental procedure. During the 5-minute off intervals, the vacuum was returned to its charging station at the front of the room. This on/off duty cycle was selected based on preliminary experiments, to maintain airborne allergen levels and prolong battery life. The air sampling pumps and the particle analyzer also initiated at t=0.

Dander aerosolization was also performed in the small chamber by shaking the cat's bedding for comparison to the vacuum method. Four tests were performed for each method and average particle counts were compared. In each test, a blanket having been used as the cats' primary bedding for four weeks was shaken vigorously for two minutes, followed by 15 minutes of settling. This was then repeated a second time. Particle measurements and air sampling were initiated at the start of shaking.

Results were evaluated for spatial distribution and temporal stability of Fel d 1 levels generated by the vacuum model with and without allergen extractors and for various suction levels. Repeatability was demonstrated under optimized settings.

Figure 7:
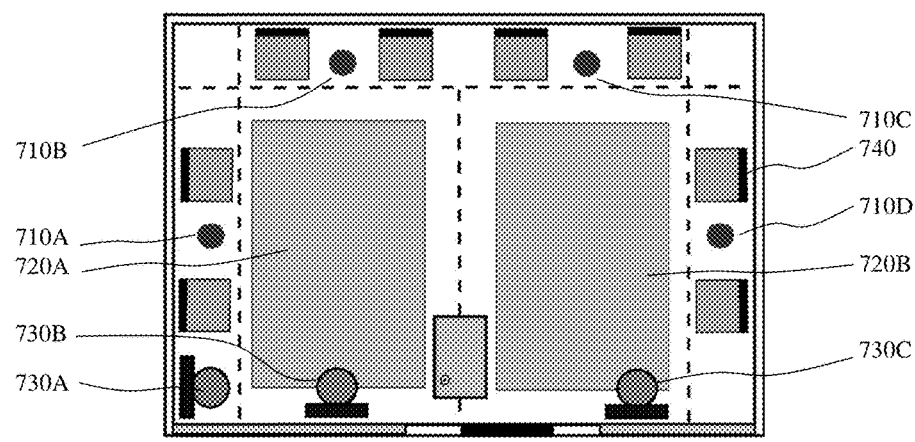
FIG. 7 depicts a large room NEC AEC according to an embodiment of the invention.

Once validated in the smaller of the two chambers (3 subject capacity), the aerosolization system was scaled and tested for the larger chamber (8 subject capacity). In this room, as depicted in FIG. 7, two carpets (identical to a rug in the small chamber) were installed. During this testing period, the same two cats that lived in the small room, resided in this larger room. Again, the cats and their furniture were removed prior to aerosolization tests. Eight chairs were then set up around the periphery of the room (FIG. 7). Sampling pumps were hung from the ceiling 1.2 meters above the floor (approximately 4 feet) at the locations 710A to 710D respectively. During each 2-hour test, the robotic AAS moved about on each carpet (one robotic AAS per carpet), while a third was positioned on a battery charging station. Operating vacuums ran for 15-minute on/5-minute off intervals, charging while off. At scheduled times, the third robotic AAS replaced one of the two operating robotic AAS which would then be docked to re-charge. This rotation schedule extended the maximum duration of tests, which was otherwise limited by the robotic AAS battery capacity.

FIG. 7 depicts a schematic of the large NEC AEC showing the locations of the first to fourth Pump 710A to 710D respectively, first to third robotic AAS 730A to 730C respectively, first and second carpets 720A and 720B respectively. Chairs 740 were also provided for the users to sit on.

Virtual walls were used to control the regions where each robotic AAS operated. Fans were placed in the front left and right corners of the room 1.0 m (approximately 3 feet) above the floor, facing towards the back center of the room. This was found to promote a more uniform allergen distribution throughout the room.

Carpet allergen levels were monitored regularly as part of all NEC experiments, measured regions of the carpets were passed over systematically using sampling pumps and the collected allergen quantified with ELISA, and a threshold Fel d 1 level (in ng/m2) had been identified to inform whether allergen supplementation was necessary in advance of a test. To account for the larger space of the large chamber, compared to the small chamber, being loaded with allergen from the same source (two cats), carpet allergen levels were supplemented by shaking cat bedding several days in advance of testing, and by adding additional milled cat hair samples directly to the carpets. In the case of the latter, weighed portions of 10 or 20 grams of milled cat hair were rubbed through a sieve evenly over the carpet area.

It would be evident that as a robotic AAS may "extract" and "disperse" that the robotic AAS may rove over the same area picking up allergens and re-dispersing them.

During 2-hr aerosolization tests, air samples were collected at the four pump locations for 30-minute sampling periods (4 L/min), resulting in four time points for each location to assess the temporal variation. Results were evaluated for spatial distribution and temporal stability of Fel d 1 levels. Repeatability was demonstrated under optimized settings.

The number of particles obtained using the time-of-flight method, NPSD were normalized by the volume of sampled air to obtain a particle concentration as given by Equation (1) where $Q_{PSD}$ represents the sampling flowrate of the particle size distribution analyzer and is is the sampling time. Fel d 1 was measured at locations x, and time intervals t, as given by Equations (2) to (5) where upper values are for small room and lower values for large room.

$$\text{Count/m}^3 = N_{PSD}/(Q_{PSD} \times t_s) \quad (1)$$

$$x_i = \begin{cases} [\text{left, centre, right}] \\ [\text{left, left-centre, right-centre, right}] \end{cases} \quad (2)$$

$$i = 1 \ldots M \quad (3)$$

where M is the number of locations (3—small room, 4—large room)

$$t_j = \begin{cases} [10, 30, 50, 70, 90, 110] \\ [15, 45, 75, 105] \end{cases} \quad (4)$$

$j = 1 \ldots N$, where $N$ is the number of time intervals in the test. (5)

The values of times t are the mid-points of the air sampling period, referenced from the start of the aerosolization in minutes. The mass of Fel d 1 mf in ng, collected on each filter and determined by ELISA was normalized by the volume of sampled air to obtain the air concentration as given by Equation (6) where $Q_{pump}$ is the sampling pump suction flow rate. Spatial averages of Fel d 1 at each time ti were calculated using Equation (7). Time averages of Fel d 1 at each location xi were calculated using Equation (8) and the room average Fel d 1 was calculated for each test using Equation (9).

$$Fel\ d1(x_i, t_j) = m_f(x_i, t_j)/(Q_{pump} \times t_s) \quad (6)$$

$$\langle Fel\ d1 \rangle_{t_j} = \frac{1}{M}\sum_{i=1}^{M} Fel\ d1(x_i, t_j) \quad (7)$$

$$\langle Fel\ d1 \rangle_{x_i} = \frac{1}{N}\sum_{j=1}^{N} Fel\ d1(x_i, t_j) \quad (8)$$

$$\langle Fel\ d1 \rangle = \frac{1}{N}\sum_{j}^{N} \langle Fel\ d1 \rangle_{t_j} \quad (9)$$

Figure 8:
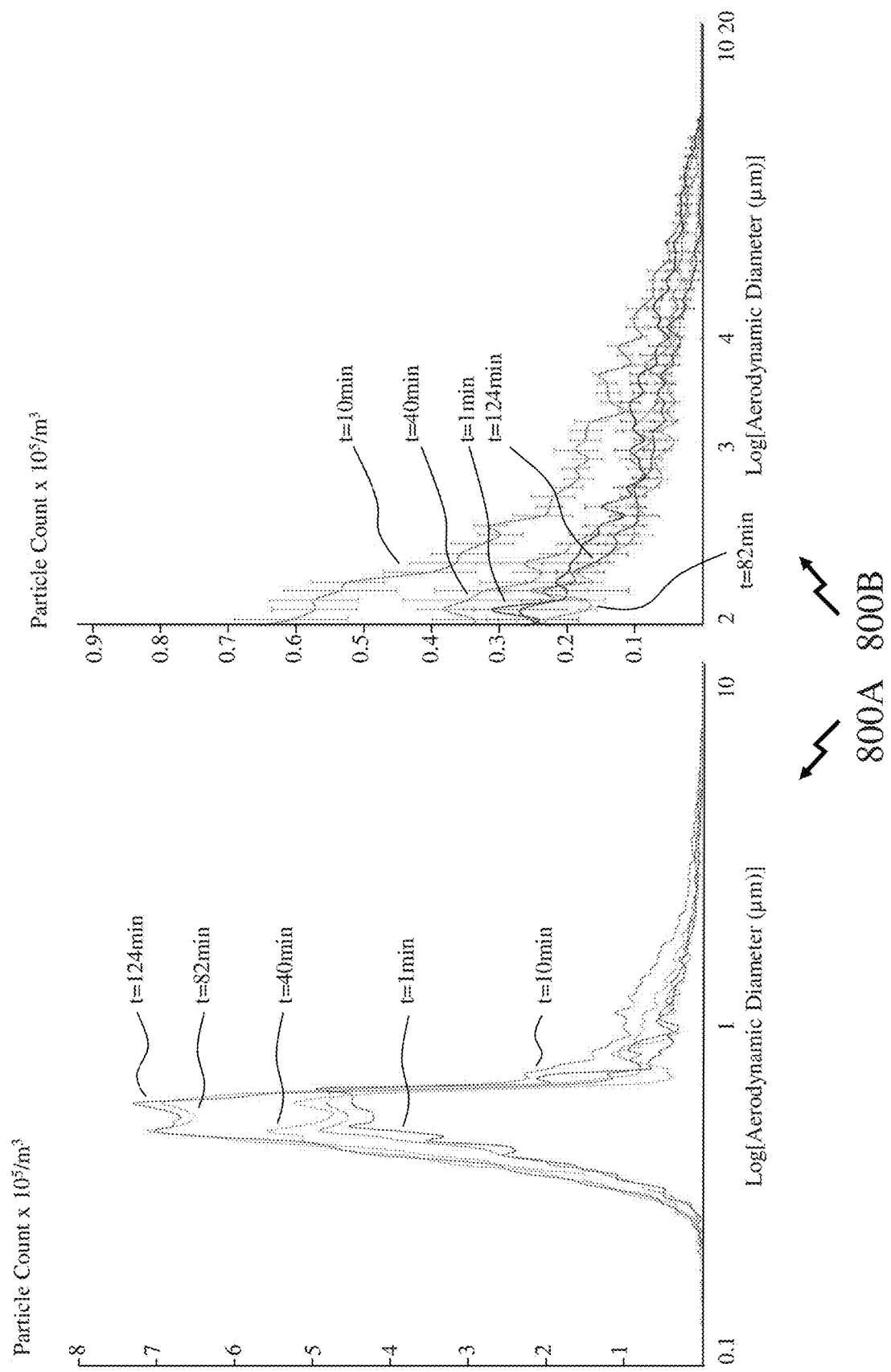
FIG. 8 depicts particle size distributions at various times during a two hour aerosolization test within a small room NEC AEC according to an embodiment of the invention.

The particle size distribution of the cat dander was obtained every 3 minutes (sampling the room for 2 minutes) during and after dispersion to assess the particles' distribution in time. First graph 800A in FIG. 8 shows the particle size distribution as an average of four consecutive tests (performed under the same conditions) for five different time points from the start of aerosolization (t=1 min) until the end of dispersion (t=124 min). Second graph 800B in FIG. 8 focuses on the size distribution of particles with D≥2 μm. These larger particles carry the majority of antigen and are believed to be the most likely to deposit in the respiratory system. The error bars shown in second graph 800B represent the standard error determined from the repeat tests.

At all time-points during dispersion, a peak in particle count occurred for particles at approximately D=0.7 μm (mode); the numbers of these smaller particles increased over the period of aerosolization. High standard errors were observed for the smaller particles (D<2 μm) (not shown). Particles of this size, with settling velocities <0.2 mm/s, are known to remain suspended for long durations (on the order of days). Large day-to-day variations in their numbers were therefore expected. The larger particles (D≥2 μm) (shown in second graph 800B) were detected only during dispersion, and exhibited a smaller day-to-day variation. Having greater mass and higher settling velocities, their motion was more predominantly driven by the robotic AAS aerosolization and gravity, whereas smaller particles were affected by additional factors.

Figure 9:
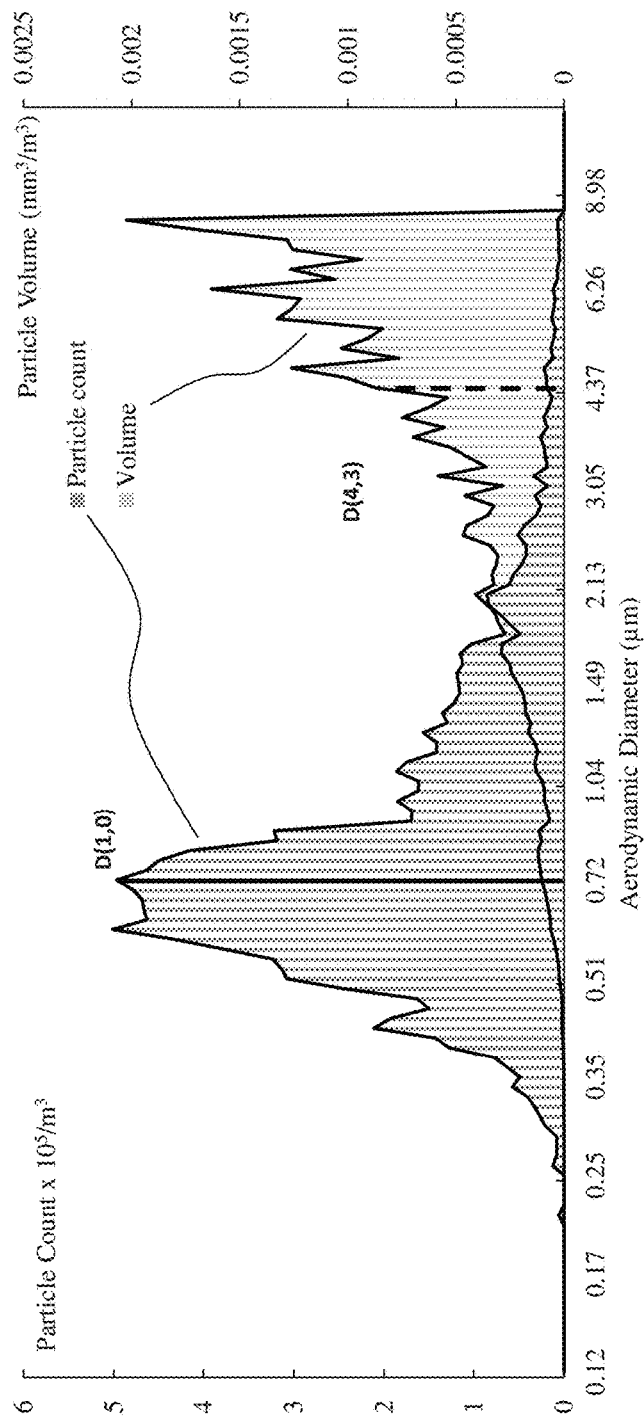
FIG. 9 depicts representative particle size distribution in terms of particle count and particle volume for one of the tests performed at t=13 min within a small NEC AEC according to an embodiment of the invention.

Although small particles were detected in greater numbers, the allergen associated with them is expected to be minimal as these smaller particles represent only a small portion of the bulk sample volume. In FIG. 9, the particle count and associated particle volume are displayed and compared for one of the tests performed (near the start of aerosolization). Clearly, the larger particles, although small in number, represent the largest portion of the bulk sample volume. In terms of the absolute numbers of particles dispersed, the arithmetic mean particle diameter D(1,0) was 0.76 μm; whereas in terms of volume contribution, the volume moment mean diameter D(4,3) was 4.34 μm.

The air concentration of the larger particles (second graph 800B in FIG. 8) reached a maximum 10 minutes after the start of aerosolization, and then gradually decreased in time. This is better illustrated by the cumulative count of particles with D≥2 μm versus aerosolization time (FIG. 11), where the distribution from the robotic AAS is compared to that from the blanket shaking method, each averaged from four tests.

Figure 10:
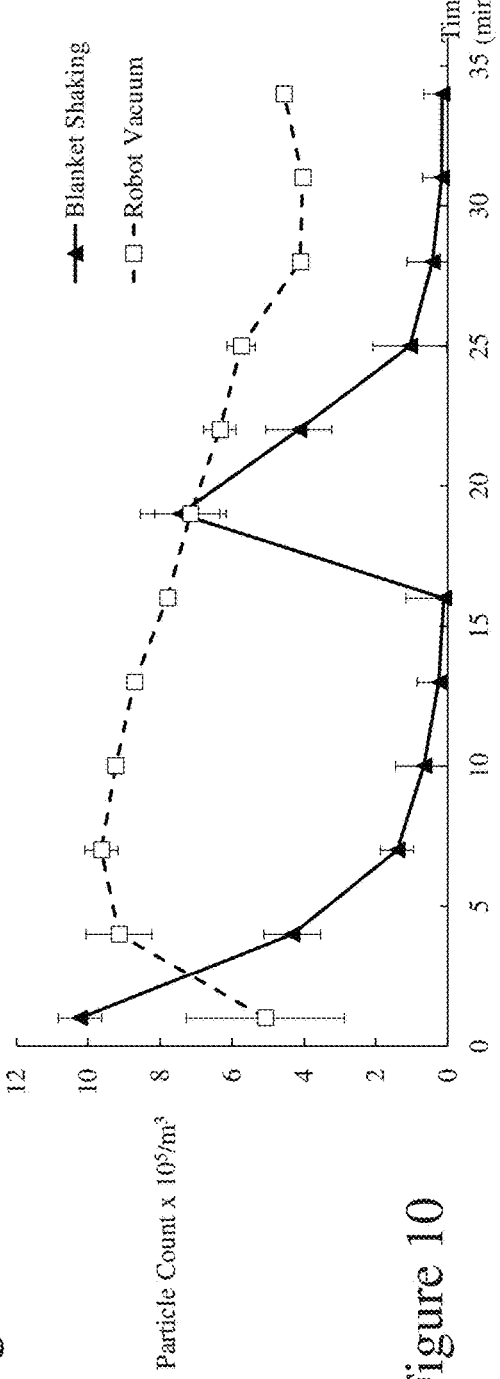
FIG. 10 depicts particle aerosolization via a robotic AAS according to an embodiment of the invention and prior art blanket shaking.

The concentration of large particles increased within the first 10 minutes of robotic AAS aerosolization, then gradually decreased over the remainder of the test period (FIG. 10). Particle concentrations were very high during blanket shaking (t=1 min and t=16 min) but rapidly decreased within 12 minutes after aerosolization, by which time all particles D≥2 μm had settled.

Figure 11:
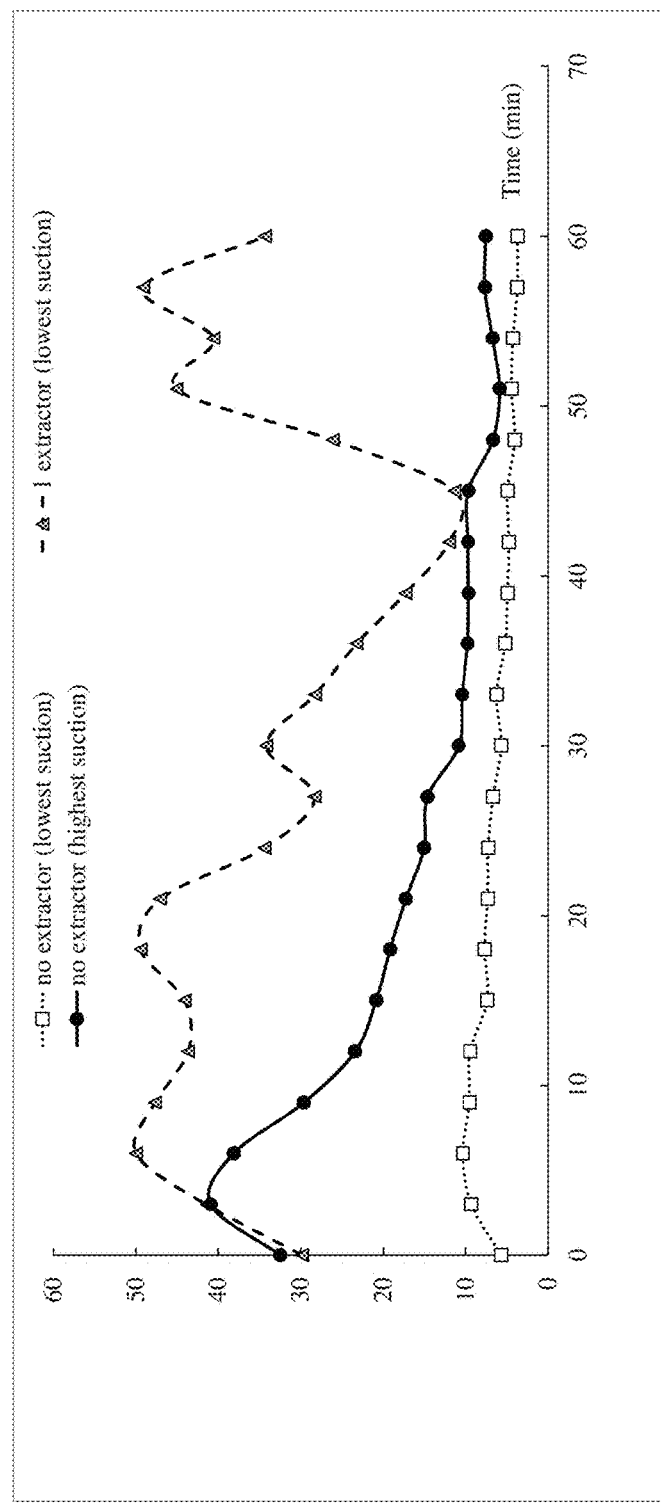
FIG. 11 depicts particle concentrations versus time for a robotic AAS according to embodiments of the invention with and without an allergen extractor.
Figure 12:
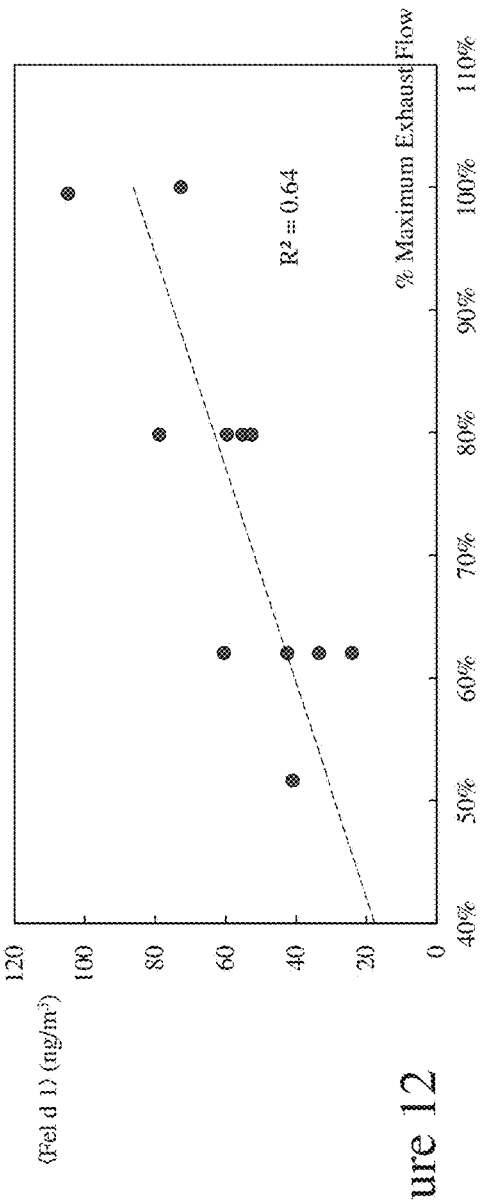
FIG. 12 depicts a test average ⟨Fel d 1⟩ within a small NEC AEC according to an embodiment of the invention employing a robotic AAS according to an embodiment of the invention for varying vacuum suction levels (as percentage of maximum exhaust flow rate), performed without allergen extractors.

The effect of the allergen extractors (second image 600B in FIG. 6) was measured by performing aerosolization tests with and without them installed. FIG. 11 shows the cumulative particle concentrations (D≥2 μm) for tests with and without one extractor. Two tests were performed at the lowest suction setting without extractors and with one extractor. A third test performed at the highest suction setting without extractors is also shown to compare the effect of suction power to allergen extractors.

Even a single allergen extractor resulted in a 5-fold increase in airborne particles, summed over 60 minutes (74×10⁶ vs. 13×10⁶ particles/m3). The extractor had a much greater effect on particle aerosolization than suction level. Without extractors, the highest suction level resulted in 2.6 times more total particles compared to the lowest suction level (35×10⁶ vs. 13×10⁶ particles/m3) (FIG. 11, black dots versus squares). Particle levels were also much more variable using the extractor. A large drop in particle levels at 45 minutes, followed by a rapid rebound at 51 minutes was observed: while unclear as to the cause, this may have been the result of an accumulation of hair or allergen within the robotic AAS that was then dislodged. Comparatively, a continuous, but significant decline in particles was observed at the highest power setting.

Extractors also resulted in significantly higher airborne Fel d 1 levels: At the lowest suction level and using one extractor, ⟨Fel d 1⟩ was found to be 5.8 times greater than the allergen concentration seen with no extractor at the lowest suction level (238 ng/m3 vs. 41 ng/m3, respectively). Again, this was a greater effect than of suction level alone: with no extractors, ⟨Fel d 1⟩ at the highest suction level was found to be 2.6 times higher than the allergen concentration at the lowest suction level (105 ng/m3 vs. 41 ng/m3, respectively). Because the average Fel d 1 concentrations generated when using the extractor(s) exceeded our target range, the subsequent validation proceeded with the extractors removed from the vacuum.

Experiments were performed for a range of vacuum suction levels, adjusted by regulating the voltage to the vacuum. For each of four suction level tests, the exhaust flow rate was calculated from the velocity measured at the centerline of the exhaust flow using a flow anemometer. Experiments were done without the use of debris extractors for suction levels that resulted in 52% (N=1), 62% (N=4), 80% (N=4), and 100% (N=2) of maximum exhaust flow rate. Despite some day-to-day variation in Fel d 1 levels reflected by repeat tests at fixed settings, there was a positive correlation of test-averaged ⟨Fel d 1⟩ for increasing exhaust flow rate, showing that the added power control provides some degree of control over the aerosolized allergen levels. These results being depicted in FIG. 12.

Based on these findings, the settings and configuration to achieve stable allergen levels in our target Fel d 1 range (40-100 ng/m3) were identified as:

15/5 minutes on/off duty cycling;
Operating without installation of allergen extractors; and
Operating at a power reduction that resulted in 80% of maximum exhaust flow.

Figure 13:
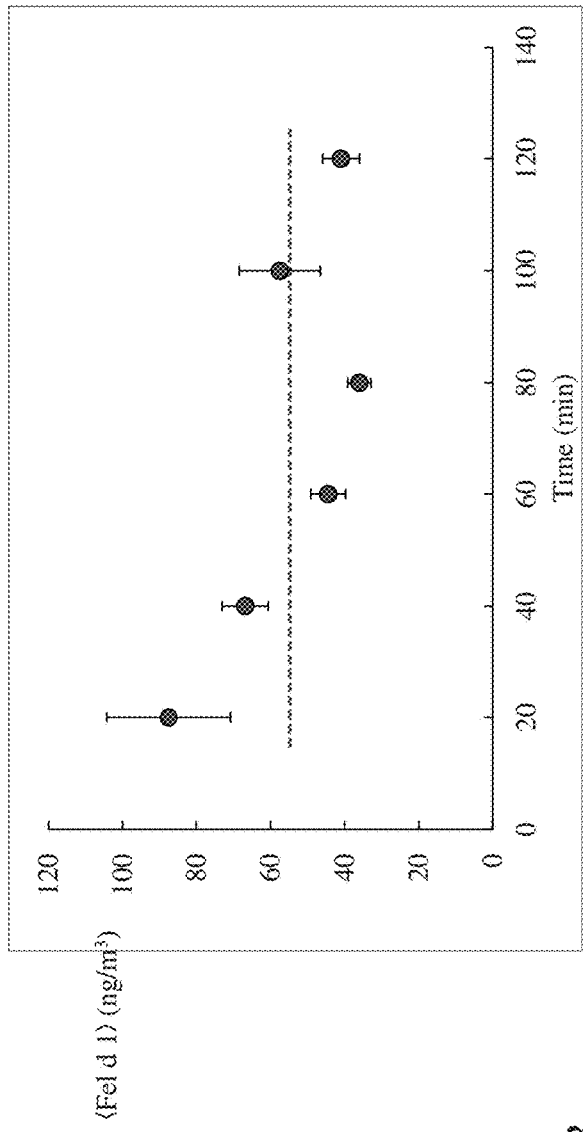
FIGS. 13 and 14 depict test averages 〈Fel d 1〉 within a small NEC AEC according to an embodiment of the invention employing a robotic AAS according to an embodiment of the invention.
Figure 14:
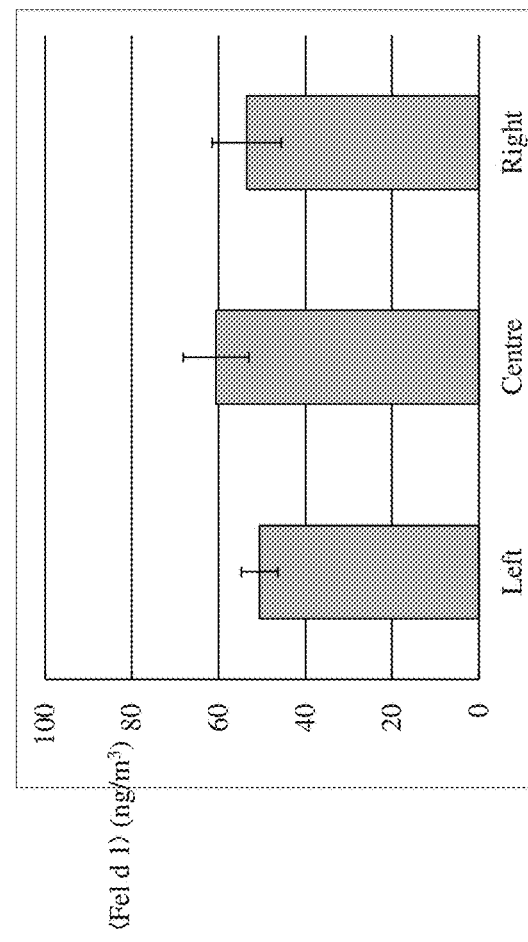

Four repeat tests were performed at these settings, showing good temporal stability of allergen levels over 2 hours (FIG. 13) and even distribution across the room (FIG. 14). The average ⟨Fel d1⟩ from the four tests was 55 (±9 SD) ng/m3.

Figure 15:
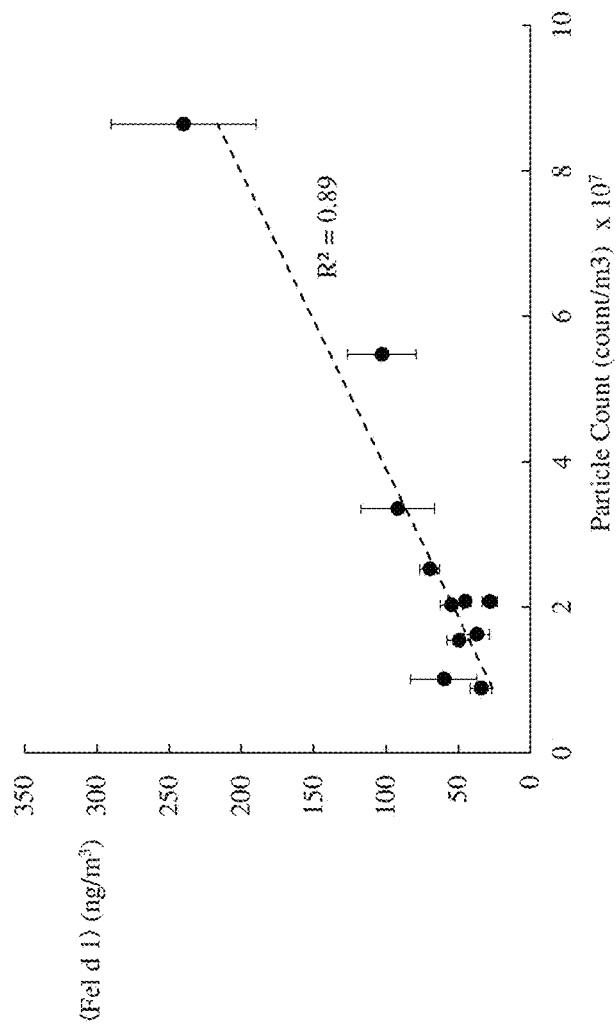
FIG. 15 depicts the test average 〈Fel d 1〉 within a small NEC AEC according to an embodiment of the invention employing a AAS according to an embodiment of the invention as a function of the cumulative count of particles with aerodynamic diameters larger than 2 μm.

Averaged ⟨Fel d 1⟩ from tests performed using the robotic AAS in the small NEC are shown in FIG. 15 as a function of their corresponding cumulative particle count for particles with D≥2 μm. The error bars indicate the standard error associated with the Fel d 1 measurements. A good correlation between the average ⟨Fel d 1⟩ and the particle count was found (coefficient of determination $R^2$=0.89), especially for ⟨Fel d 1⟩ greater than 50 ng/m3. This shows that particle concentration may be used as an immediate indicator of airborne Fel d 1, enabling a rapid response to adjust levels for better control (rather than waiting a day or longer for completion of ELISA testing).

The large room validation procedure was adapted based on the results of the small room validation. Adjustments were made to account for the larger room volume (2.5 times larger). A series of tests were done to identify the optimal test settings (power level and dander supplementation) to achieve Fel d 1 levels in the target range.

Figure 16:
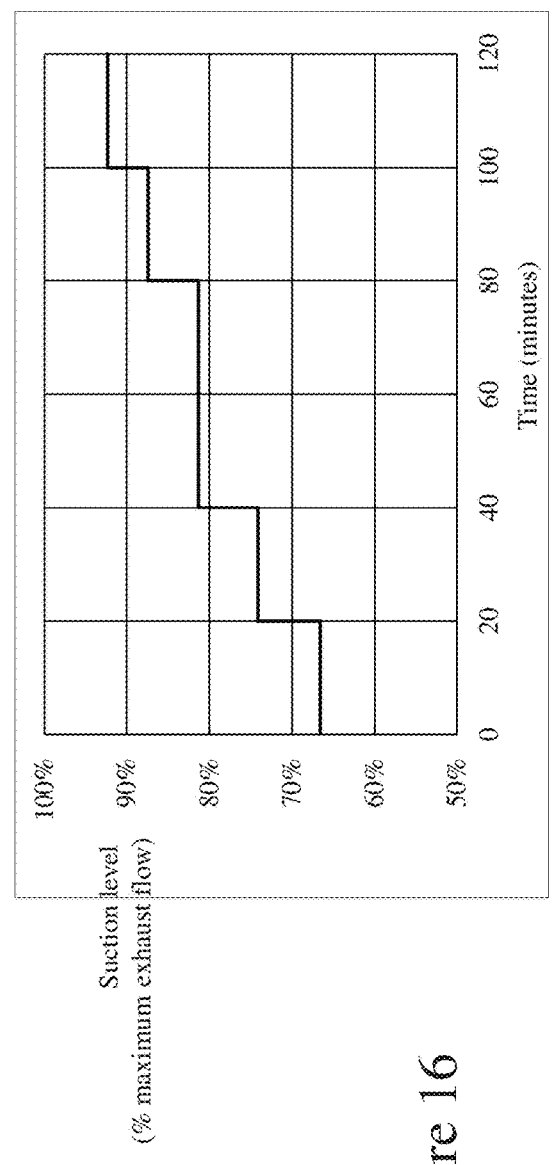
FIG. 16 depicts exemplary staged suction level settings for an AAS according to an embodiment of the invention during a 2-hr dander aerosolization within a large NEC AEC according to an embodiment of the invention.
Figure 17:
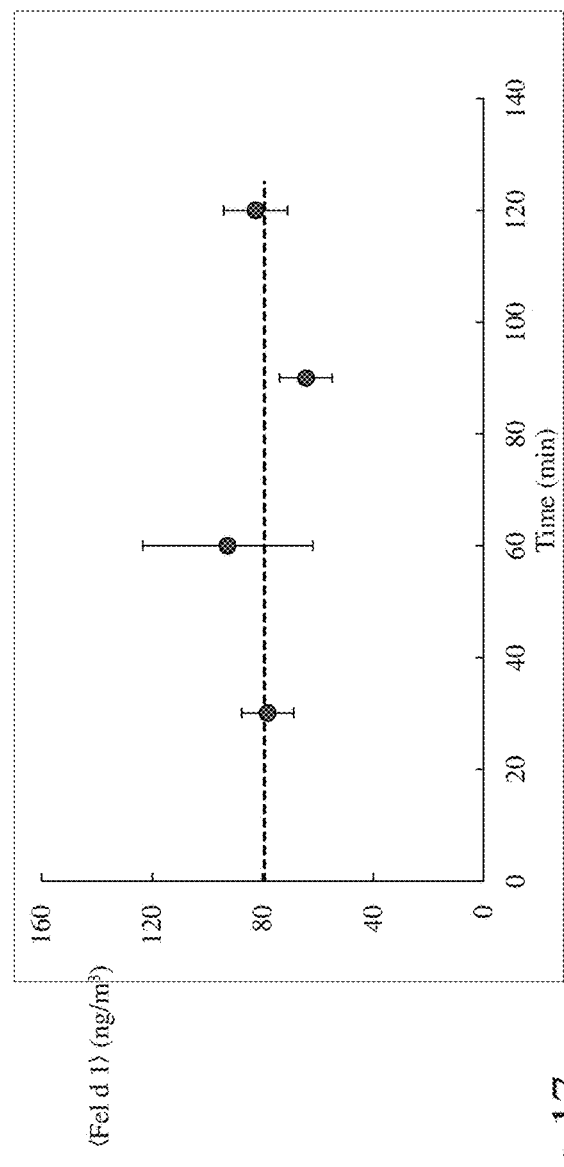
FIGS. 17 and 18 depicts the time and spatial distributions 〈Fel d1〉 for experiments within a large NEC AEC according to an embodiment of the invention employing a robotic AAS according to an embodiment of the invention.
Figure 18:
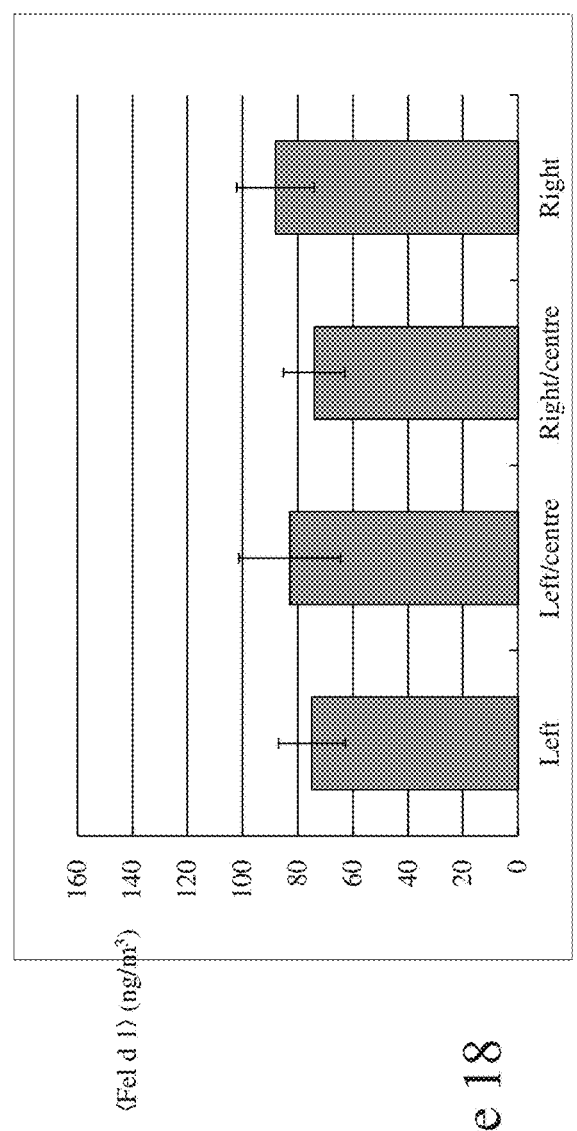

In the small room validation, a gradual decline of Fel d 1 and particle concentration in time had been observed (FIGS. 7 and 10). To correct for this, the protocol for the large room tests was adapted to increase the vacuum suction level gradually over the course of aerosolization. The staged suction levels chosen to achieve stable Fel d 1 levels over two hours, following iterative testing, are illustrated in FIG. 16.

The settings and configuration that were identified through iterative testing as optimal for the large room aerosolization were:

Two vacuums operating simultaneously in adjacent areas of the room.
Carpet supplementation with milled cat hair and/or shaking cat bedding in advance of each test.
Operating without installation of debris extractors.
15/5 minutes on/off duty cycling.
Operating at a staged suction power level schedule starting at 67% of max suction flow rate at t=0 minutes and gradually increasing to 92% max suction flow rate at t=100 minutes, according to FIG. 16.

Test mean ⟨Fel d 1⟩ from five repeat tests under these settings was 79 (±30 SD) ng/m3. The results demonstrated excellent temporal stability of the allergen levels (FIG. 17) with 19% maximum deviation from the mean. There was no systematic spatial gradient observed within the room (FIG. 18) and the maximum spatial deviation from the average of five tests was 11% from the mean.

It is evident from the results above that the inventors have successfully employed particle counts and Fel d 1 measurements to configure a robotic AAS to generate consistent dander levels over time and space in two rooms. To characterize particle behaviour during aerosolization (FIG. 8 and FIG. 10), a threshold of 2 μm was used to differentiate small and large particles. This threshold is consistent with the pore size of the glass fiber filters (2 μm) used for air sampling. Furthermore, it is these larger particles that will deposit in the upper and lower airways and are thus most significant for eliciting allergic symptoms in an EEU. At all measurement times during aerosolization, the mode of the average particle size distribution was approximately D=0.7 μm (FIG. 8). The majority of particles in this size range were likely non-Fel d 1 carrying particles such as fine dust. The air concentrations of these smaller particles varied significantly between tests but were not correlated with aerosolized Fel d 1 (data not shown). Particles sized between 1 and 2 μm were also numerous, as shown by FIG. 8. To evaluate whether these particles contributed significantly to Fel d 1 levels, duplicate air samples were collected using both 1 μm and 2 μm pore size glass fiber filters and Fel d 1 was assessed by ELISA. No significant difference was found in the allergen concentration between the 1 μm and 2 μm pore size filters (data not shown), suggesting that particles in this size range did not significantly contribute to aerosolized allergen levels.

It is important to note that the diameters obtained using the particle size distribution analyzer (PSD) are aerodynamic particle diameters and do not accurately reflect the dimensions of the irregularly shaped dander particles (skin flakes). Therefore, discrepancies between the particle counts and Fel d 1 concentrations were expected. For example, the time-of-flight method for particle detection has been shown to underestimate the true aerodynamic diameter of non-spherical particles (with a dynamic shape factor of 1.19) by 20% to 27%. Still, a correlation was obtained (FIG. 15) that can be used to coarsely predict Fel d 1 levels, particularly for high levels of dispersion.

The particle density of the aerosolized particulate was assumed to be uniformly $10^3$ kg/m3 and was used in the time of flight calculation to estimate aerodynamic equivalent particle diameter. However, within the literature research with respect to the removal rate of the dispersed particles (dust) suggests lower settling velocities experimentally than expected theoretically, which suggests that the density of the dispersed particles may be less than $10^3$ kg/m3. If the assumption of density was in fact incorrect, i.e. overestimated, then this may have resulted in an underestimate of particle diameters.

Although the aerosolization method developed here produces more consistent and controlled allergen dispersion compared to traditional blanket shaking methods, the allergen levels within the NEC were also subject to some degree of natural variation. This is largely attributed to variation in cat shedding and Fel d 1 production, both of which have been shown to be widely variable between cats, by season, and from day to day. Accordingly, within other embodiments of the invention it may be beneficial to employ a first set of robotic AAS to acquire the allergens, consolidate the acquired material, and disperse the acquired material to a second set of robotic AAS such that the robotic AAS have consistent quantities of allergens for dispersal. Optionally, the allergens may be acquired by other means rather than a robotic AAS. However, one benefit of the robotic AAS is that these may be employed within an individual's home or other environment to acquire specific allergens to test the individual's response to the allergens at higher levels and/or effectiveness of pharmaceutical treatment(s) etc. Air humidity levels may also affect dander production, as well as its aerosolization. The relative humidity in the NEC varied between 38-68% during these experiments.

Allergen aerosolization within an NEC AEC of portable AEC relies on dander accumulation on the floor surface, e.g. carpet, rug, etc. For this reason, frequency and rigor of carpet cleaning must be carefully regulated and balanced (e.g. to provide a sanitary environment for the resident cats within the NEC) while avoiding depletion of the allergen source. These carpet allergen levels can be monitored regularly to identify the need for dander supplementation, which (when required) was achieved by shaking the cats' blankets in advance of testing (adding variable quantities of Fel d 1) or, for the large NEC only, by evenly distributing weighed amounts of milled cat hair onto the carpets. The timings and degree of cleaning, the level and location of cat activity, natural variations in the cats' allergen production, and changes in human foot traffic are all likely to contribute to the variability in Fel d 1 measured in repeat tests performed on different days.

It was initially expected that all large airborne particulate would fall back to the floor, becoming available for recirculation in a closed system; however, a decline in particle and Fel d 1 concentrations was observed over the course of aerosolization when operating at constant suction level (FIG. 11), especially under high dispersion settings, indicating that there were system losses. This is consistent with the findings in the literature that allergens in a carpet become depleted after a few cycles of resuspension activities (5-minute disturbance using a vacuum with no filter). In the present case, particulates may also have been deposited onto surfaces where it was unavailable for recirculation such as the walls, ceiling or furniture. Furthermore, accumulation of particulate, especially cat hair, within the vacuum's dust bin likely impeded the flow of subsequent particulate. Periodically unblocking this accumulation was found to alleviate the observed decline of airborne allergen. In the large room validation, allergen levels were kept steady in time by incrementally increasing the suction level over the course of the 2-hour tests. Such a protocol may be defined for the smaller NEC as well as the portable AEC etc.

The presented results show that dander aerosolization using the robot vacuum generates much more stable allergen and particle levels in time compared with the blanket shaking method which was used by other investigators. It has been previously shown that for blanket shaking, due to the rapid settling of particulate after shaking, repeated intermittent shaking is required to maintain adequate allergen levels during a one-hour exposure. This frequent intervention by the investigator (typically every 15 minutes) is impractical for clinical study protocols and increases allergen spread outside of the exposure room due to frequent door openings. The remote operability of the robotic AAS affords minimal intervention from the operator as compared to blanket shaking.

The maintenance of Fel d 1 levels within a narrow range that mimics levels found in homes etc. permits evaluation of new medications in a controlled but homelike setting. The use of allergen extracts in exposure chambers permits the dispersion of spherical particles with a narrow size range and better control over the antigen levels. However, this is not the natural exposure and may alter the response profile. Furthermore, while we measured the major cat allergen Fel d 1, other cat antigens have been identified and may contribute to an individual patient's allergic response (e.g. Fel d 4). While extracts used in EECs normally only contain Fel d 1, patients in the NEC are exposed to all types of cat allergen as they would be in a home environment, hence a more realistic representation of the patient's experience during an allergic reaction is achieved.

Figure 19:
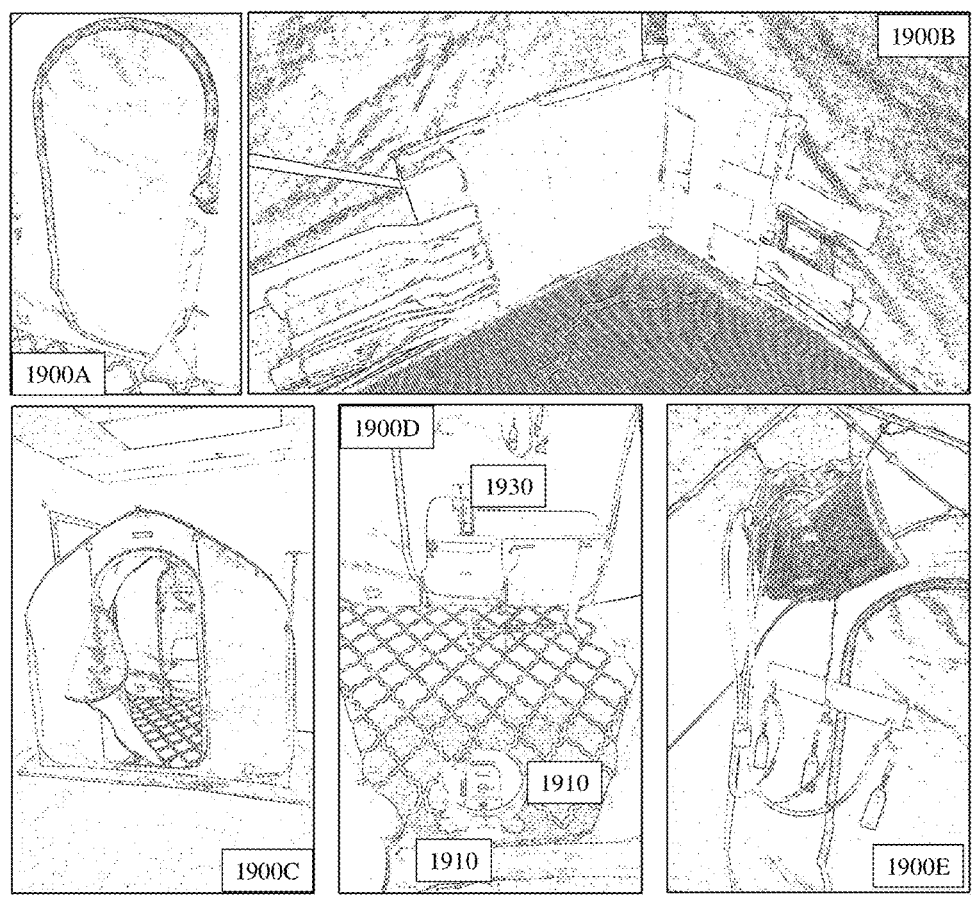
FIG. 19 depicts photographs of a field deployable AEC for use in conjunction with an AAS according to an embodiment of the invention.

Now referring to FIG. 19 there are depicted first to fifth images 1900A to 1900E of a field deployable AEC according to an embodiment of the invention. The field deployable AEC (FD-AEC) is based upon a portable plastic structure, e.g. a greenhouse tent or a tent for example, which may be self-erecting or erectable. The FD-AEC provides a self-contained AEC which can be readily transported, deployed and employed to acquire data rather than relying upon dedicated fixed location AECs for example. First to fifth image 1900A to 1900E depicting:

First image 1900A depicting a rear door to the FD-AEC closed and secured (the FD-AEC depicted having front and rear doors but another FD-AEC may have only a single door);

Second image 1900B depicting a barrier and cable port structure to allow power/cables etc. to be run in/out of the FD-AEC as well as providing a physical barrier for the robotic AAS to detect rather than a distortable flexible wall of the FD-AEC;

Third image 1900C depicting the FD-AEC within an indoor environment with entry open;

Fourth image 1900D depicting an inner view of the FD-AEC showing the robotic AAS 1910, robotic AAS Charging Station 1920, table, carpet, virtual wall and handheld LPC 1930; and Fifth image 1900E depicting air sampling pumps in position with filter cartridges attached.

Whilst the description above with respect to robotic AAS and FD-AEC has been described and presented with respect to internal environments and/or extracting allergens from carpets and other surfaces it would be evident that the methods, systems and processes described and depicted may be similarly applied within external environments and/or with external surfaces.

The following sections describe an exemplary sequence of actions/steps with respect to the set-up and operation of the exemplary FD-AEC depicted in FIG. 19. Within the following description a greenhouse tent (tent) was employed as the external housing the steps, and milled cat hair was used as an exemplary allergen source. Many of the steps described being specific to the SpringHouse™ tent and allergen source employed which it would be evident of one of skill in the art would vary according to the FD-AEC housing/shell and embodiment of the invention employed. The exemplary FD-AEC in FIG. 19 being approximately 1.8 meters×1.8 meters×2 meters (6 feet×6 feet by 6 feet 6 inches high).

Chamber Setup

Set up the tent.

With the tent in position, tape the outside and inside tent flaps to the floor along the entire edge to create a seal.

Zip both entrances closed. Hereafter, all personnel must be gowned and chamber entrances should remain closed whenever possible.

Lay out the carpet (cut to size) on the floor inside the chamber.

Unzip the front- and rear-entrance mesh screen doors, roll them up and secure them to the side using the hook-and-loop straps where the door connects to the tent wall.

Duct-tape cardboard barriers into the inside front-left and front-right corners of the tent near the floor (to prevent the robotic AAS from becoming stuck on the tent cross-poles).

Set up the sampling pump mount (as seen in FIG. 19 fifth image 1900E; sampling pumps and cartridges to be added later):
- Tie a mesh bag to the tent ceiling crossbar.
- Hang a cardboard sampling cartridge support using wire so the sampling cartridges will hang approximately 48 in. from the floor, in a line parallel to the front and rear tent walls.
- Attach three sampling pump tubes to the cardboard support using their attached alligator clips: one each on the right, middle, and left of the support (their ends will dangle for now, and will be attached to sampling pumps later).

Place a subject chair against the middle of the rear tent wall (see fourth image 1900D in FIG. 19).

Place an overbed table over the chair, with its front-facing edge approximately aligned (vertically) with the front edge of the chair (see fourth image 1900D in FIG. 19).
- Adjust the table height to be ~30 in. from the floor (measured from the tabletop; the lowest position for the table).
- Lock the table casters if possible.

Place robotic AAS Virtual Walls on opposite sides of the chamber, facing each other, to create a line just where the chair's front legs end (~⅓rd of the tent from the rear wall) (see FIG. 3, middle; only one virtual wall is shown but the other is in the corresponding location on the opposite side of the tent).
- Leave the virtual walls switched off until ready for testing.

Place the robotic AAS charger on the floor against the middle of the front wall (under the front entrance) (see fourth image 1900D in FIG. 19).
- Run the power cable from the home-base along the front wall (tucked under the carpet edge if possible) through the cable/hose port in the front wall to the right* of the entrance.
- Tape the cable against the tent wall interior underneath the port to prevent snags.
- Plug the cable into power outside the chamber.

Throughout this description with respect to the FD-AEC "right" and "left" are oriented as when facing into the chamber from the front.

Test Setup
Wipe tent interior (walls, ceiling, doors) with Lysol wipes or other protein-denaturing cleaner to remove residual allergen from previous tests.
- Allow at least 30 minutes before test start for surfaces to dry (or at least 2 hours for particles to settle if a spray cleaner is used).

For each hour of testing planned, prepare 3 sampling cartridges with 2 μm Millipore glass-fibre filters and support pads as per the SOP: RMT-ClinOps10-Air Sampling Pump Operation and Procedure [3].
- Label the cartridges with, for example, the study identity, test identity, and sample identity.

Set up the sampling pumps:
- Remove the pumps (typically RMT pumps A, B and C for example) from their charging station, turn them on and clear them if necessary.
- Program each pump as follows (pump numbers A, B and C will be used hereafter to index individual pumps; if other pumps are used substitute their pump IDs throughout):
  - Flow rate: 5000 cc/min
  - Delay: 42 min (pump C), 22 min (pump B), or 2 min (pump A)
  - Run 1:20 min
  - Hold: 40 min
  - Run 2: 20 min
- Place the pumps in the mesh bag.
- Affix the pump tubes (hanging from the cartridge support) to the pump inlets according to their position (i.e. the tube on the left of the support goes to the pump on the left and so on).
- Remove the red caps from sample cartridges 1 through 3 and place on the tubes as follows:
  - Pump A: sample 1
  - Pump B: sample 2
  - Pump C: sample 3
- With the indicated programs, the pumps will take turns sampling for sequential 20-minute blocks of time from the start of the test (2 minutes after program start) for the duration—samples IDs are indexed according to this order.

Weigh out the desired amounts of allergen source, e.g. milled cat hair. With milled cat hair as the allergen source for the preload and canister loads the following values were employed within exemplary robotic AAS experiments. Accordingly, the following description whilst referring to cat hair should be read as referring to the allergen source in other embodiments of the invention.
- For the technical validation repeats, allocation was as follows (all ±10%):
  - Preload: 3 g
  - Canister hour 1: 0.5 g
  - Canister hour 2: 1 g
- Record actual measured weights.

Preload the carpet:
- Empty the allocated cat hair into a mesh sieve and begin shaking it evenly across the front ⅔rds of the carpet (the entire area in front of the chair and table) using a "flour dusting" motion until most of the free dust has been shaken out.
- Force remaining cat hair through the sieve by rubbing it against the mesh by hand—continuing to spread the resulting hair/dust over the area of the carpet until most of the milled cat hair has been distributed (and the rate of distribution slows).
- Evenly distribute remaining clumps of hair across the same area of the carpet.
- Hereafter, avoid stepping on the preloaded area as much as possible.
- Allow at least 2 hours before test start for aerosolized particles to settle. Preloading can be done the day before testing if desired.

For a 2-hour or longer test, two robotic AASs will be required:
- Ensure all robotic AASs are accounted for and charged (typically RMT Robotic AASs 2 and 3; robotic AAS numbers 2 and 3 will be used hereafter to index individual robotic AASs, if different robotic AASs are used substitute their IDs throughout).

Remove both extractors from underneath each robotic AAS by squeezing the yellow extractor frame release tabs to open the bottom compartment, then gently remove the extractors.

Verify that the bins have been emptied and the robotic AASs are clean:
  Remove each bin from the robotic AAS by squeezing the bin release button on the back of the robotic AAS and then pulling the dust collection bin from the back.
  Open all compartments of the bin and clean it out thoroughly. Make sure to remove all dirt and debris that may be trapped in the pump fan.
  Wipe along the bottom surface of each robotic AAS, including the sensors and charging contacts with damp cloth or antiseptic wipe.
  Wipe the inside of the bottom compartment that houses the extractors and remove any debris.
  Wipe clean the inside of the exhaust fitting.

Plug in a second robotic AAS home-base outside the chamber and set Robotic AAS 2 on it to charge.

Ensure that the filter has been removed from the bin of robotic AAS 3 and that the mesh covering has been mounted in the filter's place. A 6 mm diamond mesh was used for all FD-AEC validation tests.

Mount the exhaust fitting on robotic AAS 3 aligned with the exhaust hole on the back of the vacuum bin. Using duct tape, thoroughly seal the spaces around where the fitting meets the robotic AAS body (FIG. 7). Note that it is important to get a good seal resistant to blow-out as there is increased resistance downstream in the allergen canister. A poor seal can result in significantly reduced allergen aerosolization.

Prepare the allergen canister and vibration motor circuit:
  Insert the bottom mesh into the bottom cap. A 6 mm diamond mesh was used for both the bottom and top meshes for FD-AEC validation repeats.
  Assemble the bottom cap and body (with the bottom mesh inset between them, not shown).
  Load the initial canister cat hair allocation into the partially assembled canister (it is a good idea to have the canister sitting in a weigh boat to catch any allergen that falls through the mesh).
  Insert the top mesh into the canister top cap. The top cap has a vibration motor affixed.
  Screw the top cap onto the canister body. Be careful not to jostle the canister excessively to avoid allergen loss.
  Screw the filled canister onto the robotic AAS exhaust fitting.
  Connect the vibration motor to the vibration motor power supply Place robotic AAS 3 inside the chamber on its home-base to charge.

Set robotic AAS 3 to its starting power level (eco mode 5 for FD-AEC validation testing repeats).

Test Start
  Take a baseline particle count with the handheld LPC:
    Program the LPC (for example):
      Cycles: 2
      Delay: 00:02:00
      Hold: 00:01:00
      Sample: 00:02:00
      Take note of the current location setting, or set to L00001
    Affix LPC inlet nozzle and temperature and humidity sensor.
    Place the LPC on the chamber table upright (supported by its swivel stand) aligned with the middle axis of the chamber directly above the edge of the chair.
    Start the LPC program and exit the chamber for the sampling duration. Do not disturb the chamber while the baseline measurement is underway.
    If one or both the baseline measurements are higher than expected (e.g. >500 particles >5 µm dia.), you may want to allow extra time for particles to settle before starting a test. If so, take a new set of baseline measurements before the new test start.
  Reprogram the LPC for 20 cycles per hour of testing (i.e. 40 cycles for a 2-hour test; the rest of the program is unmodified).
  Check that all robotic AASs are connected wireless to controller and fully charged.
  Check that robotic AAS 3 is set to the correct starting power level and set the robotic AAS to performance or eco mode in the controller application as appropriate (eco 5 for FD-AEC validation testing repeats).
  Make sure the pumps are turned on and ready to start.
  Remove the inlet caps from sampling cartridges 1 through 3.
  Start all three sampling pumps, the LPC, and the stopwatch as close to one another as possible (within 10-15 seconds). The 2-minute pre-test delay has now begun.
  Exit the chamber.
  10-15 seconds before the end of the pre-test delay (stopwatch will read 1:45-1:50), toggle the vibration motor on.
  After the 2-minute pre-test delay (the stopwatch will read 2 minutes), approximately simultaneously:
    Start Robotic AAS 3 from the app—observe the initial plume of allergen ejected from the canister.
    Restart the stopwatch (this is t=0).
    Listen to make sure the sampling pumps and LPC have started sampling.

Test Operation
  Enter the chamber only when necessary.
  Monitor robotic AAS status throughout, intervening if it becomes stuck.
  Ensure the robotic AAS stops/restarts approximately every 5 minutes:
    The robotic AAS will take 4-8 minutes to complete a program on its own. Stop and restart it from the app if 5 minutes have passed since the last power cycle.
    When the robotic AAS stops, check to make sure the bulk of the cat hair has dropped from the top of the canister to the bottom before restarting it (it may take a few seconds for most of the hair to drop, and some small clumps may remain stuck against the top mesh). If the bulk of the hair remains stuck against the top mesh:
      Ensure the vibration motor is on and properly affixed.
      Tap the top of the canister with a finger to dislodge the hair, or use a paperclip or something similar to poke it down.
    Observe the plume of allergen ejected from the canister on robotic AAS restart. If very little is observed (particularly for multiple power cycles consecutively), stop the vacuum and mix up the hair using a paperclip or something similar.

Scale the vacuum power level according to the testing regime. For FD-AEC validation testing repeats, power scaling was as follows:
0-20 min: eco 5
20-40 min: performance 4
40-60 min: performance 5
60-120 min: performance 6
For tests longer than 1 hour (such as FD-AAE validation testing repeats):
At t=48 min, exchange samples 1 and 2 for samples 4 and 5, respectively (so sample 4 is on pump 10, and sample 5 is on pump 9). Cap samples 1 and 2 and place them, outlet side down, in the cartridge rack.
At t=50 min, prepare to swap robotic AAS 3 for robotic AAS 2:
Stop robotic AAS 3 (and the vibration motor) and remove it from the chamber.
Disconnect the vibration motor from the battery pack and remove the battery pack from robotic AAS 3.
Unscrew the allergen canister from the exhaust fitting (be careful not to jostle the canister excessively) and remove the remaining cat hair from the canister. Completely disassemble the canister to ensure cat hair is removed from between the various components. Put the collected hair aside to be weighed later.
Load the canister with the hour 2 allocated cat hair (as outlined in section 2, steps 6.g.i through v; 1 g for FD-AEC validation testing repeats).
Remove the exhaust fitting from robotic AAS 3.
Remove the dustbin from robotic AAS 3. Open the bin and ensure all collected cat hair is in the bottom compartment of the bin (underneath the mesh). Make sure to remove hair caught in the impeller. Mix up the hair with a pair of forceps, then close the bin and place it in Robotic AAS 2.
Mount the exhaust fitting on robotic AAS 2 (as described in section 2, step 6.f; FIG. 7).
Screw the allergen canister onto the exhaust fitting.
Tape the vibration motor battery pack onto robotic AAS 2 and reconnect the vibration motor circuit. Tape down the circuit connectors as done previously.
Place robotic AAS 2 in the chamber on the home-base to charge.
Set robotic AAS 2 to the correct power level for t=60 min (performance 6 for FD-AEC validation testing repeats).
10-15 seconds before t=60 min, toggle the vibration motor on.
At t=60 min, start robotic AAS 2. Observe the initial plume of allergen ejected from the canister.
After pump 8 stops sampling (at approximately t=60 min), swap sample 3 for sample 6. Cap sample 3 and place it, outlet side down, in the cartridge rack.
Record the current battery level of both robotic AAS 3 and robotic AAS 2.
Place robotic AAS 3 on the home-base outside the chamber to charge.
Continue monitoring robotic AAS status and power cycling as outlined in steps 2-3 for the remainder of the test duration.
Test End and Cleanup Toggle the vibration motor off Secure testing samples/measurements:
- Cap air sampling cartridges and place them, outlet side down, in the cartridge rack.
- Record robotic AAS battery levels.
- Remove remaining cat hair from the allergen canister and set it aside to be weighed.
- Remove collected cat hair from the robotic AAS dustbin, including that stuck in the impeller, and set it aside to be weighed.
- Remove the LPC from the chamber.
- Document each air sample on an Air Sampling Pump Log (they should be 20 minutes and 100 L each).

Disassemble the allergen canister and wipe all components and the exhaust fitting.

Turn off and wipe the virtual walls.

Wipe, clear, and power off the pumps.

Wipe the chair and table and remove them from the chamber.

Install the allergen extractors and a filter into a robotic AAS with at least 60% battery remaining. With all other furnishings removed from the chamber, vacuum the carpet by running the robotic AAS at max power (performance mode 10) for 30 minutes. Afterward, dispose of any material collected and remove the filter and extractors again.

Use a damp paper towel or alcohol wipe to wipe all robotic AASs used. Wipe the interior of the bin, making sure to reach all corners and collect any remaining dust and dander before replacing the mesh grid inside the bin. Wipe the bottom extractor compartment as well as the sensors and charging contacts.

Weigh all allotments of cat hair set aside previously (canister hour 1, canister hour 2, bin) and record. Store used cat hair in the labelled container (optionally within a freezer).

Extract LPC data.

Package and store air samples for ELISA analysis according to protocol.

Allow at least two hours before subsequent testing.

Within the preceding sections a low complexity robotic AAS is described requiring additional user input. Within other embodiments of the invention the robotic AAS may automate many of the additional steps, provide robotic handling mechanisms etc.

FIG. 20 depicts a cover of the robotic AAS according to an embodiment of the invention showing a mesh for large debris filtering. Whilst a square mesh is depicted embodiments of the invention may employ other meshes such as diamond, rectangular, triangular, circular etc. Within the following descriptions with respect to a robotic AAS according to embodiments of the invention a 6 mm (0.25 inch) diamond mesh was employed.

FIGS. 21 to 23 depict an exemplary exhaust fitting/dispersion assembly (EFDA), also referred to as an Exhaust Allergen Dispenser (EAD) for a robotic AAS according to embodiments of the invention. FIG. 21 depicts a prototype robotic AAS according to an embodiment of the invention with the EFDA 2110 together with Vibratory Motor 2120 and Suction Control 2130. It would be evident that within other embodiments of the invention the Suction Control 2130 may be integrated to the robotic AAS and controlled through programming of the robotic AAS and/or through a wireless interface of the Robotic AAS. Optionally, the Suction Control 2130 may be coupled to an LPC, for example, to adjust the suction applied according to the particle counts established by the LPC. Similarly, the Vibratory Motor 2120 may be integrated with the EFDA 2110 or within the Robotic AAS.

Now referring to FIG. 22 there are depicted perspective and cross-sectional views 2200A and 2200B of an exemplary exhaust allergen dispenser (EAD) assembly for an AAS according to an embodiment of the invention. As depicted the EFDA/EAD comprises a Top Cap 2210, Canister Body 2220, Bottom Cap 2230 and Exhaust Fitting 2240. The Bottom Cap 2230 and Exhaust Fitting 2240 allow the EFDA/EAD to be demountably attached to the Robotic AAS such that the canister (Canister Body 2220) can be pre-filled/replaced etc. It would be evident that the relative dimensions of these parts may change according to the design of the robotic AAS and/or exhaust of the robotic AAS together with the requirements of the testing to be performed with the Robotic AAS. For example, the canister may be larger for extended testing sessions relative to those for short duration tests.

Figure 21:
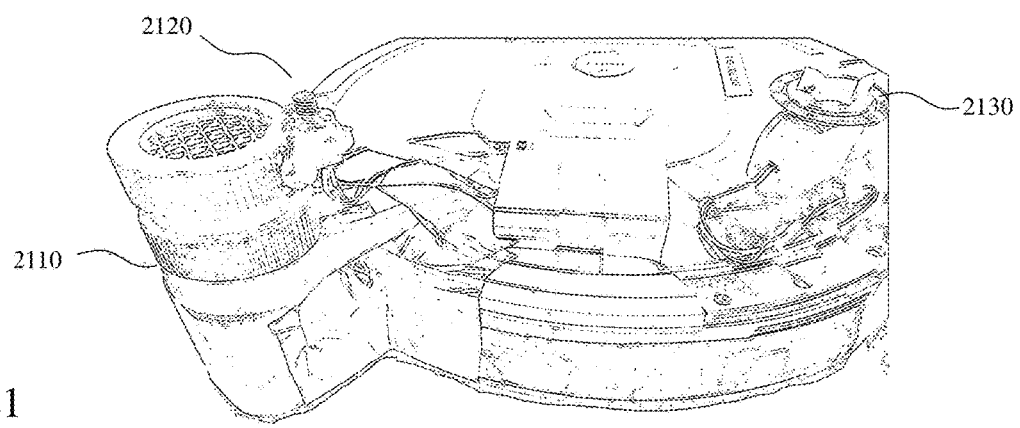
FIG. 21 depicts a prototype robotic AAS according to an embodiment of the invention with an exhaust fitting/dispersion assembly (EFDA) or exhaust allergen dispenser (EAD) assembly according to an embodiment of the invention.

As depicted in FIG. 21 the Top Cap 2210 of the EFDA/EAD has a mesh screen. However, within other embodiments of the invention this may be replaced to block the release of allergens for transportation or storage of the EFDA/EAD or during an acquisition mode of the robotic AAS to which the EFDA/EAD fits.

Figure 23:
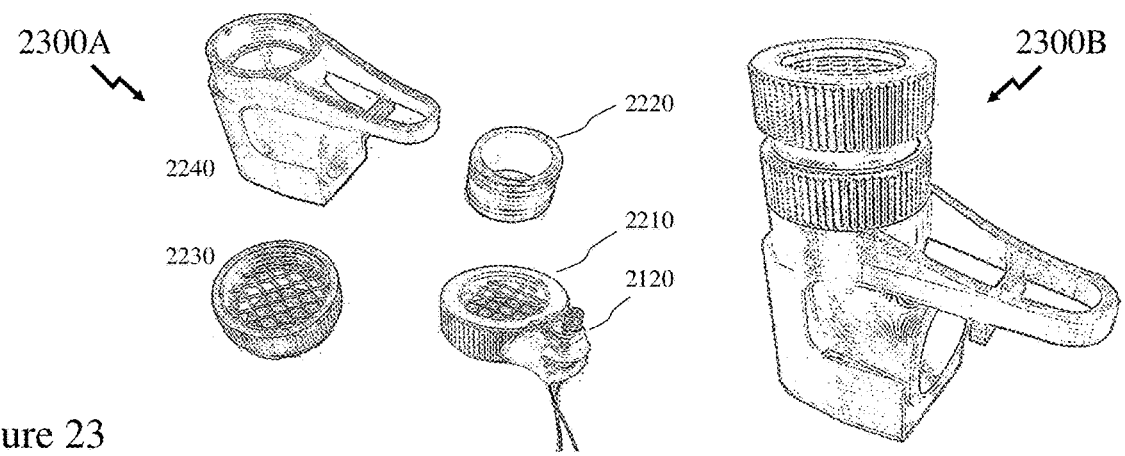
FIG. 23 depicts an exemplary allergen canister for a robotic AAS according to an embodiment of the invention disassembled with a vibration motor attached and assembled with mesh screen(s) inserted.

Now referring to FIG. 23 there are depicted an exemplary EFDA/EAD for a AAS according to an embodiment of the invention in disassembled and assembled views 2300A and 2300B respectively. Accordingly, there are depicted the Top Cap 2210, Canister Body 2220, Bottom Cap 2230 and Exhaust Fitting 2240. Attached to the Top Cap 2210 is Vibratory Motor 2120. The Vibratory Motor 2120 provides specific vibration of the EFDA/EAD in conjunction with or independent of any vibrations arising from the operation of the robotic AAS. The Vibratory Motor 2120 enhances distribution of the allergen(s) within the Canister Body 2220.

Optionally, the Vibratory Motor 2120 may be attached to or integral with the Canister Body 2220 rather than attached to or integral with the Top Cap 2210.

Optionally, the Vibratory Motor 2120 may be attached to or integral with the Bottom Cap 2230 rather than attached to or integral with the Top Cap 2210.

Optionally, a robotic AAS may have two or more EFDA/EAD assemblies attached to one or more exhausts of the Robotic AAS.

Optionally, a robotic AAS may have two or more EFDA/EAD assemblies attached to one or more exhausts of the robotic AAS where each EFDA/EAD has the same allergen.

Optionally, a robotic AAS may have two or more EFDA/EAD assemblies attached to one or more exhausts of the robotic AAS where each EFDA/EAD has a different allergen.

Optionally, a robotic AAS may have one or more EFDA/EAD assemblies attached to one or more air outlet ports which are separate to exhausts of the robotic AAS associated with the Allergen Extractor(s).

Optionally, the Top Cap 2210 and Bottom Cap 2230 may be simply to retain the Canister Body 2220 where the Canister Body 2220 has an upper membrane which allows air and the allergen to pass through it and a lower membrane which only allows air to pass through it.

Optionally, a robotic AAS with two or more EFDA/EAD assemblies can provide programmatic control through multiple activators such that multiple allergens can be dispensed in different quantities, different ratios relative to each other, or with different temporal/spatial profiles.

Optionally, a robotic AAS may have dedicated air inlet/outlets in dispensing only embodiments of the invention to suck air into the robotic AAS and via one or more motors with one or more impellers generate the required airflow to the one or more EFDA/EAD assemblies. These air inlets may include HEPA filters or other particulate filters to limit aerosolization of the other particulates other than the desired allergen(s).

Optionally, a robotic AAS may have dedicated outlets in dispensing only embodiments of the invention which couple one or more pressurised gas containers, e.g. canisters, to the one or more EFDA/EAD assemblies. The pressurised gas may be air, nitrogen or carbon dioxide for example. These pressurised gas containers may be coupled to programmable/computer controlled valves allowing controlled release, potentially in bursts/modes not achievable with a motor/impeller assembly or at higher flow rates/pressures to allow aerosolization of heavier particles, liquids etc.

Figure 20:
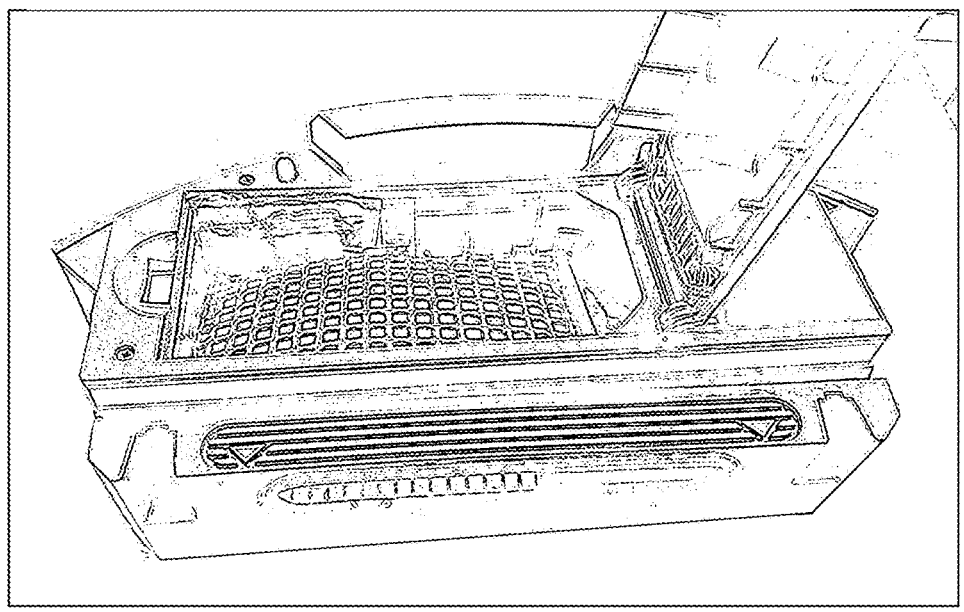
FIG. 20 depicts a view of a mesh debris filter for an AAS according to an embodiment of the invention.

Optionally, a robotic AAS may employ additional air inlets and/or pressurised gas in conjunction with a system such as described with respect to FIG. 20 and/or FIG. 6.

Figure 22:
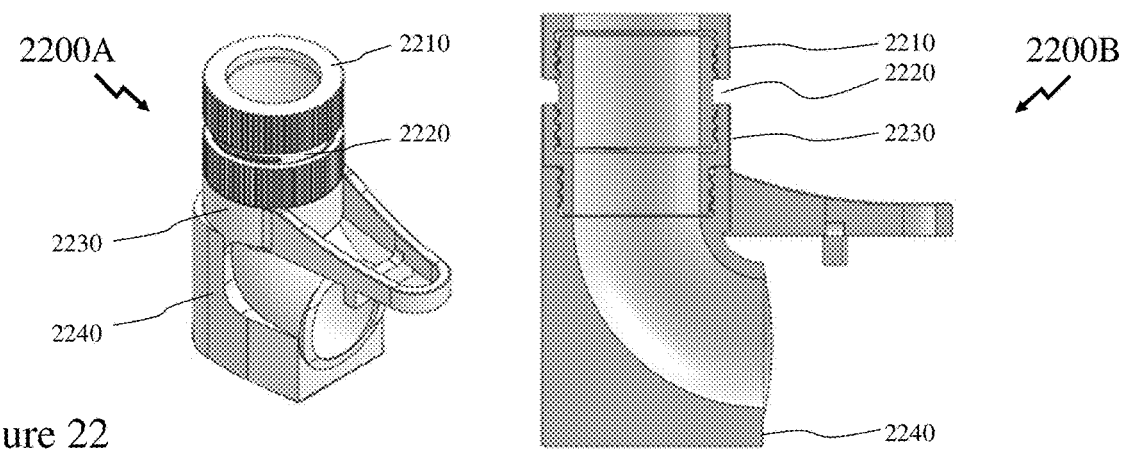
FIG. 22 depicts perspective and cross-sectional views of an exemplary exhaust allergen dispenser assembly for an AAS according to an embodiment of the invention.

Accordingly, an embodiment of the invention provides a FD-AEC comprising a portable pop-up environmental exposure chamber, an allergen dispersal system such as a robotic AAS as described with respect to embodiments of the invention, and a developed methodology that produces naturalistic and controlled allergen exposure for clinical research. The allergen dispersal system uses a robotic AAS with a custom exhaust channel and an external allergen reservoir (FIG. 21 to FIG. 23). Embodiments of the invention have been validated for cat allergen aerosolization (primary allergen Fel d 1) using milled cat hair as allergen source material as outlined above and dust mites as outlined below.

The elements comprising the chamber and necessary for its operation may be provided as a package to clients. These elements may include, but not be limited to:

A FD-AEC housing, e.g. tent.

A low-pile carpet cut to custom size to be fitted on the floor of the FD-AEC.

Air sampling pumps, their charging station, tubing, and hanging supports.

Sampling cartridges, filters, support pads for collecting air allergen samples.

Tweezers and petri dishes for loading and storing allergen samples (filters).

Robotic AAS with pulse width modulation voltage regulation with custom exhaust fitting, charging station and virtual wall barriers.

Aluminum bumper boards for adding structure to the inner tent corners and improving the motion of the robot vacuum.

Custom allergen canisters (top cap, canister body and bottom cap, vibration motor circuit), empty.

Predetermined amount of prepared allergen (e.g. milled cat hair, dust mites) sufficient for planned use.

Metal mesh sieve for loading allergen onto carpets

Scale for weighing allergen.

The exemplary FD-AEC described and depicted in respect of FIG. 19 by virtue of being approximately 1.8 meters×1.8 meters×2 meters (6 feet×6 feet by 6 feet 6 inches high) can accommodate 1-3 human subjects at one time. It has a large zipper door, one-piece envelope construction, and minimal vents for allergen containment. The door can be modified to have a clear window so that subjects can be observed from outside the chamber. Such a tent is very easy and quick to set up, typically by a single person in under half an hour. It requires no tools for set up and it can be erected in any indoor space that can accommodate its footprint and where the ceiling is more than 2 meters (approximately 6.5 feet) high although it may be employed externally with additional means to fix the FD-AEC in position, e.g. guyropes, ropes, pegs, straps etc. The tent can also be easily transported: it can fit into a carrying case that can be carried by a single person.

Once the tent is erected, a custom-fit low pile carpet is installed, completely covering the floor area inside of it. A chair is positioned within the tent for every subject to be tested per challenge. Air sampling pump(s) with attached cartridges loaded with filters are suspended from the tent ceiling for allergen quantification. The robotic AAS charging station is installed at the front of the tent and plugged into a power source.

The robotic AAS described employs pulse width modulation voltage control to adjust the air flow. The exhaust fitting channels the vacuum exhaust up into the air of the chamber. The exhaust fitting outlet is threaded to allow mounting of the allergen canister, and was FDM printed in ABS.

Allergen (milled cat hair) is loaded into the custom-designed allergen canister, which is then screwed onto the exhaust fitting. The allergen canister as described was designed in three parts (Top Cap 2210, Canister Body 2220, and Bottom Cap 2230) that screw together. In assembly a pair of allergen containment meshes are included, one between the Top Cap 2210 and Canister Body 2220 with the other between the Canister Body 2220 and Bottom Cap 2230 although it would be evident that other configurations are possible according to embodiments of the invention such as having these integrated with the Top Cap 2210 and Bottom Cap 2230 for example.

Within embodiments of the invention a High Density Polyethylene (HDPE) 6 mm (0.25 inch) diamond mesh was used for the prototype and validation testing, but other meshes could be used with little to no modification of the methodology. The allergen is loaded between the meshes, which are sized such that the allergen material is retained to a degree while allowing air to pass through to aerosolize allergen particles over time. The EFDA/EAD may for example be formed in Acrylonitrile Butadiene Styrene (ABS) and manufactured using 3D printing.

An eccentric rotating mass (ERM) Vibration Motor 2120 is mounted onto the EFDA/EAD to promote aerosolization by preventing the allergen from becoming clumped or matted. A 7.2V DC ERM with motor rates to 8250 revolutions per minute was employed in prototype robotic AASs although it would be evident that other ERM motors and/or vibration motors may be employed. The Vibration Motor 2120 may be powered by a battery pack or battery of the robotic AAS.

Figure 24:
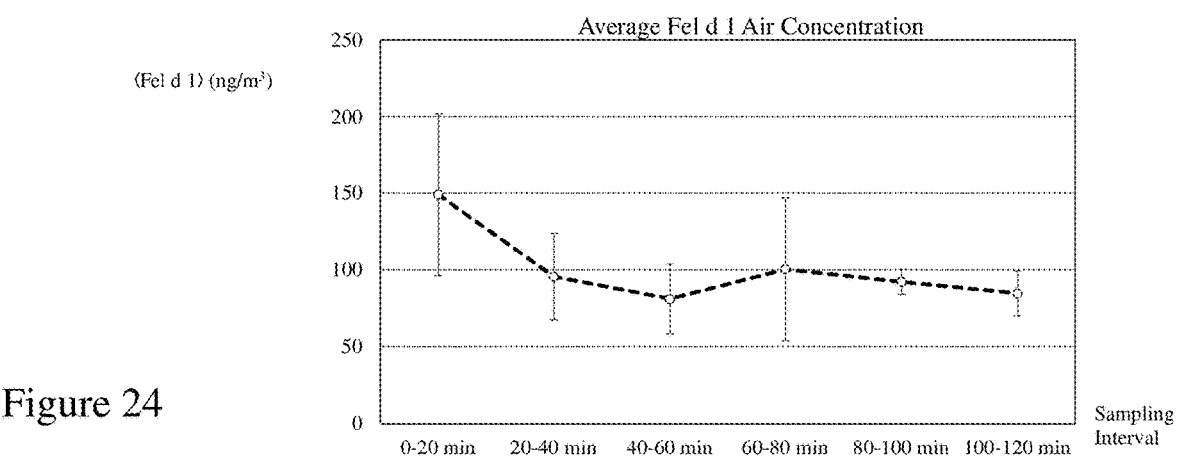
FIG. 24 depicts average 〈Fel d 1〉 within a field deployable AEC employing a robotic AAS according to an embodiment of the invention.

The allergen in the canister is aerosolized and dispersed throughout the FD-AEC when the robotic AAS is turned on and the robotic AAS exhausts air through the porous EFDA/EAD canister containing the allergen. The allergen is dispersed evenly throughout the FD-AEC over time, as the robotic AAS moves about the space. The developed methodology produced an average Fel d 1 air concentration of 100 ng/m$^3$ over the course of four 2-hour aerosolization tests in the prototype FD-AEC as depicted in FIG. 24.

Figure 25:
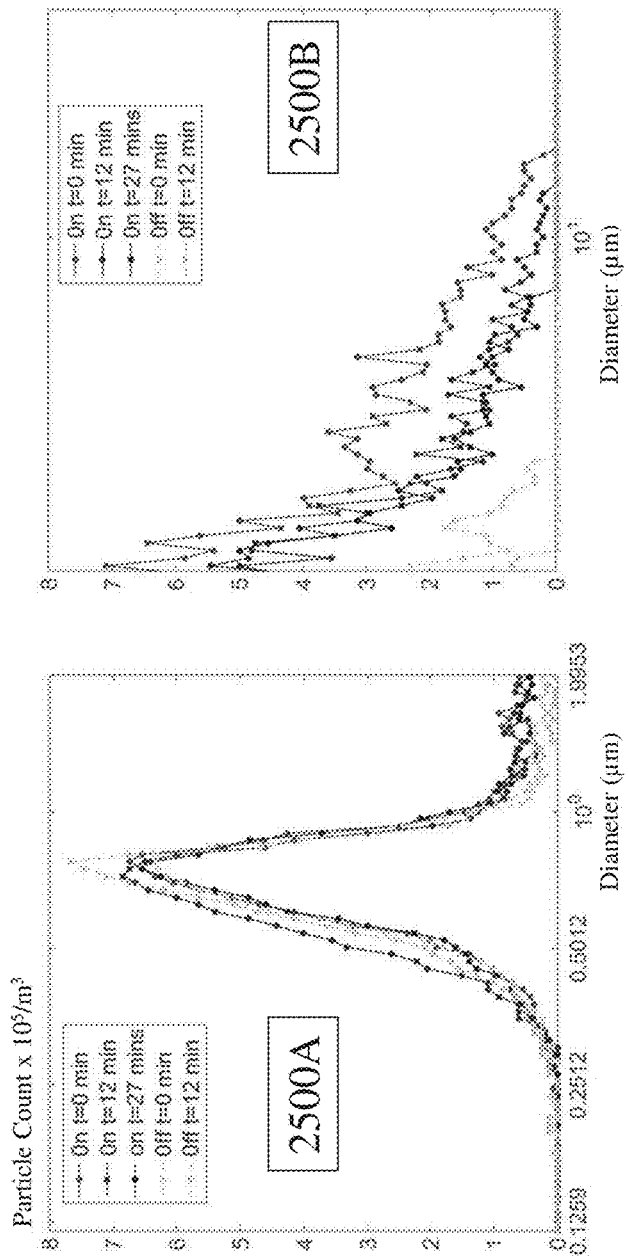
FIG. 25 depicts particle distributions at different times during and after aerosolization for very small particles (0.1-2 μm) and particles larger than 2 μm using a robotic AAS according to an embodiment of the invention.

Further experimental results of the exemplary robotic AAS are depicted in FIGS. 25 to 28 respectively. FIG. 25 depicts particle distributions at different times during and after aerosolization for very small particles (0.1-2 µm) and particles larger than 2 µm using a AAS according to an embodiment of the invention.

Figure 26:
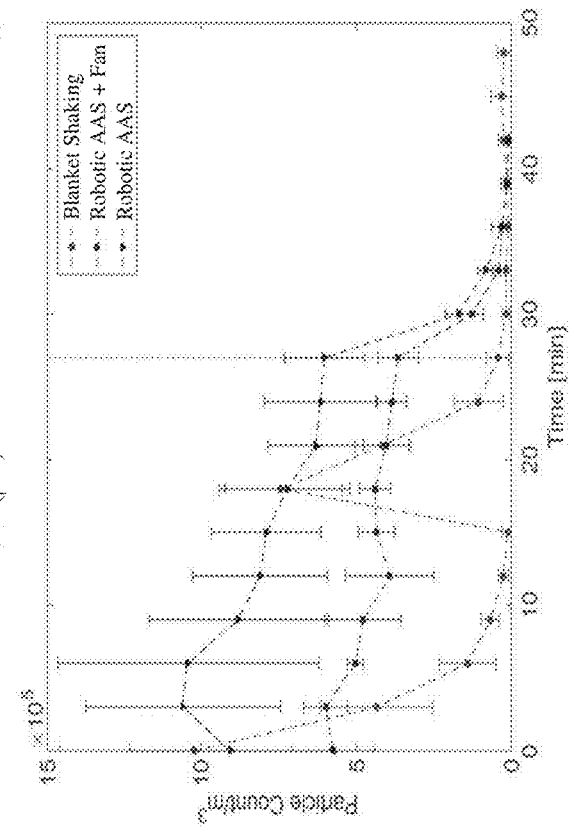
FIG. 26 depicts the total number of particles >2 μm over time for a robotic AAS according to an embodiment of the invention versus a prior art method of dispersion.

FIG. 26 depicts the total number of particles >2 µm over time for an exemplary robotic AAS with and without a fan within the environment according to an embodiment of the invention versus a prior art method of dispersion (blanket shaking).

Figure 27:
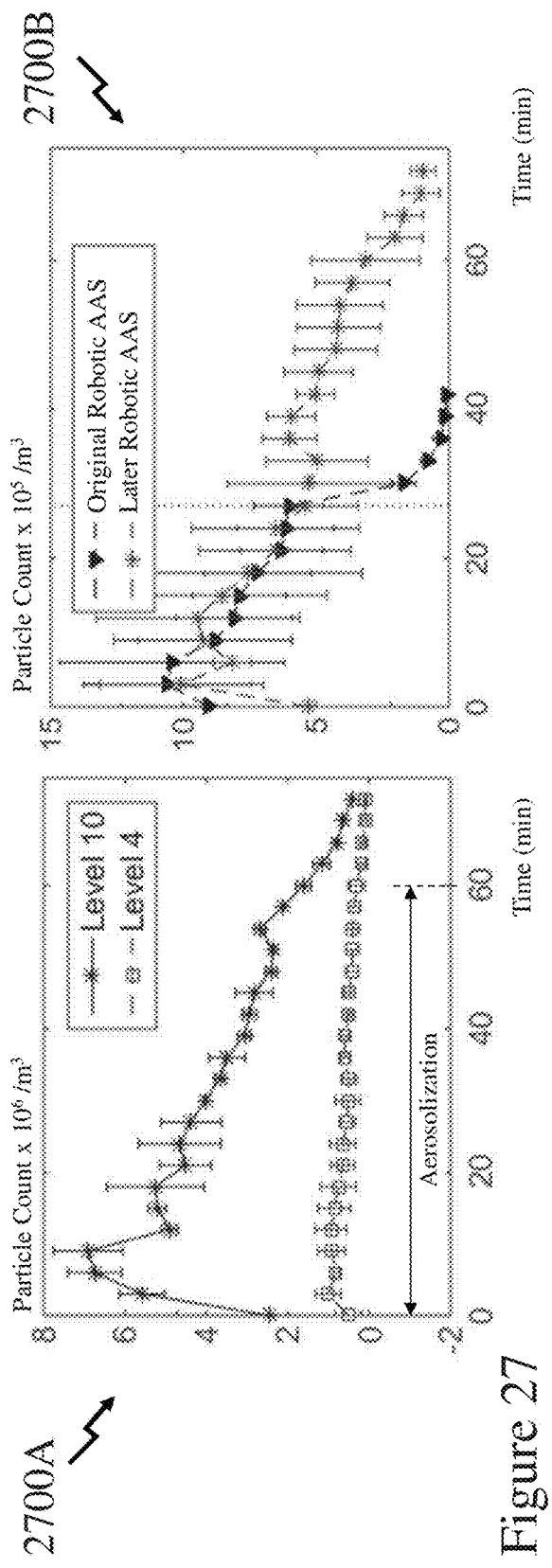
FIG. 27 depicts total particles versus time during and after dispersal with a robotic AAS according to an embodiment of the invention.

FIG. 27 depicts the total particles versus time during and after dispersal with a robotic AAS according to an embodiment of the invention.

Figure 28:
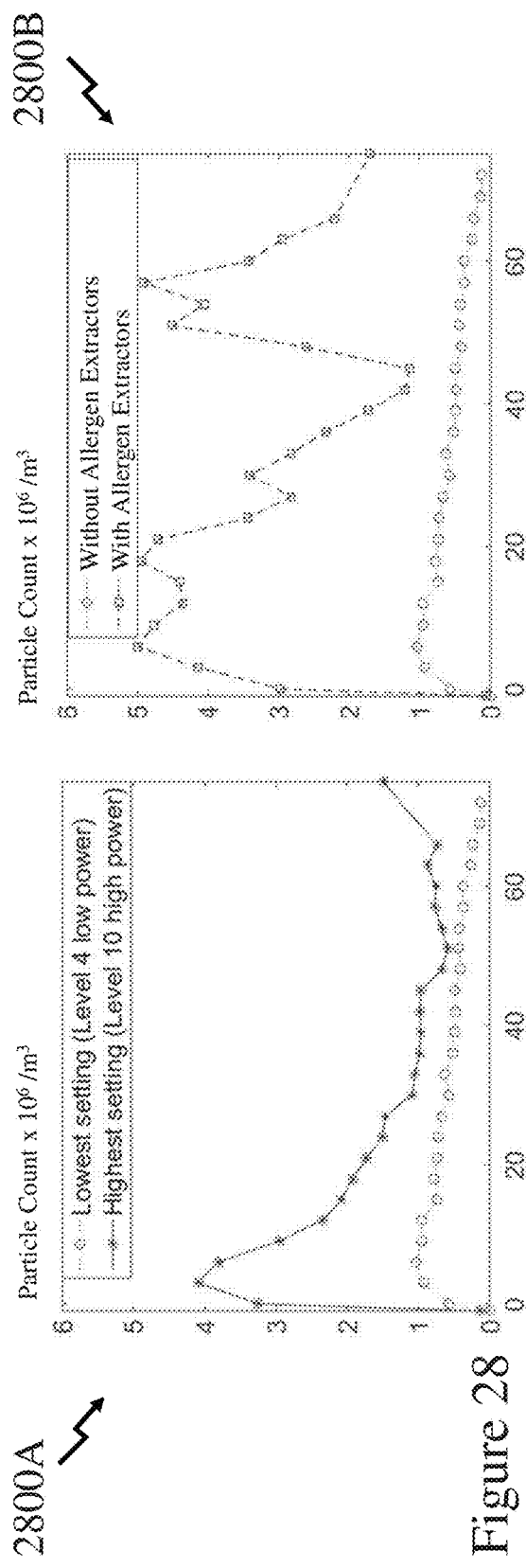
FIG. 28 depicts total number of particles versus time for different power levels and with/without extractors within a robotic AAS according to an embodiment of the invention.

FIG. 28 depicts the total number of particles versus time for different power levels and with/without extractors within a robotic AAS according to an embodiment of the invention.

Whilst embodiments of the invention for the robotic AAS describe self-contained devices with batteries it would be evident that within other embodiments of the invention the robotic AAS may be connected to a power source via one or more cables or other means of routing electrical power within the NEC AEC, FD-AEC etc.

Accordingly, an embodiment of the invention comprises providing a robotic AAS comprising:
  a body housing a motor, an impeller, an exhaust and a controller;
  the motor coupled to the impeller for generating an exhaust air flow;
  the controller coupled to the motor for adjusting a rate of the exhaust air flow exhausted through the exhaust; and
  an exhaust allergen dispenser (EAD) assembly, coupled to the exhaust, containing an allergen; wherein
  the allergen is distributed within an environment through the allergen in the EAD assembly being exhausted from the EAD assembly by the exhaust air flow.

Accordingly, in an embodiment of the invention the EAD assembly is demountably attached to the exhaust of the robotic AAS.

Accordingly, in an embodiment of the invention the EAD assembly comprises:
  a top cap for demountable attachment to a first portion of a canister body;
  the canister body;
  a bottom cap for demountable attachment to a second portion of the canister body;
  a first mesh screen disposed between the top cap and the first portion of the canister body; and
  a second mesh screen disposed between the bottom cap and the second portion of the canister body; and
  the EAD assembly is demountably attached to the exhaust via an exhaust fitting.

Accordingly, in an embodiment of the invention the EAD assembly comprises:
  a top cap for demountable attachment to a first portion of a canister body;
  the canister body;
  a bottom cap for demountable attachment to a second portion of the canister body; and
  a vibratory motor coupled to at least one of the top cap, the bottom cap and the canister body; and
  the EAD assembly is demountably attached to the exhaust via an exhaust fitting.

Accordingly, in an embodiment of the invention the robotic AAS further comprises:
  one or more allergen extractors within the body coupled to the motor or another motor and a means to move the body over a surface the body sits upon; where
  the controller controls the motor or another motor to adjust a suction applied through an opening within which the one or allergen extractors are disposed to the surface;
  the controller controls the motor and another motor to execute a first stage and a second stage;

in the first stage the controller executes a first sequence of motion of the body whilst applying suction (acquisition of allergen(s)); and in the second stage the controller executes a sequence of motion of the body whilst exhausting air through the EAD assembly (dispersal of allergen(s)).

Within the preceding description with respect to FIG. 19 a field deployable AEC (FD-AEC) was described and depicted within which robotic AAS according to embodiments of the invention may operate to provide a portable AEC. As discussed above the FD-AEC is intended to provide a mobile chamber for allergen chamber studies without needing a dedicated brick-and-mortar facility, e.g. an NEC such as described and depicted above. Accordingly, having established the robotic AAS the inventors established a study to mimic the aerosolized Fel d 1 conditions achieved in the validated NEC within the FD-AEC. This representing a third stage in the development of what the inventors refer to as the "Mini-Home." In Stage 1 the robotic AAS was established which employs a robotic system to move around within the FD-AEC and blow air through an EFDA/EAD containing the allergen under assessment, e.g. milled cat hair within a collapsible tent. In Stage 2, validation tests led to a refinement of the model and adjustments to the aerosolization settings of the robotic AAS with the EFDA/EAD to achieve stable allergen levels (e.g. Fel d 1) over a two hour timeframe within a target range. The third stage presented described below and with respect to FIGS. 29 to 40 was based upon a series of characterization tests to identify the effect of certain parameters on allergen levels within the FD-AEC whilst aerosolizing milled cat hair.

The goal of aerosolization in the FD-AEC study with the robotic AAS being to achieve comparable air concentrations of Fel d 1 within the FD-AEC as within the NEC, these NEC levels being depicted in FIG. 13, where these levels should also be sufficient to induce allergic symptoms, e.g. in cat-allergic persons, and similar to levels found in homes with cats. Accordingly, the target range for Fel d 1 aerosolization was set to 40-100 ng/m3 where the robotic AAS should additionally add adjustability and repeatability. Three variables were assessed for their effects on the aerosolized allergen levels with a handheld Laser Particle Counter (LPC) and air sampling pumps used to measure the particle and allergen levels during each test.

The three variables tested in this characterization were:

the amount of cat hair preloaded onto the carpet covering the floor in the FD-AEC, the amount of cat hair loaded into the canister attached to the robotic AAS exhaust, and the robotic AAS Roomba "power scaling" throughout the test. (i.e. the adjustment of vacuum suction level with time).

The inventors also sought to develop models for each parameter showing how their variation affects the aerosolized Fel d 1 levels within the FD-AEC allowing them to progress forward with improved control over the allergen levels in the room, with specific tailoring of the test parameters to achieve the desired Fel d 1 concentration.

During Stage 2 settings for the variable aerosolization parameters were identified through trial and error to achieve stable and repeatable allergen levels. In Stage 3 the intention was to explore the effects of each of these parameters, to identify how strongly they influence allergen levels. Within the tests discussed below each parameter was varied around a respective fixed value, to measure the resulting changes in allergen levels and sensitivity to that variable. The three variables that were varied separately were the preload amount of cat hair on the carpet of the FD-AEC, canister amounts of cat hair within the EFDA/EAD, and power scaling patterns for the robotic AAS. The specific parameters used for the Stage 2 validation were 3 g of carpet preload, 0.5 and 1.0 g of cat hair in the first hour (Hr.1) and second hour (Hr.2) canisters, respectively, and a combination robotic AAS power scaling. The protocol used to conduct Stage 2 testing described above was also applied in the characterization tests, maintaining consistency across all test results. Each aerosolization parameter is described in detail below, and the chosen test configurations are presented in Table 3.

TABLE 3

Test Matrix of Parameter Variations Along with Corresponding Fixed Conditions. The values of the varying parameters are bolded, with fixed parameters in parentheses.

| Variable | Preload | Hr.1 Canister | Power Scaling |
| --- | --- | --- | --- |
| Variation 1 | 0 g (Canister Hr.1: 0.5 g Hr.2: 1 g Power: Combination) | 0 g (Preload: 3 g Hr.2: 1 g Power: Combination) | ECO - Constant (Preload: 3 g Hr.1: 0.5 g Hr.2: 1 g Test Length: 1 hr) |
| Variation 2 | 1 g (Canister Hr.1: 0.5 g Hr.2: 1 g Power: Combination) | 0.25 g (Preload: 3 g Hr.2: 1 g Power: Combination) | Lowered Scaling (Preload: 3 g Hr.1: 0.5 g Hr.2: 1 g Test Length: 2 hrs) |
| Variation 3 | 5 g (Canister Hr.1: 0.5 g Hr.2: 1 g Power: Combination) | 1 g (Preload: 3 g Hr.2: 1 g Power: Combination) | Combination Scaling (Preload: 3 g Hr.1: 0.5 g Hr.2: 1 g Test Length: 2 hrs) |

Preload Amount: With the objective of recreating the aerosolization conditions of the NEC in the FD-AEC, the application of allergen source material (milled cat hair) is required to simulate the "existing" allergen in the NEC. The variable entitled "Preload," is this amount of cat hair that is applied onto the carpet within the FD-AEC prior to the test(s). It is applied two hours prior to the test to allow for any particles to settle. The validation tests were performed using a preload amount of 3 g, which was found, combined with the other fixed variables, to achieve an average of 100 ng/m³ Fel d 1, which is on the high end of the target range (40-100 ng/m$^3$). Having already conducted enough tests with a preload of 3 g, the characterization tests used to evaluate the effect of the preload were conducted using 0 g, 1 g, and 5 g. Two repeat tests were performed for each preload amount, with the Hr.1 and Hr.2 canister amounts fixed at 0.5 g and 1 g of cat hair, respectively. The robotic AAS power settings were also fixed at the combination scaling pattern used during the Stage 2 tests (as specified in Table 4).

TABLE 4

Robotic AAS Mode and Setting at each 20 minute Interval for Each Power Scaling Pattern (ECO = ECOnomical, PER = Standard PERformance)

| | t = 0 min | t = 20 min | t = 40 min | t = 60 min | t = 80 min | t = 100 min | t = 120 min |
|---|---|---|---|---|---|---|---|
| ECO | ECO 5 | ECO 5 | ECO 5 | ECO 5 | — | — | — |
| Lowered Scaling | ECO 5 | ECO 7 | ECO 10 | PER 3.5 | PER 3.5 | PER 3.5 | PER 3.5 |
| Combination Scaling | ECO 5 | PER 4 | PER 5 | PER 6 | PER 6 | PER 6 | PER 6 |

Canister Amount (within EFDA/EAD):

Having a reserve of cat hair for each hour of the test is necessary for maintaining stable allergen levels throughout the test. The canister is used to store an additional reserve of cat hair, and is replaced with a newly loaded one every hour of aerosolization based upon the design of the EFDS/EAD. The canister is placed directly in the path of an air exhaust of the robotic AAS to supplement anything the robotic AAS is picking up from the carpet and aerosolizing in the FD-AEC. The Stage 2 tests confirmed this method ensures stable levels throughout the test, and the canister amounts were chosen as 0.5 g and 1 g in the first hour (Hr.1) and second hour (Hr.2) canisters, respectively, for 2-hour tests. In order to determine the effect that the amount of cat hair loaded in the canisters has on the allergen levels and identify the optimal amount, different amounts were tested while all other parameters were fixed. Here, only the Hr.1 canister amount was varied and tests performed using 0 g, 0.25 g, and 1 g. Two repeat tests were performed under each configuration, as well as having collected the particle data and air samples for later analysis.

Figure 29:
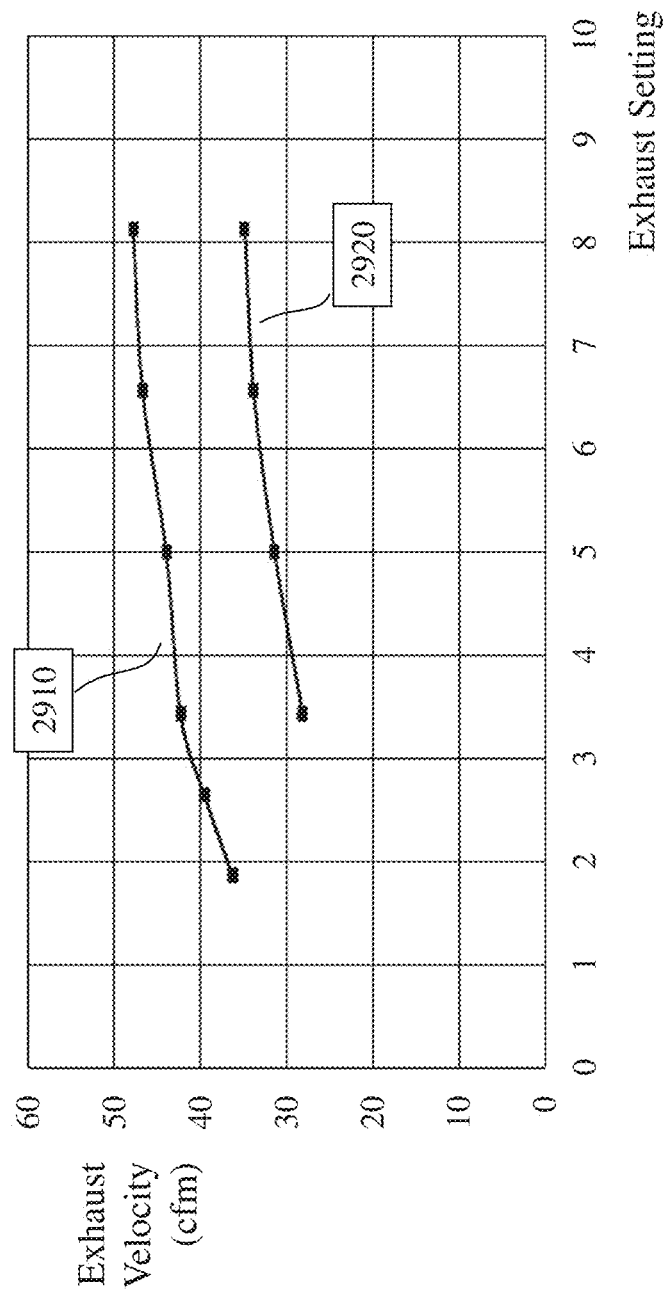
FIG. 29 depicts exhaust velocities versus control setting for a robotic AAS according to an embodiment of the invention under economical (ECO) and standard performance (performance) modes.

Power Scaling Pattern:

The final parameter is the Power Scaling Pattern. The robotic ASS allows for adjustment of the overall power level (suction strength) via pulse width modulation, in addition to having two different power modes to operate under, ECOnomical and Standard PERformance which provide different lifetimes of the battery. The power level was defined as adjustable from 1 to 10 via dial on the robotic AAS but it would be evident that within other embodiments of the invention the robotic AAS settings may be programmed into the robotic AAS and/or communicated to the robotic AAS via a wireless interface during its operation. Tests were designed to run for two hours, matching the duration of the Stage 2 validation tests, using a combination of ECO and PER modes throughout. The variation in the power settings causes the air flow through the exhaust to vary greatly, and each variation that was tested to explore those effects. FIG. 29 depicts the resulting exhaust velocity at different power level configurations, illustrating the variations seen between the power settings. The power scaling patterns were then used to ensure stable particle and allergen levels throughout the test. First curve 2910 depicts the standard PERformance mode and second curve 2920 the ECOnomical mode.

The first power scaling pattern was set to operate at ECO mode for the entire duration of the test, at level of 5, just above the lowest power level required for the robotic AAS to function. This power scaling pattern was explored to understand how to allergen levels behave at a baseline setting of the robotic AAS. This allows us to observe the natural tendency of the particles and allergen levels when there is no increase in robotic AAS suction (scaling). The next power scaling pattern that was tested was also set to ECO mode throughout the test, but at increasing power levels, until reaching the lowest Performance mode setting at the end of the test. The third power scaling pattern was referred to as a "combination scaling" pattern, where the robotic AAS is set to ECO mode, power level 5, then switches to PER mode and gradually increases in the overall power level. This power scaling pattern was the final confirmed configuration of the Stage 2 tests and was tested again in this characterization stage to ensure repeatability.

Upon the completion of the characterization tests, the particle data and Fel d 1 levels were compiled to analyze all the tests.

Figure 30:
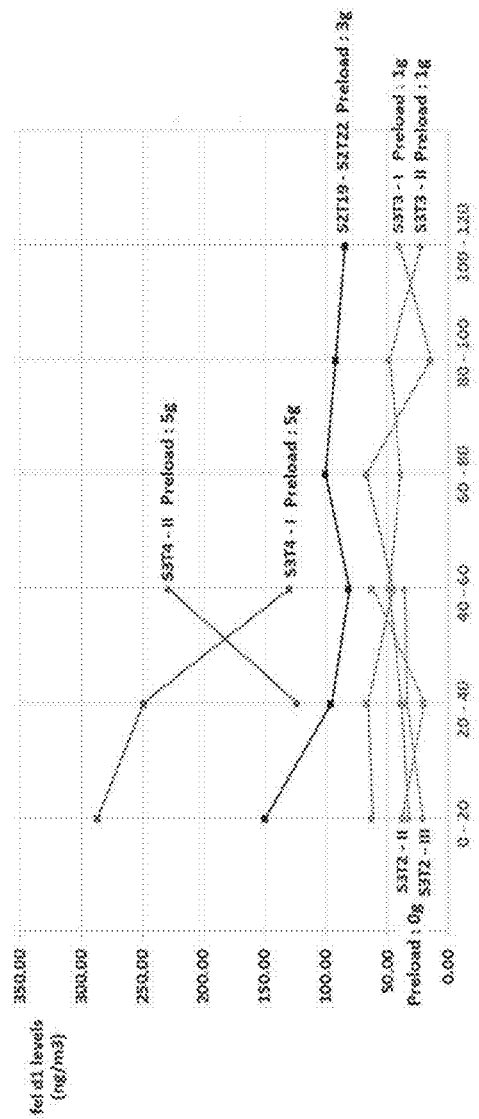
FIGS. 30 and 31 depict Fel d 1 concentration and particle level versus time for tests using varying carpet preload amounts for a robotic AAS within a portable AEC according to embodiments of the invention.
Figure 31:
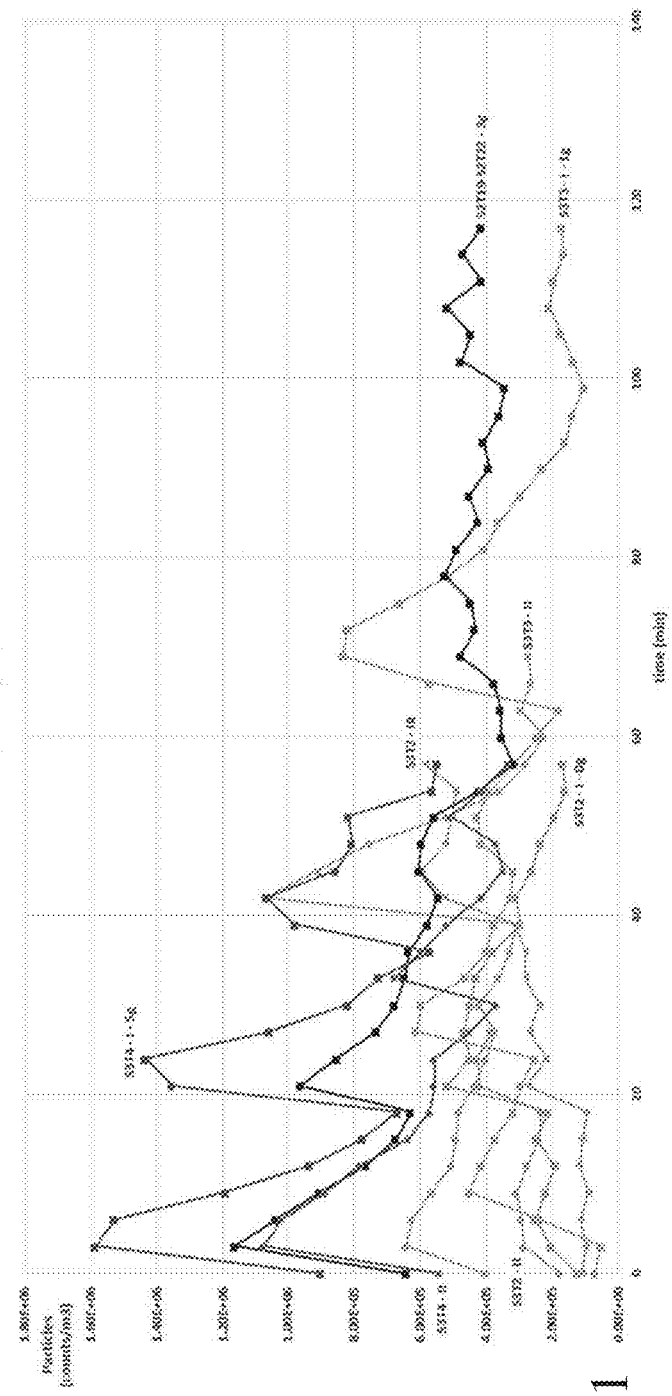

FIGS. 30 and 31 depict Fel d 1 concentration and particle level versus time for tests using varying carpet preload amounts for a robotic AAS within a portable AEC according to embodiments of the invention.

Figure 32:
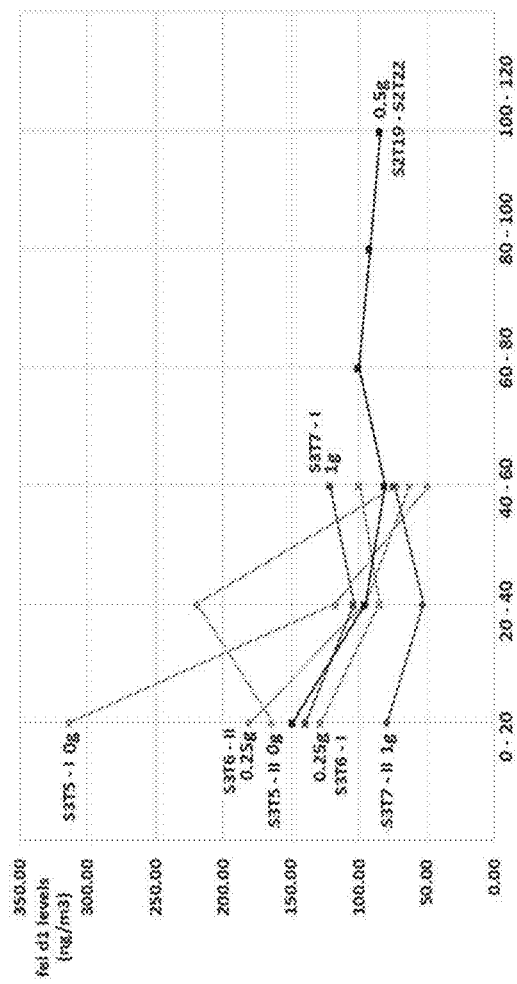
FIGS. 32 and 33 depict Fel d 1 concentration and particle level versus time for tests using varying canister preload amounts for a robotic AAS within a portable AEC according to embodiments of the invention.
Figure 33:
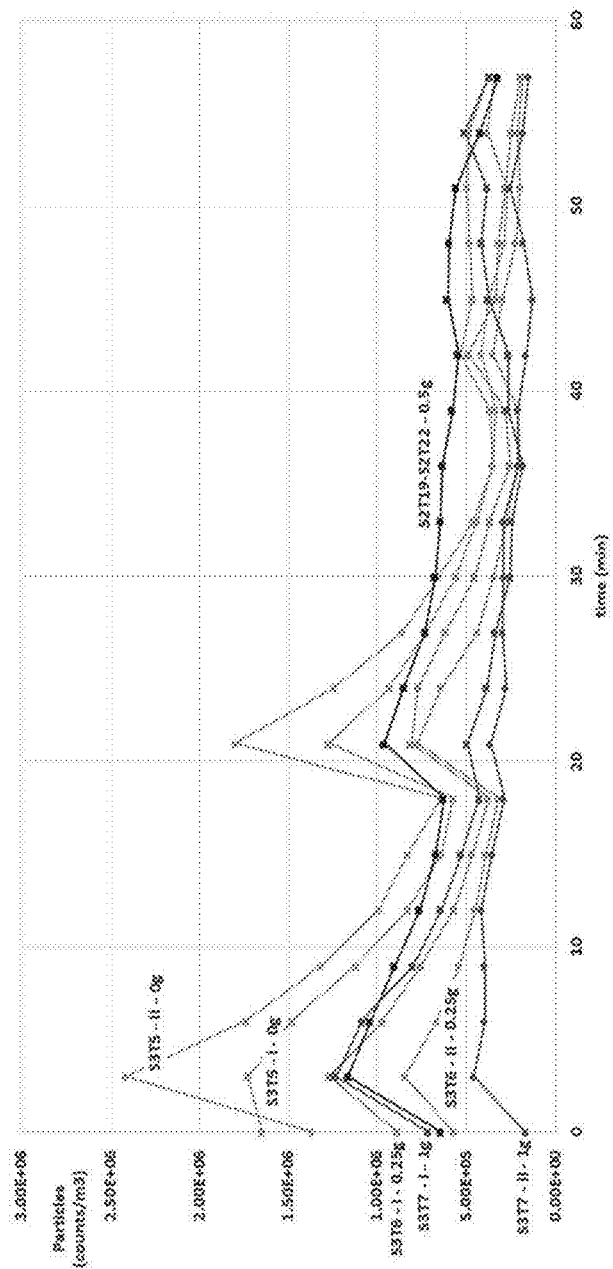

FIGS. 32 and 33 depict Fel d 1 concentration and particle level versus time for tests using varying canister preload amounts for a robotic AAS within a portable AEC according to embodiments of the invention.

Figure 34:
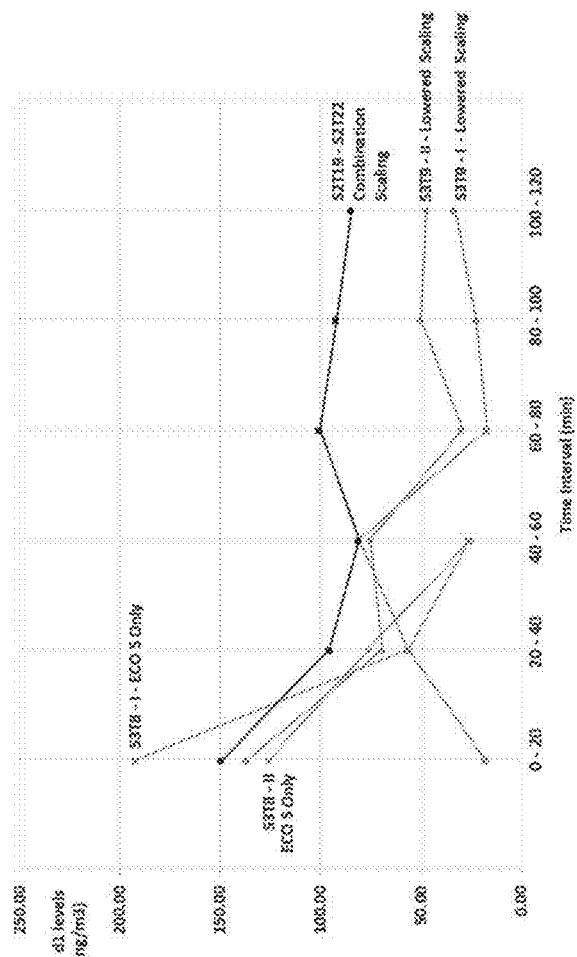
FIGS. 34 and 35 depict Fel d 1 concentration and particle levels versus time for tests using varying power scaling patterns for a robotic AAS within a portable AEC according to embodiments of the invention.
Figure 35:
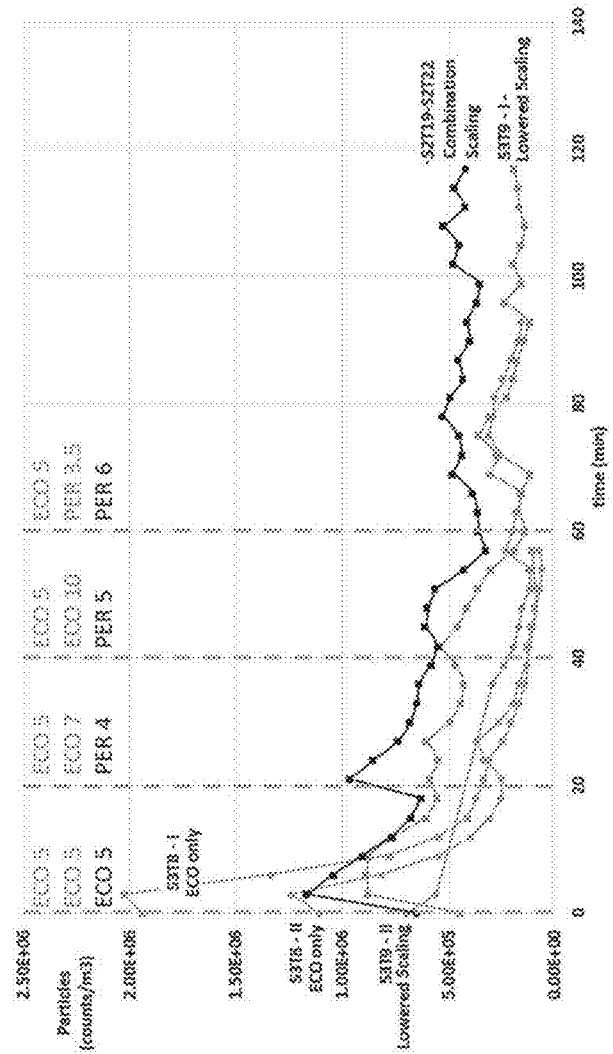

FIGS. 34 and 35 depict Fel d 1 concentration and particle levels versus time for tests using varying power scaling patterns for a robotic AAS within a portable AEC according to embodiments of the invention.

The outcomes of these characterization tests may be used as tools for establishing the appropriate parameters for a robotic AAS within an FD-AEC as they illustrate the overall effect of each parameter allowing the tests to be configured to achieve certain allergen levels. By isolating each parameter, it is also possible to analyze the correlation between the particle levels and allergen levels where this data aided in establishing an understanding of how sensitive the test was to that specific variable.

Preload Amount:

The carpet preload amount was expected to greatly influence the outcome of an aerosolization, and indeed, the results illustrated that increased amounts of preload yield higher allergen levels. As previously stated, the preload amounts that were tested were 0 g, 1 g, 3 g (data from stage 2 tests), and 5 g. At the start of the tests, the numbers of aerosolized particles (shown in FIG. 31) differed significantly, according to the preload amount: from the tests done with no preload, particle concentrations were about 200,000 particles/m$^3$ during the first 20 minutes of aerosolization, but they progressively increased for increasing preloads, and were in the millions (particles/m$^3$) for the tests done with 5 g preload. In every test, stable particle levels are maintained, confirming that greater amounts of preloaded cat hair will result in higher particle levels throughout the aerosolization.

Generally, particle levels and allergen levels were highly correlated, and in this case, the allergen levels had similar findings as the particle levels. FIG. 30 shows that the lowest allergen levels occurred when there was 0 g of preload, and the highest recorded levels occurred during when there was 5 g of preload. Across the time intervals, the Fel d 1 levels appear stable, except for both repeats for the test with 5 g of preload. While the Fel d 1 levels for those tests are highly dissimilar at each time interval, the time-average levels match well for the repeat tests. While it does not have significant consequences, there is a missing Fel d 1 result at the t=20 min point for S3T4-II, (human error). Although it is not the focus of these characterization tests, these variations in allergen levels were explored in a series of "Time Dependency" tests conducted alongside this characterization, to determine whether the sampling location influenced the measured allergen levels. The allergen level outliers observed in Test 4 (S3T4-I and S3T4-II with 5 g preload) were accepted because they have approximately the same Hr.1 average.

Figures 36, 37:
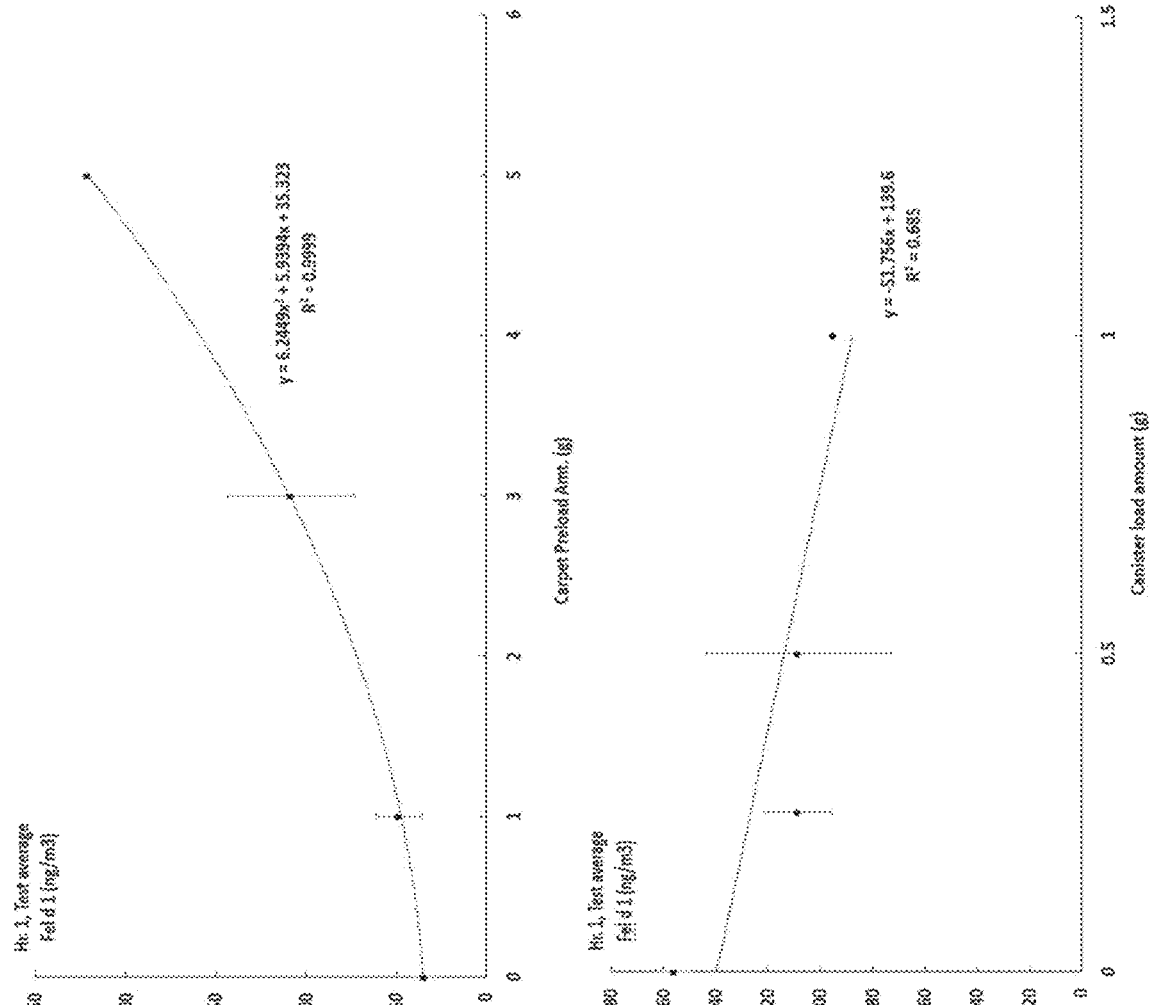
FIG. 36 depicts the results of varying the preload quantity on average Fel d 1 levels in the first hour of testing using a robotic AAS within a portable AEC according to embodiments of the invention.
FIG. 37 depicts the overall effect of varying the canister quantity on average Fel d 1 levels in the first hour of testing using a robotic AAS within a portable AEC according to embodiments of the invention.

The 1-hour average was calculated for every test and is plotted versus the carpet preload amount in grams in FIG. 36. This shows that the average Fel d 1 air concentration increases monotonically with carpet preload; i.e., that a higher preload will result in higher allergen levels overall. A second order polynomial was fitted to that data, which can be used to inform preload criteria for future tests.

Canister Amount: The amount of cat hair in the canister is intended to supplement the amount of allergen being aerosolized in the room, throughout a two-hour test. The amounts tested in the EFDA/EAD were 0 g, 0.25 g, 0.5 g (data from stage 2 testing) and 1 g. Although, for 2-hour tests, there are 2 EFDAs/EADs that are loaded with cat hair (one operative in the first hour and replaced for the second hour), the second EFDA/EAD was found to maintain stable levels as needed throughout the second hour, which is why the Hr.1 EFDA/EAD was the only one to be varied. This also simplified Stage 3 by limiting the number of tests, as well as material needed to conduct them. It would be evident that within other embodiments of the invention the robotic AAS may support multiple EFDAs/EADs with multiple exhausts which can be open/closed to allow operation of the multiple EFDAs/EADs concurrently or sequentially or in other combinations.

The initial hypothesis was that more cat hair in the EFDA/EAD would increase overall allergen levels, however, the results of the characterization tests illustrated the opposite: more cat hair in the EFDA/EAD restricted overall allergen levels. This resulted in a dampening phenomenon. It was clear that with greater amount of hair in the EFDA/EAD, there were fewer particles being aerosolized, resulting in lower allergen levels overall. FIGS. 32 and 33 illustrate these findings through the plotted allergen levels and particle data.

In FIG. 32, the highest reported Fel d 1 levels are seen in S3T5, where the EFDA/EAD had 0 g of hair in the EFDA/EAD where the levels also drop significantly by the end of the hour. This suggests that these allergen levels are a result of the robotic AAS instantly aerosolizing the allergen contents of the preload, proving that without an additional reservoir, it is difficult to maintain stable levels. In the same figure, S3T7 reports considerably lower allergen levels, despite having 1 g of cat hair in the EFDA/EAD. With supporting evidence found in the particle data in FIG. 33, the increased amount of hair (which is more tightly packed into the EFDA/EAD than for lower amounts) limits the amount that is aerosolized. It is hypothesized that the "clumping" nature of cat hair acts as a natural filter, preventing the release of allergen-carrying particles. It is necessary to find an amount that is not depleted immediately, but also does not act against the aerosolization process. The amount used in stage 2 testing was found to be appropriate in its ability to serve its purpose as an allergen reservoir, without limiting the number of particles that can be aerosolized. For the tests using 0.25 g of cat hair in the EFDA/EAD, the Fel d 1 levels were very similar to those measured using 0.5 g (from Stage 2 validation), and the particle concentrations were slightly lower. Again, after computing the average allergen levels in the first hour of the tests, and plotting them against each variation, an overall decreasing trend was seen. FIG. 37 ultimately shows that having a greater amount of cat hair in the Hr.1 EFDA/EAD has the potential to limit the amount of allergen that is aerosolized, but not having any can risk lower, unstable allergen levels throughout a test.

Figure 38:
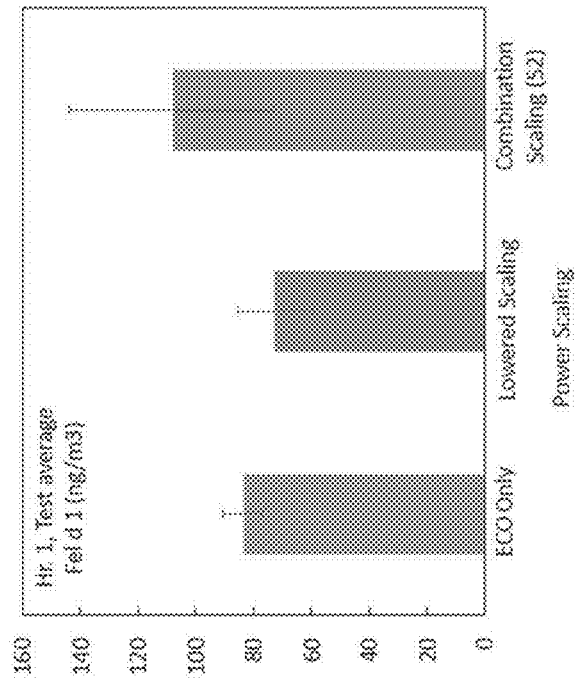
FIGS. 38 and 39 depict the effect of varying the robotic AAS power scaling on average Fel d 1 levels in the first hour of testing using a robotic AAS within a portable AEC according to embodiments of the invention.
Figure 39:
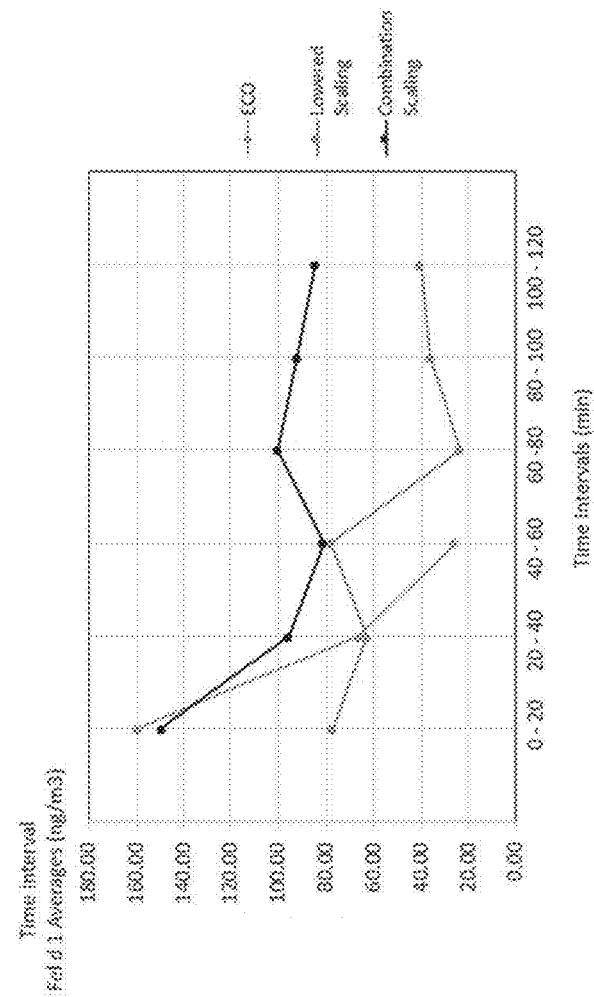

Power Scaling Pattern:

The adjustable power levels and operating modes on the robotic AAS are important to the aerosolization process however, their overall effect on the allergen and particle levels throughout the test had not previously been quantified. To measure this, three different power scaling patterns were tested, as described above (Table 4): the "ECO" test, the "lowered scaling" pattern, and the "combination scaling" used in Stage 2 tests. FIGS. 34 and 35 illustrate the results of the power scaling tests. The findings from these tests were as expected, and provide a guide for making any future changes to robotic AAS power settings in the protocol. At the lower power levels, lower particle counts were measured throughout the test, having the corresponding allergen levels show the same trend. It is important to note that in all of the tests, an initial burst of particles occurs at the start of the test, and the variations associated with this may partly obscure the overall effect the power scaling has on the allergen levels when averaged in time. The real-time particle data (FIG. 35) shows the initial bursts in each test and the behavior throughout, indicating that a combination scaling pattern is necessary to maintain stable levels of particles and Fel d 1 over the duration of a one or two-hour test. The findings of these characterization tests supported the use of the combination scaling for the aerosolization, as it was shown to be the most stable, while achieving the desired allergen levels for future tests. FIGS. 38 and 39 depict the effect of varying the robotic AAS power scaling on average Fel d 1 levels in the first hour of testing using a robotic AAS within a portable AEC according to embodiments of the invention; The data from the one-hour average Fel d 1 levels confirmed the efficacy of the combination scaling pattern however, there were aspects to improve upon to achieve more even levels in time.

It is important to be able to maintain stable allergen levels throughout the test, and the best way to do that was determined to be the combination scaling method. Additional power increases added in hours of dispersion after the first could further reduce particle settling and stabilize allergen levels.

Figure 40:
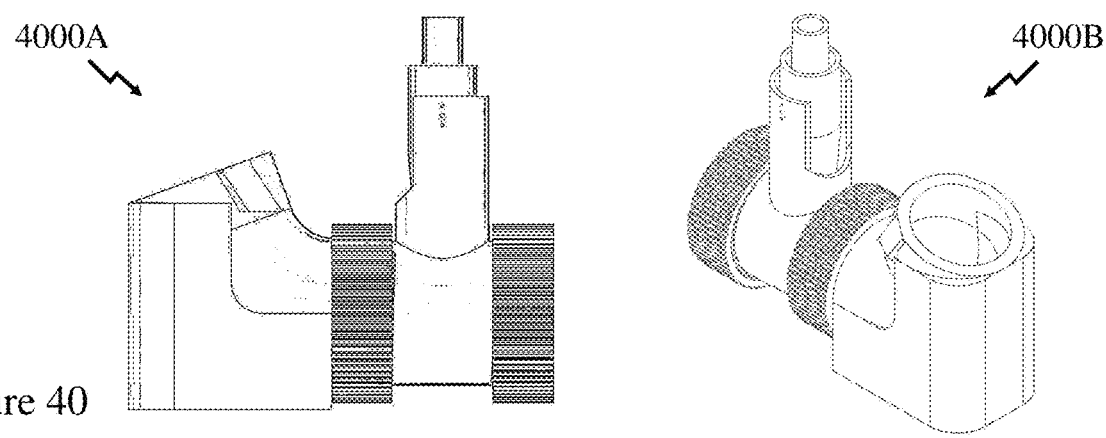
FIGS. 40 to 43 depict different views in assembled, part assembled and disassembled states for an exhaust fitting/dispersion assembly (EFDA) or exhaust allergen dispenser (EAD) assembly according to an embodiment of the invention.

Within the preceding description emphasis has been placed on cat allergens although embodiments of the invention may be configured for other allergens. In some instances, a variant of the EFFA/EAS may be required due to the nature of the allergen being dispersed. For example, FIGS. 40 to 43 depict different views in assembled, part assembled and disassembled states for an exhaust fitting/dispersion assembly (EFDA) or exhaust allergen dispenser (EAD) assembly according to an embodiment of the invention designed for house dust mite allergen. House dust mite allergen source materials are typically very fine powders, with particles typically smaller than 0.3 mm in diameter. FIG. 40 depicts front elevation view 4000A and upper left side perspective view 4000B of the structural portion of the EFDA/EAD which attaches to the robotic AAS.

Figure 41:
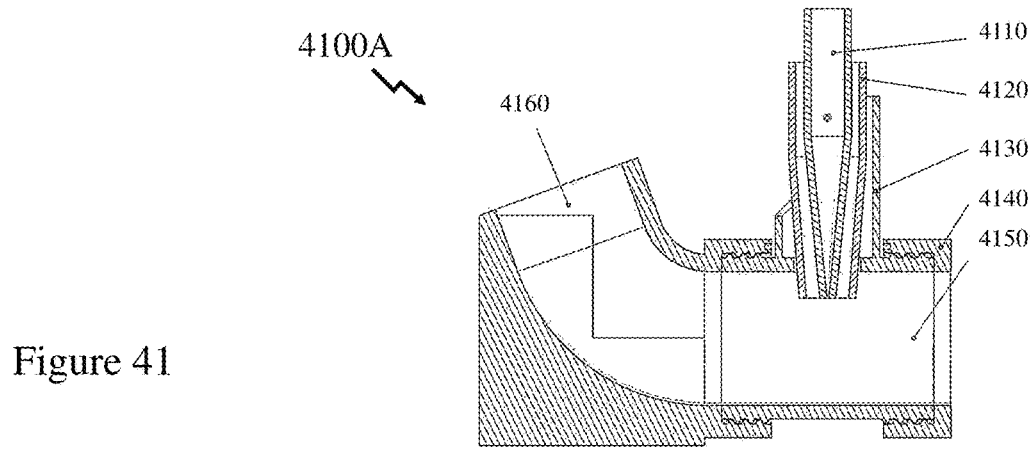

FIG. 41 depicts a cross-sectional view 4100A of the EFDA/EAD which attaches to the robotic AAS comprising:

Dispenser Pipette 4110;
Inner Holder 4120;
Outer Holder 4130;
Robotic AAS mount (AAS Mount) 4140;
Dispenser Conduit 4150; and
Exhaust Outlet 4160.

It would be evident that some parts described as separate elements within this description may be combined within other embodiments of the invention such as Dispenser Conduit 4150 and Exhaust Outlet 4160 for example. The Dispenser Pipette 4110 is in essence a capsule/container for the allergen with an opening at the bottom to control flow of the allergen where the allergen is vibrated to "dispense" it through the opening at the bottom of the Dispenser Pipette 4110.

Figures 42, 43:
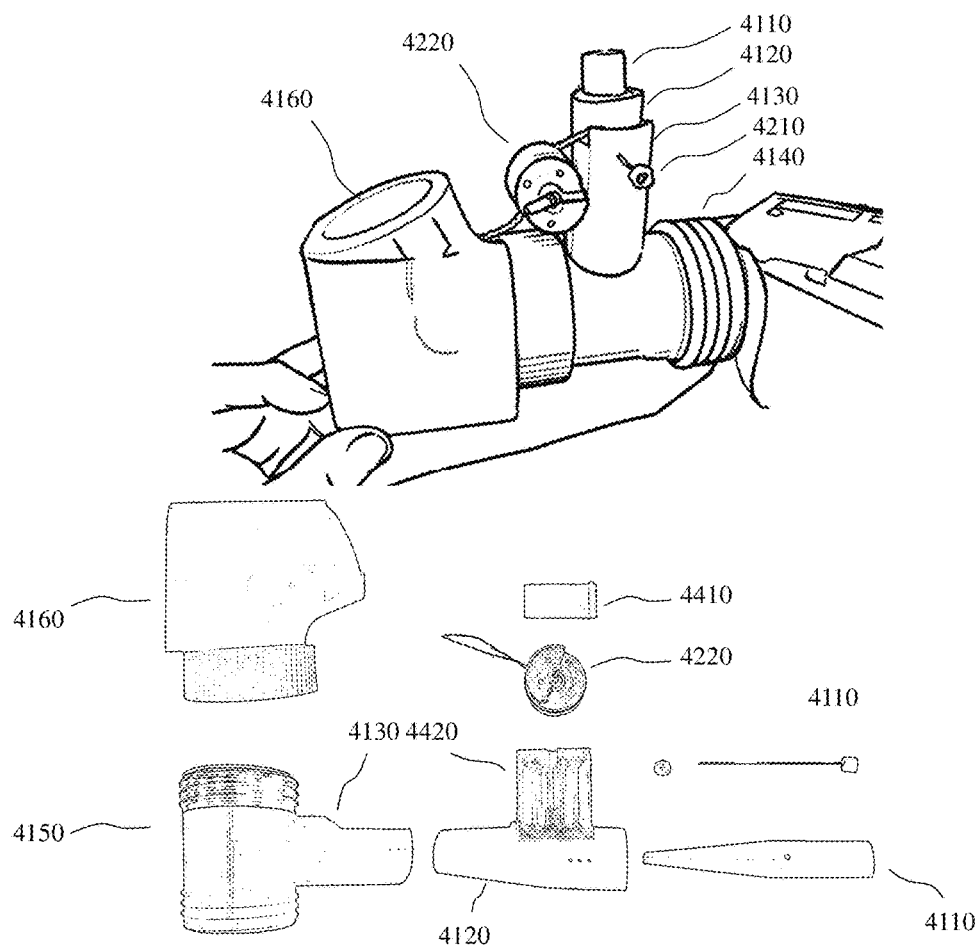

FIG. 42 depicts the EFDA/EAD attached to the robotic AAS together with Pin 4210 and Vibratory Motor 4220. The Vibratory Motor 4220 generating vibrations through an asymmetric weight for example which are coupled to the Inner Holder 4120 and Dispenser Pipette 4110. The Outer Holder 4130 being profiled such that the Vibratory Motor 4220 engages against the Inner Holder 4120. Accordingly, in the example of dust mites, the vibration induced by the Vibratory Motor 4220 "shakes" allergen source material within the Dispenser Pipette 4110, e.g. dust mites, down to the opening wherein they enter the inner bore of the Dispenser Conduit 4150 wherein the air flow from the robotic AAS aerosolizes them out through the Exhaust Outlet 4160 and into the environment surrounding the robotic AAS fitted with the EFDA/EAD. The Pin 4210 acts as a mounting point that connects each of the Inner Holder 4120, Outer Holder 4130 and the Dispenser Pipette 4110 which provides some degree of freedom so the parts can vibrate relative to one another.

Figure 44:
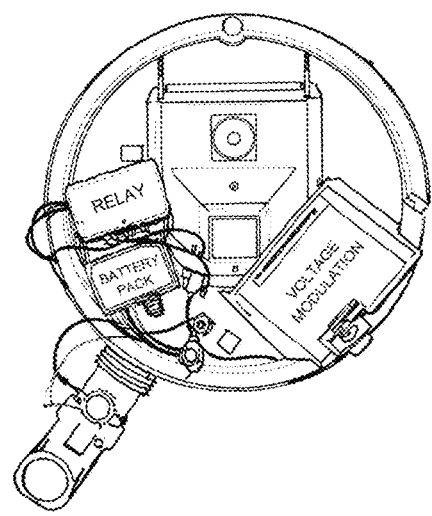
FIGS. 44 and 45 depict the EDFA/EAD assembly according to an embodiment of the invention fitted to a robotic AAS according to an embodiment of the invention.
Figure 45:
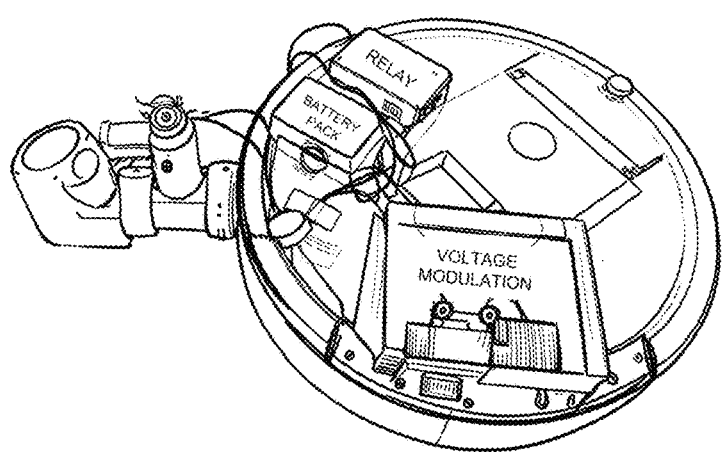

FIG. 43 depicts a variant of the EFDA/EAD in exploded form wherein the Inner Holder 4120 now has a Mounting 4420 for the Vibratory Motor 4220 to fit into and a Clip 4410 to retain the Vibratory Motor 4220 within the Mounting 4420. FIGS. 44 and 45 depict the EDFA/EAD assembly according to an embodiment of the invention fitted to a robotic AAS according to an embodiment of the invention. Accordingly, in addition to the EFDA/EAD assembly there are depicted the battery pack to power the Vibratory Motor 4220, a relay to turn the Vibratory Motor 4220 on and off, and the dial based control for the robotic AAS suction/air flow.

The Dispenser Pipette 4110 provides a container for the allergen prior to aerosolization where the dimensions of the lower end of the Dispenser Pipette 4110 are determined in dependence upon factors such as allergen dimensions and desired rate of allergen dispersal for example. The orifice at the bottom end of the Dispenser Pipette 4110 is sized to be small enough that allergen source material, e.g. dust mites, does not pass through the orifice by gravity alone unless agitation is applied (for example, by the Vibratory Motor 4220), but with agitation the allergen source material flows through the orifice.

Optionally, the Dispenser Pipette 4110 may be sealed until use.

Optionally, the Vibratory Motor relay may be coupled to a wireless interface for remote actuation.

Optionally, the Vibratory Motor relay may be coupled to a microcontroller for autonomous execution of a predetermined program.

Optionally, a stopper may be controlled by a relay such that it can be electronically removed/inserted to allow/block the allergen going from the Dispenser Pipette 4110 into the Dispenser Conduit 4150.

Optionally, multiple Dispenser Pipettes 4110 may be coupled to one Dispenser Conduit 4150 with the same or different allergens. Optionally, multiple Dispenser Pipettes 4110 with Pins 4210 and Vibratory Motors 4220 may be coupled to a common Dispenser Conduit 4150 allowing one or multiple allergens to be dispersed concurrently, serially, or a combination thereof.

Optionally, the Inner Holder 4120, Dispenser Pipette 4110, and Pin 4210 may be a single assembly that mount into the Outer Holder 4130 with the Pin 4210 aligning with slots in the Outer Holder 4130.

It would be evident to one of skill in the art that other mechanical configurations can provide the desired functionality without departing from the scope of the invention.

An exemplary operating procedure for use of an EFDA/EAD such as depicted in FIGS. 40 to 45 is presented below. However, an exemplary configuration of a FD-AEC is presented first. Within this configuration the robotic AAS operates within an area bounded by several physical "stoppers", although it would be evident that within other embodiments of the invention the area could instead by bounded by virtual walls defined by a beam the robotic AAS detects as it crosses it (e.g. infra-red beam), by triangulation based upon, for example, wireless beacons placed within the FD-AED, or by the edges of a raised platform the robotic AAS detects before crossing.

Figure 46:
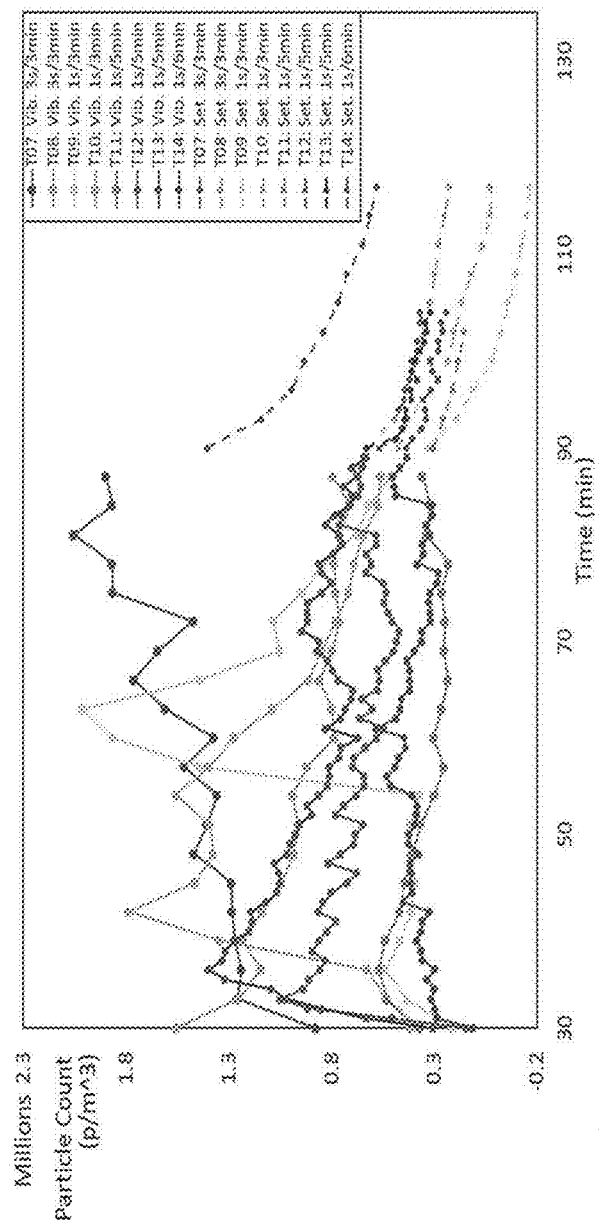
FIGS. 46 and 47 depict the evolution of normalized particle count with particle sizes greater than 1 μm and 5 μm respectively from prototype testing of the aerosolization of house dust mites using the EFDA/EAD described and depicted with respect to FIGS. 40 to 43 with the robotic AAS as depicted in FIGS. 44 and 45 within a FD-AEC according to an embodiment of the invention.
Figure 47:
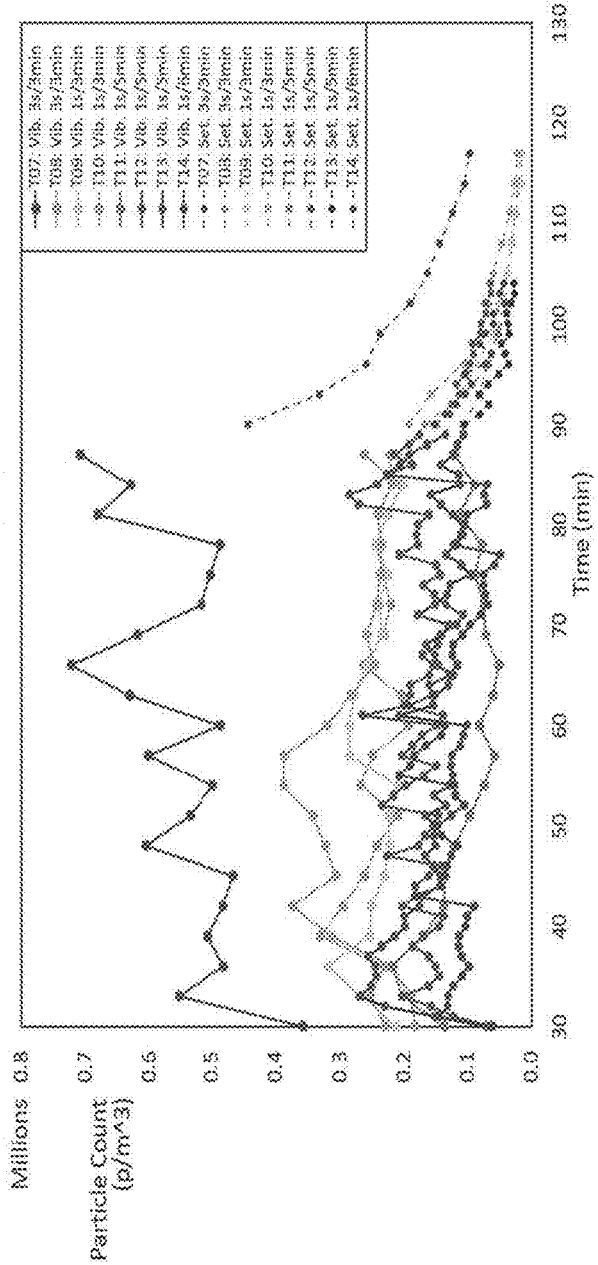

FIGS. 46 and 47 depict the evolution of normalized particle count with particle sizes greater than 1 μm and 5 μm respectively from prototype testing of the aerosolization of house dust mites using the EFDA/EAD described and depicted with respect to FIGS. 40 to 43 with the robotic AAS as depicted in FIGS. 44 and 45 within a FD-AEC according to an embodiment of the invention. The EFDA/EAD being turned on for the first 90 minute (solid lines) and subsequently turned off to allow particle setting (dashed lines). The On/Off cycles for the vibrations were varied between the tests and a 0.7 mm Dispensing Pipette 4110 was employed.

Figure 48:
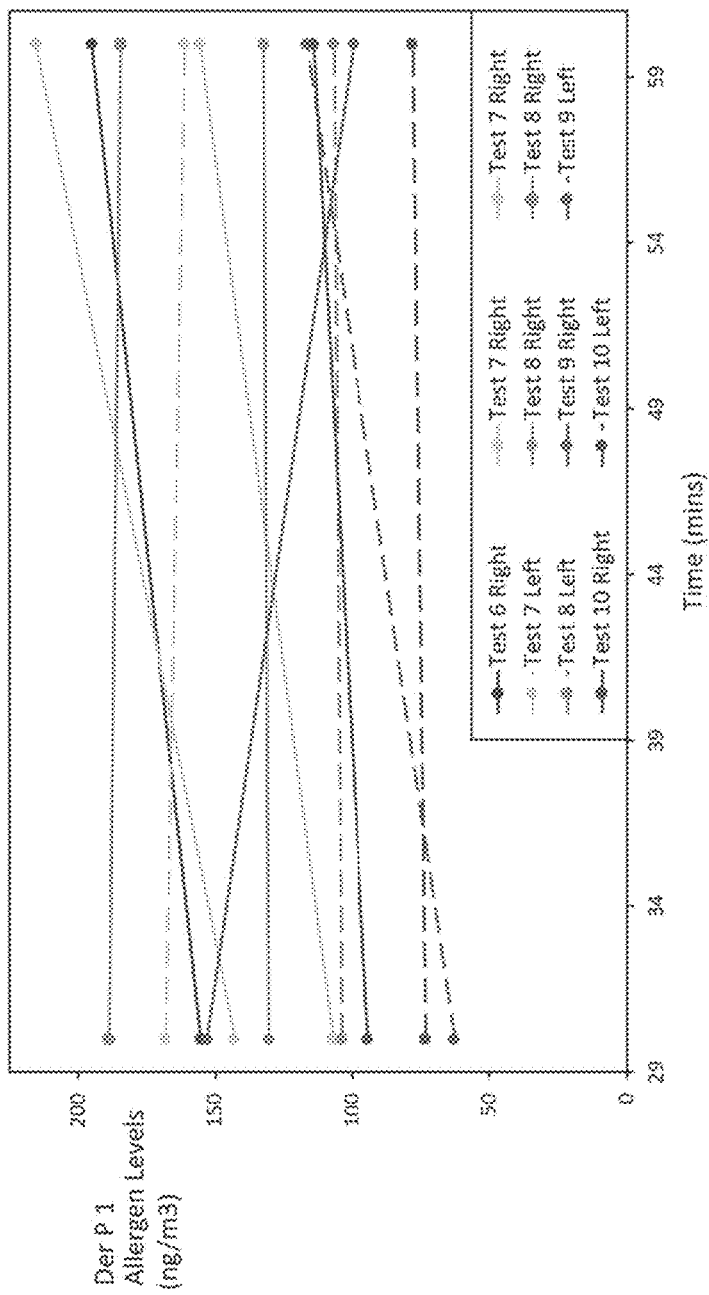
FIG. 48 depicts depict the distribution of Der p 1 allergen levels as function of time from samples collected at one side of a FD-AEC according to an embodiment of the invention during prototype testing of the aerosolization of house dust mites using the EFDA/EAD described and depicted with respect to FIGS. 40 to 43 with the robotic AAS as depicted in FIGS. 44 and 45.

FIG. 48 depicts depict the distribution of Der p 1 allergen levels as function of time from samples collected at one side of a FD-AEC according to an embodiment of the invention during prototype testing of the aerosolization of house dust mites using the EFDA/EAD described and depicted with respect to FIGS. 40 to 43 with the robotic AAS as depicted in FIGS. 44 and 45. The data was extracted from Enzyme-Linked Immunosorbent Assay (ELISA) results with some repeat samples.

FD-AEC Set Up

Set up the FD-AEC such as for example described above, virtual wall(s) and patient chair/table may be configured different such as outlined below.

Add physical stoppers around the back and the sides leaving 30 cm (1 foot) between the physical stopper and the back wall of the FD-AEC for the LPC table.
Set up a small table in the back of the tent for the LPC.
Program the portable pumps with the following settings:

Flow rate: 5000 cc/min;

2-minute delay (allowing the user to leave the tent and start the robotic AAS manually although in other configurations remote control of the robotic AAS may allow this delay to be adjusted or the pumps may be connected to the same control;

29-min sampling;

1-min delay, allowing time to change the cartridges; and 30-min sampling.

Place the pumps, e.g. within a mesh bag hanging from the FD-AEC. Press the pump tubes onto the pumps and ensure that the cartridge support is straight.

EFDA/AED Exhaust Fitting and Allergen Source Preparation

Prepare and label 6 cartridges using 2 μm glass fibre filters.

Screw the EDFA/EAD aerosolization Exhaust Outlet 4160 onto the Dispenser Conduit 4150.

Screw the partially-assembled EDFA/EAD aerosolization exhaust fitting onto the robotic AAS outlet.

Set up the Inner Holder 4120 with the Vibration Motor 4220 attached and the Dispenser Pipette 4110 to be used:

Treat the Dispenser Pipette 4110 by spraying the inside with anti-static spray and drying the inside using a compressed aerosol duster.

Align the Inner Holder 4120 and Dispenser Pipette 4110 with the Outer Holder 4130 on the Dispenser Conduit 4150.

Insert the Pin 4210 in the bottom pinhole of the Outer Holder 4130.

Pass the Pin 4130 through the bottom pinhole of the Inner Holder 4120 and through the pinholes of the Dispenser Pipette 4110, and out the bottom pinholes on the other side of the Inner and Outer Holders 4120 and 4130 respectively.

Ensure that the vibration motor relay module and associated remote work properly before the test:

Ensure the battery voltage and the voltage from the relay module are above 4.1 V using a voltmeter. Replace the batteries if necessary.

Connect the relay module to the Vibration Motor 4220 via the connector.

Turn on the switch of the battery pack.

Press once on the remote button and make sure the Vibration Motor 4220 rotates (check the wires for disconnections if not).

Press once again on the remote button to turn off the motor.

Weigh out the required EDFA/EAD allergen source material.

Prepare two weigh boats and a measuring spatula.

Turn on the balance and ensure that it is leveled.

Retrieve the EDFA/EAD allergen source material to be used for the test.

Tare the scale with one empty weigh boat.

Use the spatula and transfer the allergen (e.g. dust with dust mites) into the weigh boat (on the scale) until the desired dust amount is reached according to the test plan (during prototype testing, a 1-hour test required about 0.035 g).

Experiment Set Up

Take a baseline particle count using the LPC according to the test plan, with the LPC on the table at the back of the chamber (e.g. in prototype testing, 3-5 cycles of 3 minutes each).

Reprogram LPC for 30 cycles of 3 minutes each (e.g. 20 cycles vacuum on, 10 cycles vacuum off).

Add the allergen to the Dispenser Pipette 4110:

Cut a thin and long piece of tape, and use one end to close off the small end of the Dispenser Pipette 4110 (to avoid dust losses before the start of the test) with the other end extending out of the Exhaust Outlet 4160. Ensure that the tape is long enough so that it can easily be pulled out right before the test begins.

Make and place a paper cone onto the Dispenser Pipette 4110 and pour dust into cone to go into the Dispenser Pipette 4110, making sure that dust does not stick to sides of paper cone. Use a metal scoop to scrape the sides of cone as needed.

Set up the robotic AAS as per operating procedure.

Set the robotic AAS to ECO mode and a power level of 5:

Place the robotic AAS into the chamber and onto its home base, being careful not to shake the robotic AAS to prevent dust from dispensing from the Dispenser Pipette 4110 onto the tape. Make sure the vibration motor battery pack is switched off.

Remove the red caps from the cartridges and connect them to the pump tubing. To begin, connect the cartridge labeled R1 to the tubing nearest the right wall of the tent (from the main entrance of the tent facing the LPC table) and L1 to the tubing nearest the left wall of the tent.

Carefully remove the tape that is covering the Dispenser Pipette 4110 and switch the battery pack on. Ensure that the power level of the robotic AAS is still at 5.

Start the pumps, LPC, and a stopwatch at the same time

Quickly leave the tent and zip the entrances closed.

At 2 minutes, restart the timer and turn on the robotic AAS by pressing the “Start” on the control software application for the robotic AAS. This is t=0. Ensure that the robotic AAS is still on ECO mode.

At t=1 minute, use the relay remote to activate the vibration circuit at intervals according to the test plan. For example, during prototype testing the motor was activated for 1 second every 3 minutes (see the Cycles Checklist in Appendix 1).

At t=30 minutes, change the “R1” and “L1” cartridges to the “R2” and “L2” cartridges.

At t=60 minutes, change the “R2” and “L2” cartridges to the “Set R” and “Set L” settling cartridges. Stop the robotic AAS and take it out of the tent.

At t=90 minutes, take out the settling cartridges.

To measure the remaining amount of EDFA/EAD allergen source material, place a pre-weighed, empty rectangular container inside the prototype under the small end of the Dispenser Pipette 4110. Start the vibration motor and the timer at the same time and record the time it takes for the dust to empty out from the Dispenser Pipette 4110.

Use the balance to weigh the rectangular container with the remaining dust and subtract its empty weight to determine the remaining amount of dust. Record.

Use the voltmeter to measure and record the remaining voltage on the battery pack.

Wipe down any surfaces that may have been in contact with dust with Lysol wipes.

Turn on the robotic AAS on Standard Performance (PER) mode and at a power level of 10 and run robotic AAS with the filtered bin and extractors installed for 3 runs.

Use Lysol wipes to wipe down interior tent walls and LPC table.

Record sampling time and volume from each pump on the testing log.

Clear and turn off the pumps.

Unplug the LPC, turn it off, and place it back into its case to be ready for data extraction.

Store the air samples and clean the cartridges.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing a body housing a motor, an impeller, an exhaust and a controller;
providing the motor coupled to the impeller for generating an exhaust air flow;
providing the controller coupled to the motor for adjusting a rate of the exhaust air flow exhausted through the exhaust; and
providing an exhaust allergen dispenser (EAD) assembly, coupled to the exhaust, containing an allergen; wherein
the allergen is distributed within an environment by being exhausted from the EAD assembly by the exhaust air flow; wherein
the EAD assembly comprises:
a top cap for demountable attachment to a first portion of a canister body;
a bottom cap for demountable attachment to a second portion of the canister body;
a first mesh screen disposed between the top cap and the first portion of the canister body;
a second mesh screen disposed between the bottom cap and the second portion of the canister body; and
a predetermined portion of the EAD assembly is demountably attached to the exhaust via an exhaust fitting.

2. The method according to claim 1, wherein the EAD assembly is demountably attached to the exhaust.

3. A method comprising:
providing a body housing a motor, an impeller, an exhaust and a controller;
providing the motor coupled to the impeller for generating an exhaust air flow;
providing the controller coupled to the motor for adjusting a rate of the exhaust air flow exhausted through the exhaust; and
providing an exhaust allergen dispenser (EAD) assembly, coupled to the exhaust, containing an allergen; wherein the allergen is distributed within an environment through the allergen in the EAD assembly being exhausted from the EAD assembly by the exhaust air flow; wherein the EAD assembly comprises:
a top cap for demountable attachment to a first portion of a canister body;
the canister body within which the allergen is disposed for distribution;
a bottom cap for demountable attachment to a second portion of the canister body;
and a vibratory motor coupled to at least one of the top cap, the bottom cap and the canister body; and
a predetermined portion of the EAD assembly is demountably attached to the exhaust via an exhaust fitting.

4. The method according to claim 3, wherein
the exhaust air flow is from the bottom cap, through the canister body and then the top cap;
the bottom cap allows air flow through it but prevents the allergen passing;
the top cap allows air flow and the allergen to pass through the top cap.

5. A method comprising:
providing a body housing a motor, an impeller, an exhaust and a controller;
providing the motor coupled to the impeller for generating an exhaust air flow;
providing the controller coupled to the motor for adjusting a rate of the exhaust air flow exhausted through the exhaust; and
providing an exhaust allergen dispenser (EAD) assembly, coupled to the exhaust, containing an allergen; wherein the allergen is distributed within an environment through the allergen in the EAD assembly being exhausted from the EAD assembly by the exhaust air flow; wherein the EAD assembly comprises:
a top cap for demountable attachment to a first portion of a canister body;
the canister body within which the allergen is disposed for distribution with a lower membrane and an upper membrane;
a bottom cap for demountable attachment to a second portion of the canister body;
and a vibratory motor coupled to at least one of the top cap, the bottom cap and the canister body; and
a predetermined portion of the EAD assembly is demountably attached to the exhaust via an exhaust fitting.

6. The method according to claim 5, wherein
the exhaust air flow is from the bottom cap, through the canister body and then the top cap;
the bottom membrane allows air flow through it but prevents the allergen passing;
the upper membrane allows air flow and the allergen to pass through the membrane.

7. A method comprising:
providing a body housing a motor, an impeller, an exhaust and a controller;
providing the motor coupled to the impeller for generating an exhaust air flow;
providing the controller coupled to the motor for adjusting a rate of the exhaust air flow exhausted through the exhaust; and
providing an exhaust allergen dispenser (EAD) assembly, coupled to the exhaust, containing an allergen; wherein the allergen is distributed within an environment through the allergen in the EAD assembly being exhausted from the EAD assembly by the exhaust air flow; wherein the EAD assembly comprises:

a pipette having an upper opening and a lower opening;

a vibratory motor attached to a holder;

the holder into which the pipette is inserted;

a dispenser conduit through which an air flow passes having an opening aligned to the lower opening of the pipette when it is inserted into the holder; and the vibratory motor when operated imparts vibration to the pipette causing motion of an allergen within the pipette such that is passes at a predetermined rate into the dispenser conduit and is dispensed.

8. The method according to claim 7, wherein the predetermined rate is established in dependence upon a dimension or dimensions of the lower opening, a dimension or dimensions of the allergen and an operating speed of the vibratory motor.

9. A method comprising:

providing a body housing a motor, an impeller, an exhaust and a controller;

providing the motor coupled to the impeller for generating an exhaust air flow;

providing the controller coupled to the motor for adjusting a rate of the exhaust air flow exhausted through the exhaust; and providing an exhaust allergen dispenser (EAD) assembly, coupled to the exhaust, containing an allergen; wherein the allergen is distributed within an environment through the allergen in the EAD assembly being exhausted from the EAD assembly by the exhaust air flow; wherein the body further comprises one or more allergen extractors coupled to the motor or another motor and a means to move the body over a surface the body sits upon;

the controller controls the motor or another motor to adjust a suction applied through an opening within which the one or more allergen extractors are disposed to the surface;

the controller controls the motor and another motor to execute a first stage and a second stage;

in the first stage the controller executes a first sequence of motion of the body while applying suction; and in the second stage the controller executes a sequence of motion of the body while exhausting air through the EAD assembly.

\* \* \* \* \*